United States Patent [19]

Kigo et al.

[11] Patent Number: 6,073,234
[45] Date of Patent: Jun. 6, 2000

[54] DEVICE FOR AUTHENTICATING USER'S ACCESS RIGHTS TO RESOURCES AND METHOD

[75] Inventors: Kenichiro Kigo; Masaki Kyojima; Shunichi Kojima; Kil-Ho Shin, all of Nakai-machi, Japan

[73] Assignee: Fuji Xerox Co., Ltd., Tokyo, Japan

[21] Appl. No.: 09/066,752

[22] Filed: Apr. 27, 1998

[30] Foreign Application Priority Data

May 7, 1997 [JP] Japan ................................. 9-117318

[51] Int. Cl.[7] ...................................................... H04L 9/00
[52] U.S. Cl. ............................ 713/161; 713/168; 380/30
[58] Field of Search ............................ 380/23, 25, 21, 380/4, 30, 44

[56] References Cited

U.S. PATENT DOCUMENTS

| | | | |
|---|---|---|---|
| 5,442,706 | 8/1995 | Kung | 380/30 |
| 5,875,248 | 2/1999 | Lewis | 380/4 |
| 5,963,649 | 10/1999 | Sako | 380/25 |

Primary Examiner—Gail O. Hayes
Assistant Examiner—Ho S. Song
Attorney, Agent, or Firm—Oliff & Berridge, PLC.

[57] ABSTRACT

Both of a user side and a protect side such as a programmer of an application programmer need not handle a large number of inherent information such as authentication keys. An access ticket generation device generates an access ticket from user unique identifying information and access rights authentication feature information. As unique security characteristic information, there is used a secret key of an elliptic curve encryption or an ElGamal encryption. A proof data generation device receives the access ticket, converts authentication data received from a proof data verification device into proof data by use of the access ticket and the user unique identifying information, and returns the resultant proof data to the proof data verification device. The proof data generation device or the proof data verification device decrypts the above-mentioned encryption. The proof data verification device verifies the access rights as correct access only when a combination of an access ticket and user unique identifying information used in the proof data generation device is correct.

78 Claims, 35 Drawing Sheets

Overall arrangement

Overall arrangement

Arrangement of proving device using ElGamal cypher

Arrangement of second verification device (in the case in which decoding is executed by verification device and random number effect is not provided)

Arrangement of third verification device (in the case in which decoding is executed by verification device and random number effect is provided)

Arrangement of fourth verification device (in the case in which decoding is executed by verification device and random number effect is provided)

Operation of proving device according to Embodiments 3, 5 (in the case in which decoding is executed by proving device)

Operation of proving device according to Embodiments 1, 2, 4 (in the case in which decoding is executed by verification device)

Fig. 10 Operation of verification device according to Embodiment 1

Operation of verification device according to Embodiment 3

Fig. 12 Operation of verification device according to Embodiment 2

Operation of verification device according to Embodiment 4

Operation of verification device according to Embodiment 5

Operation of proving device according to Embodiments 13, 18, 19 (in the case in which decoding is executed by verification device)

Operation of proving device according to Embodiments 7, 9, 11 (in the case in which decoding is executed by proving device)

Operation of proving device according to Embodiments 6, 8, 10, 13, 15, 16 (in the case in which decoding is executed by verification device)

Operation of verification device according to Embodiment 7

Operation of verification device according to Embodiment 9

Operation of verification device according to Embodiment 8

Operation of verification device according to Embodiment 10

Operation of verification device according to Embodiment 11

Operation of verification device according to Embodiment 12

Verification method of decoded results (in the case in which decoded results are compared directly)

Verification method of decoded results (in the case in which one-direction function is used)

Verification method of decoded results (in the case in which decoded value is decoding key for other data)

Verification method of decoded results (in the case in which redundancy of decoded value is verified)

Verification method of decoded results (in the case in which decoded value is program code)

Verification method of decoded results (in the case in which decoded value is a key for decoding a program code)

Operation of verification device according to Embodiment 13

Operation of verification device according to Embodiment 14

Operation of verification device according to Embodiment 15

Fig. 34 Operation of verification device according to Embodiment 16

Operation of proving device according to Embodiment 14

Operation of verification device according to Embodiment 17

Operation of verification device according to Embodiment 18

DEVICE FOR AUTHENTICATING USER'S ACCESS RIGHTS TO RESOURCES AND METHOD

BACKGROUND OF THE INVENTION

1. Field of the Invention

The present invention relates to a device for authenticating user's access rights to resource.

2. Description of the Related Art

As prior-art technologies pertinent to the same technical field of the present invention, there has hitherto been known a program execution control technology. This program execution control technology is a technology in which:

1. inserting a user authentication routine into an application program;
2. the above-mentioned routine inspects whether or not a user who tries to execute the application program has a normal authentication key; and
3. only when it is confirmed that the user has the authentication key, the execution of the application program is continued, and in other cases, the execution of the application program is stopped. By utilizing the above-mentioned technology, it is possible to make the normal user having the authentication key capable of executing the application program. This technology is commercially available in the software distributing business. As commercially-available products using such technology, there are known SentinelSuperPro (trademark) of Rainbow Technologies, Inc., and HASP (trademark) of Aladdin Knowledge Systems, Ltd.

The program execution control technology will hereinafter be described more in detail.

1. A user who executes a software has an authentication key as user identification data. The authentication key is an encryption key and a person who permits the use of software, e.g. software vender distributes the authentication key to the user. The authentication key is closely sealed into a memory or the like of a hardware in order to prevent it from being duplicated and distributed to users by use of a physical means such as mail.

2. The user attaches a hardware incorporating therein an authentication key to a user's personal computer/workstation by a designated method. The hardware is attached to a printer board, for example.

3. When the user activates an application program and the execution of the program reaches the user authentication routine, the program communicates with the hardware incorporating the user authentication key. The program identifies the authentication key based on the communication result. If it is determined by the program that there exists the correct authentication key, then the next step is executed. If on the other hand the communication is failed and the existence of the correct authentication key is not confirmed, then the program stops its execution and the execution of the following program is inhibited.

The authentication key is identified by an access rights authentication routine in accordance with the following protocol, for example.

1. The access rights authentication routine generates a proper number and transmits a generated number to a key-incorporating hardware.

2. The key-incorporating hardware encrypts the number transmitted thereto by use of an incorporated authentication key and returns the encrypted number to the access rights authentication routine.

3. The access rights authentication routine determines whether or not the returned number is a previously-expected number, i.e. the number which is obtained by encrypting the number returned to the hardware by a correct authentication key.

4. If the returned number agrees with the expected number, the execution of the program is continued. If on the other hand the returned number does not agree with the expected number, the execution of the program is stopped.

In that case, the communication between the application program and the authentication key-incorporating hardware should become different each time even when the communication is made between the same portion of the same application program and the same hardware. Otherwise, each time the communication program in the normal execution process is recorded once and if the communication content is returned to the application program in exactly the same manner as that of the recording each time the program is executed, a user who does not have the correct authentication key could execute the program. The invalid execution of the application program based on the reproduction of this communication content is referred to as "replay attack".

To prevent the replay attach, it is customary that random numbers which are newly generated each time the communication is made are used as the numbers transmitted to the key-incorporating hardware.

The problems encountered with the related art are originated from a feature such that, when an application program is made, a programmer should execute a program protection processing based on an authentication key with the user's authentication key being assumed in advance.

That is, the programmer expects a correct reply from the key-incorporating hardware when making a program, and should make a program in such a manner that the program is executed correctly only when a correct reply is received.

Fundamentally, there are two modes in which the related art having the above-mentioned feature is used. Both of the two modes have the problems which will be described below.

1. According to a first method, there are prepared user authentication keys which are made different for users. That is, one different authentication key is prepared for each user such as when an authentication key A is prepared for a user A and an authentication key B is prepared for a user B.

In this case, the programmer should make a program by properly switching an authentication routine in the program for each user. That is, since authentication keys are different for every users, the authentication key in the program should be made so as to discriminate the authentication key inherent in the user who uses the program. Hence, the programmer must make different programs in response to the number of users who use such program.

When there are a large number of target users, work for customizing the program for each user imposes an unbearable labor on the programmer, and there is required an enormous list of user authentication keys that should be managed.

2. According to a second method, the programmer prepares different authentication keys for every applications. That is, different authentication keys should be prepared for every application such as when an authentication key A is prepared for an application A and an authentication key B is prepared for an application B. In addition, each application program should be made so as to identify an inherent authentication key.

According to the second method, a program need not be made for every user unlike the first method. Conversely, a user has to keep as many authentication keys as the number of application that the user uses.

This restriction raises the following problems for the programmer and the users.

As described before, the authentication key should be distributed to the user under the condition that it is strictly sealed into the hardware. Accordingly, while a program itself can be easily distributed to the user via a network, the hardware which incorporates therein the authentication key should be distributed to the user through only a physical means such as mail, This restriction imposes a large burden on the programmer from a standpoint of any of a cost, a time and packing.

The programmer has to stock a constant number of different hardware for every application in order to meet with user's requirements, and hence entails a cost of stock control.

Moreover, the user has to endure a troublesome work in exchanging a hardware each time an application used is changed.

There is the inconvenience that, even when the user intends to use a certain application, the user has to wait for the arrival of a hardware in which an authentication key is strictly sealed and the user cannot use the application immediately.

To alleviate the burden imposed upon the user, there is employed a method in which a plurality of authentication keys are previously sealed into the hardware and a password for enabling the user to use a new authentication key in the hardware is taught to the user each time the user is allowed to use such a new application. However, it is clear that, even when this method is used, the above-described problems cannot be solved from a principle standpoint. In actual practice, when a hardware becomes commercially available on the market, in order to alleviate the inconvenience caused by the above-mentioned problems, the hardware is designed in such a manner that a plural kinds of hardware can be connected.

Even when either of the above-mentioned two methods is employed as described above, there still exists a problem of inconvenience in the programmer and the user.

Having considered an external characteristic of execution control, it is to be understood that the above-mentioned related-art technologies can also be applied to a privacy protection of mails, an access control of files and computer resources, and other general digital contents access control. However, the above-mentioned related-art technologies cannot be applied to these fields due to the above-mentioned problems.

SUMMARY OF THE INVENTION

In view of the aforesaid aspect, it is an object of the present invention to provide a device for authenticating user's access rights to resources in which disadvantages caused in both of the user side and the protect side such as an application programmer when inherent information such as many authentication keys is handled can be eliminated.

It is another object of the present invention to provide a device for authenticating user's access rights to resources in which a user access rights can be easily authenticated when a program execution control is executed, an access right such as digital contents (still picture/moving picture/sounds or the like) is protected, mail privacy is protected, and access control such as file and computer resources is executed.

DETAILED DESCRIPTION OF THE PREFERRED EMBODIMENTS

Before describing specific embodiments respectively, an overall image of the embodiments according to the present invention will be described hereinafter.

Figure 1:
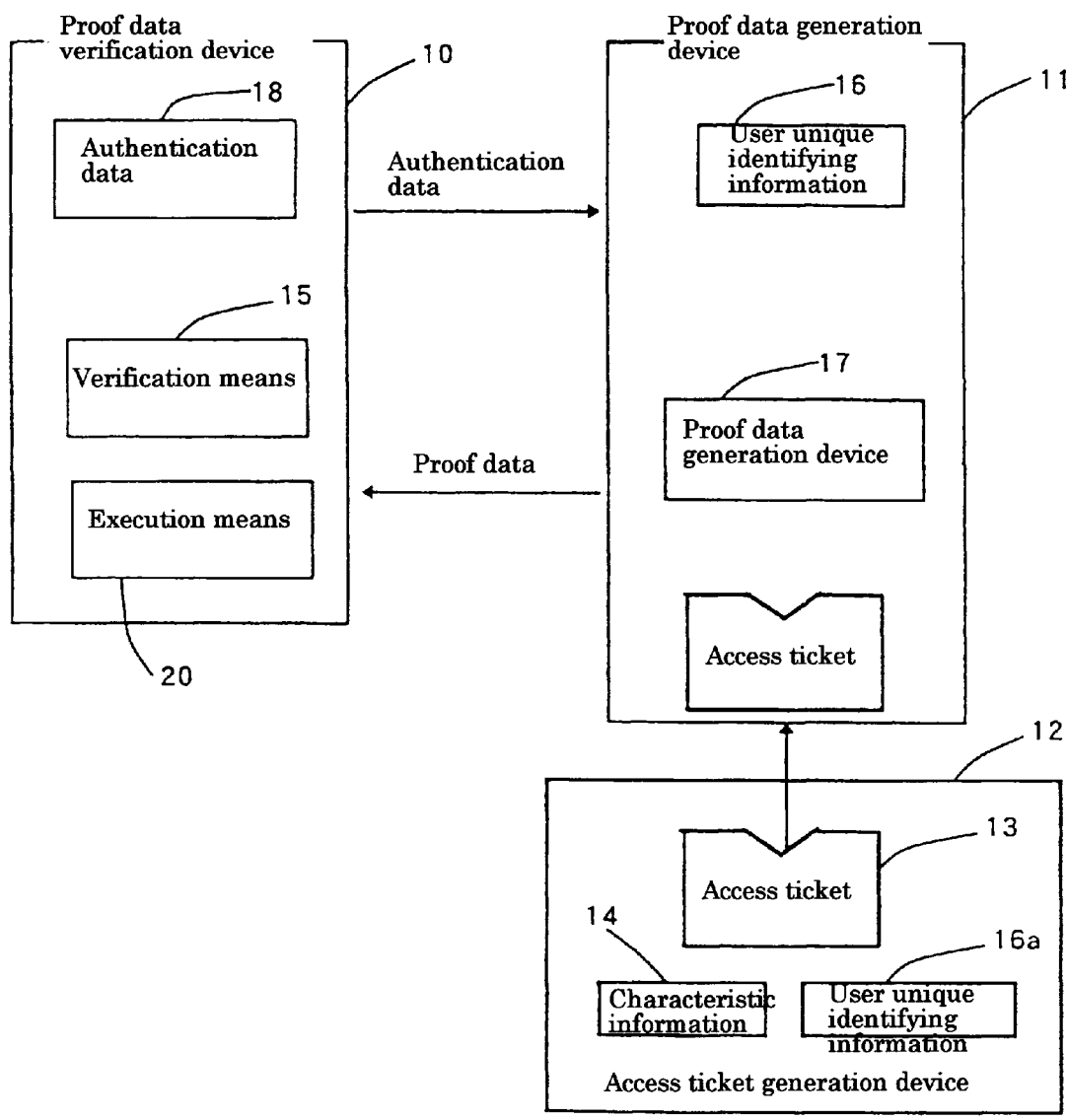
FIG. 1 is a block diagram showing an overall arrangement of a device for authenticating user's access rights to resources.

Initially, the manner in which the present invention is used to control the execution of a program which is operated on user's PC or workstation will be described. FIG. 1 is a block diagram showing an apparatus according to this embodiment.

As shown in FIG. 1, a device for authenticating user's access rights to resources according to this embodiment comprises a proof data verification device 10 and a proof data generation device 11. The proof data generation device 11 receives an access ticket (proof support data) 13 from an access ticket generation device 12. The proof data verification device 10 includes a verification means 15 for executing a verifying routine. The proof data generation device 11 holds user unique identifying information 16 and the access ticket 13 and includes a proof data generation means 17 (e.g. program).

The access ticket generation device 12 is disposed on the protect side such as an application programmer or independent third party organization. The access ticket generation device 12 generates an access ticket on the basis of unique security characteristic information 14 and user unique identifying information 16a. This access ticket 13 is sent to a user through a communication or by means of a floppy disk and stored in the proof data generation device 11 of the user. Thereafter, the proof data verification device 10 sends authentication data 18 to the proof data generation device 11. The proof data generation device 11 generates proof data 19 by use of the access ticket 13 and the user unique identifying information 16, and returns this proof data 19 to the proof data verification device 10. The proof data verification device 10 verifies a validity of proof data based on authentication data. That is, it is verified by the proof data verification device 10 whether or not the proof data is data which is generated based on the authentication data and the unique security characteristic information.

If the validity of proof data is verified, then the user access rights is verified, and an execution means 20 executes a predetermined processing, e.g. a program run or a file access permission in response to this verification.

In this embodiment, the proof data generation device 11 can be realized as a proof program on a computer used by the user. In that case, if inherent information (user unique identifying information) used to identify the user can be copied and distributed by the user, then even a user which does not have a valid access rights is allowed to use such application program. Therefore, as the inherent information, in order to protect the inherent information from being exploited by the user who has valid access rights, there can be used a proof hardware (IC card, board, etc.) attached to the computer and which has an anti-dump characteristic. In that case, if a hardware such as an IC card having a portability is used, then this is convenient for the user to operate a plurality of PCs and a workstation.

The proof data verification device 10 is arranged as a part of an application program used by the user. That is, when the user activates the application program on the PC or the workstation, the proof data verification device 10 described in the application program as a program is activated to communicate with the proof data generation device 11 to authenticating the user. The proof data verification device 10 enables the application program to be executed only when the communication is ended correctly.

In order for the user to use the application program in which the proof data verification device 10 is described, the user has to obtain proof support information (access ticket) issued to the user and which corresponds to the above-mentioned application program. The user registers the thus obtained access ticket on a proof data generation program installed on the PC or workstation. When the user unique identifying information is sealed into the IC card, for example, the IC card is attached to the PC or workstation. The access ticket may be disposed on the PC or workstation or placed into the IC card.

The proof data generation device 11 (composed of the program and the IC card on the PC or workstation) executes a calculation based on the user unique identifying information and the access ticket, and communicates with the proof data verification device 10 based on such calculation. Although user identification information is used in the calculation process, if the user identification information is leaked to the outside, there then arises a problem. Thus, at least a part of the above-mentioned program has to be protected by a protecting means such as an IC card.

As a result of communication, the authentication done by the proof data verification device becomes successful only when the user unique identifying information, the access ticket the unique security characteristic information verified by the proof data verification device 10 are made corresponding to each other correctly.

When one of the user unique identifying information and the access ticket is not made corresponding, the authentication does not succeed.

The access ticket is issued to a particular user. That is, when the access ticket is generated, there is used user unique identifying information of a particular user. When user unique identifying information used when the access ticket is generated and the user unique identifying information used by the proof data generation device are not made corresponding to each other, the authentication does not succeed, either.

Moreover, the access ticket is generated based on feature information of particular access rights authentication, and the proof data verification device 10 is arranged so as to authenticating the feature information of the access rights authentication. Accordingly, also when the feature information used to generate the access ticket and feature information that is authenticated by the proof data verification device 10 described in the application program are not made corresponding to each other, the authentication does not succeed, either.

Also, the application program may be executed on another computer connected via a network and an executed result may be communicated through the network the user's computer. In this case, the computer system is arranged on the basis of a so-called server/client model. In the case of the execution control of the application program executed on the PC or workstation of the user, a communication between the proof data generation device 11 and the proof data verification device 10 is executed as a so-called interprocess communication. On the other hand, in accordance with the server/client model, a communication between the proof data generation device and the proof data verification device is executed as a communication which is executed in accordance with a network protocol such as TCP/IP.

Also when the application program is arranged on an exclusively-designed apparatus, the present invention can be applied to such case. For example, the whole of the proof data generation device 11 is mounted within the IC card, and an access ticket thus obtained also is registered on the IC card. While the proof data verification device 10 is mounted on the above-mentioned exclusively-designed apparatus, such exclusively-designed apparatus includes a slot in which the IC card is inserted. Thus, the user can execute the authentication by inserting a user's IC card into the slot.

The arrangement based on such exclusively-designed apparatus can be applied to ATMs of banks, game machines in an amusement arcade and the like.

In order for the user to obtain an access ticket, there are known a method in which a common center which issues access tickets generates and distributes access tickets in response to an issue request from the user and a method in which a programmer of an application program generates access tickets with an aide of an access ticket issue program and the access ticket generation device 12.

In such case, the access ticket generation device 12 is managed by those who issue access tickets. The access tickets are generated and distributed by those who have a right for issuing access tickets independently of user's circumstances.

Although the access ticket thus generated may be distributed to the user through a portable type storage medium such as a floppy disk, since the access ticket has sufficient safety, the access ticket may be distributed to the user through the network by use of an electronic mail.

The safety of the access ticket has the following two features:

1) The access ticket is of the signed type. Specifically, only the user (more precisely, the user who has user unique identifying information used when the access ticket is generated) to which the access ticket is issued is able to correctly operate the proof data generation device 11 by use of the access ticket. Accordingly, even when a third person with ill intention illegally obtains an access ticket of other user, such third person cannot use this access ticket so long as the third person does not obtain user unique identifying information of the correct user who issues the access ticket.

2) The access ticket has a more strict safety. Specifically, even when a third person with ill intention collects access tickets of an arbitrary number and analyzes the collected access tickets, the third person with ill intention cannot forge other access tickets based on the information thus obtained and cannot arrange an apparatus which is able to imitate the operation of the proof data generation device 11 to establish the authentication.

The present invention will be described below with reference to specific embodiments. Sheets of drawings showing the proof data generation device and the verification device and sheets of drawings used to explain operations of the proof data generation device and the verification device are as follows:

TABLE 1

Figure 2:
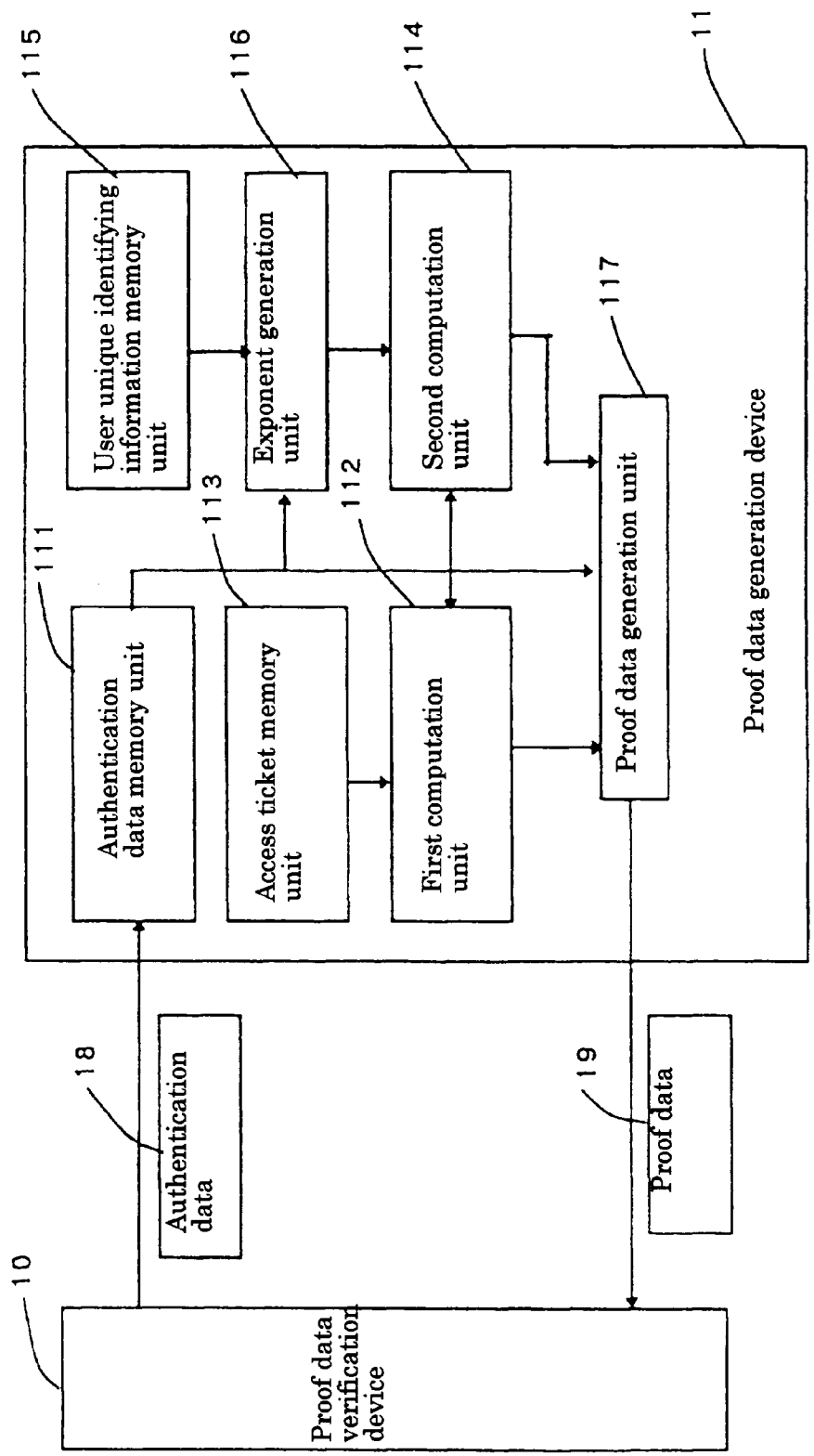
FIG. 2 is a block diagram showing a proof data generation device using an ElGamal cipher.
Figure 3:
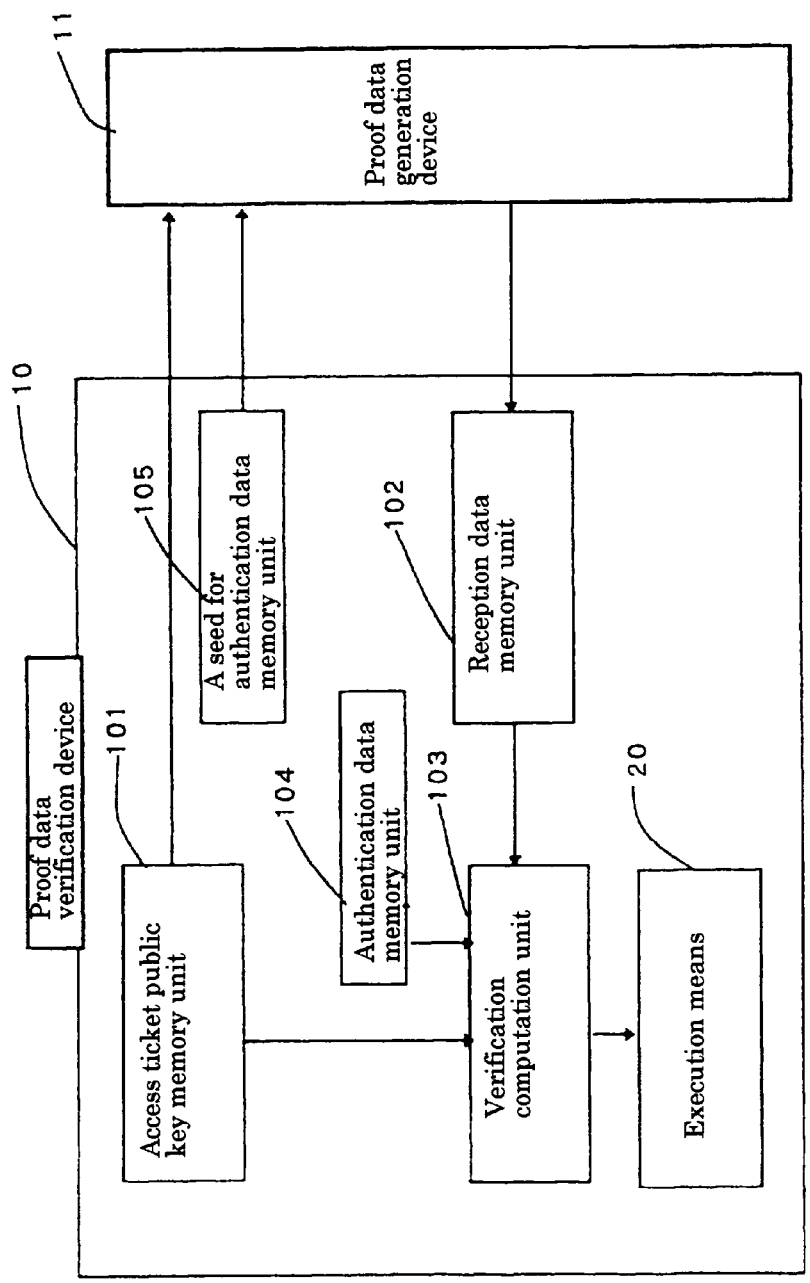
FIG. 3 is a block diagram showing a first proof data verification device.
Figure 4:
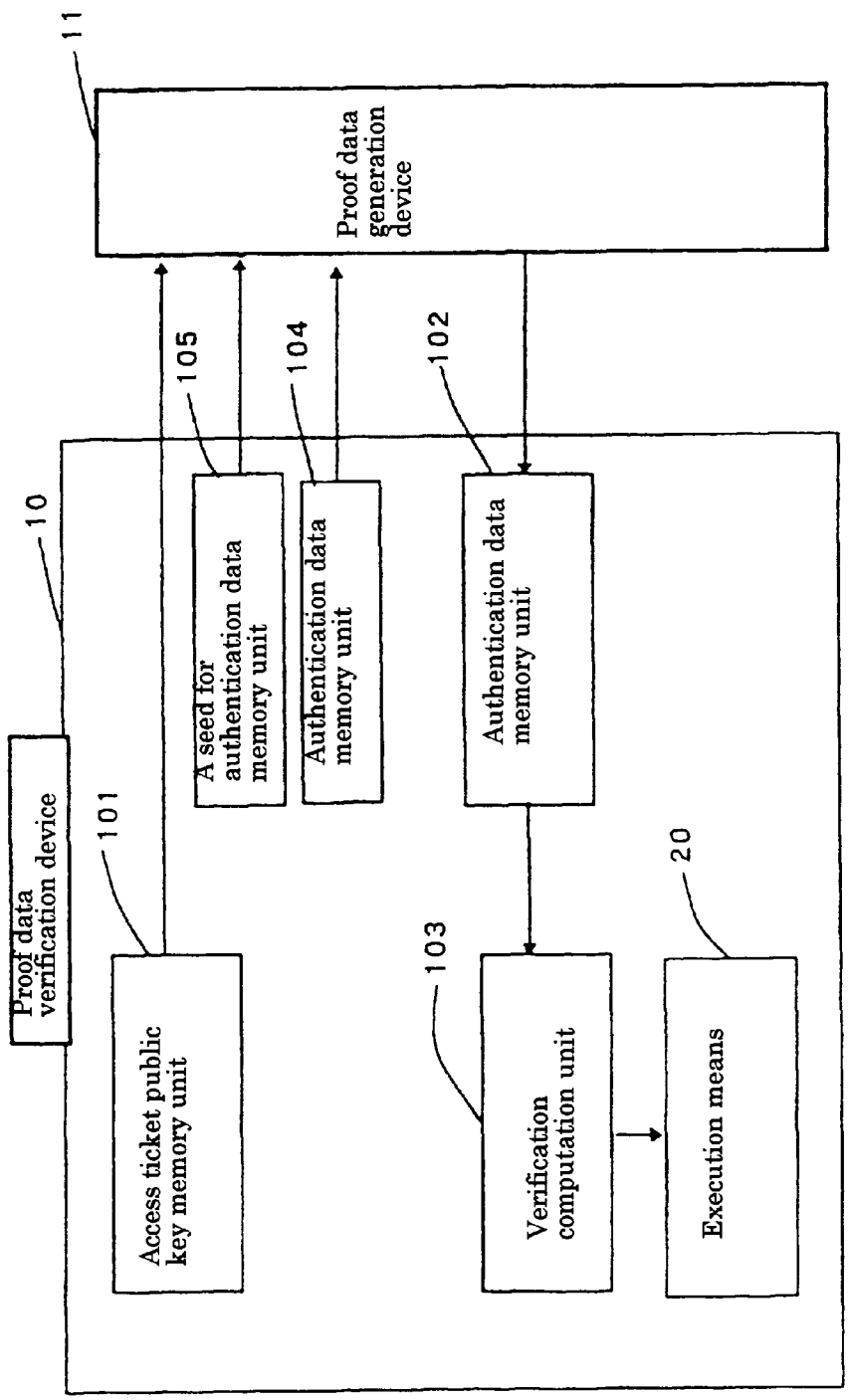
FIG. 4 is a block diagram showing a second proof data verification device.
Figure 5:
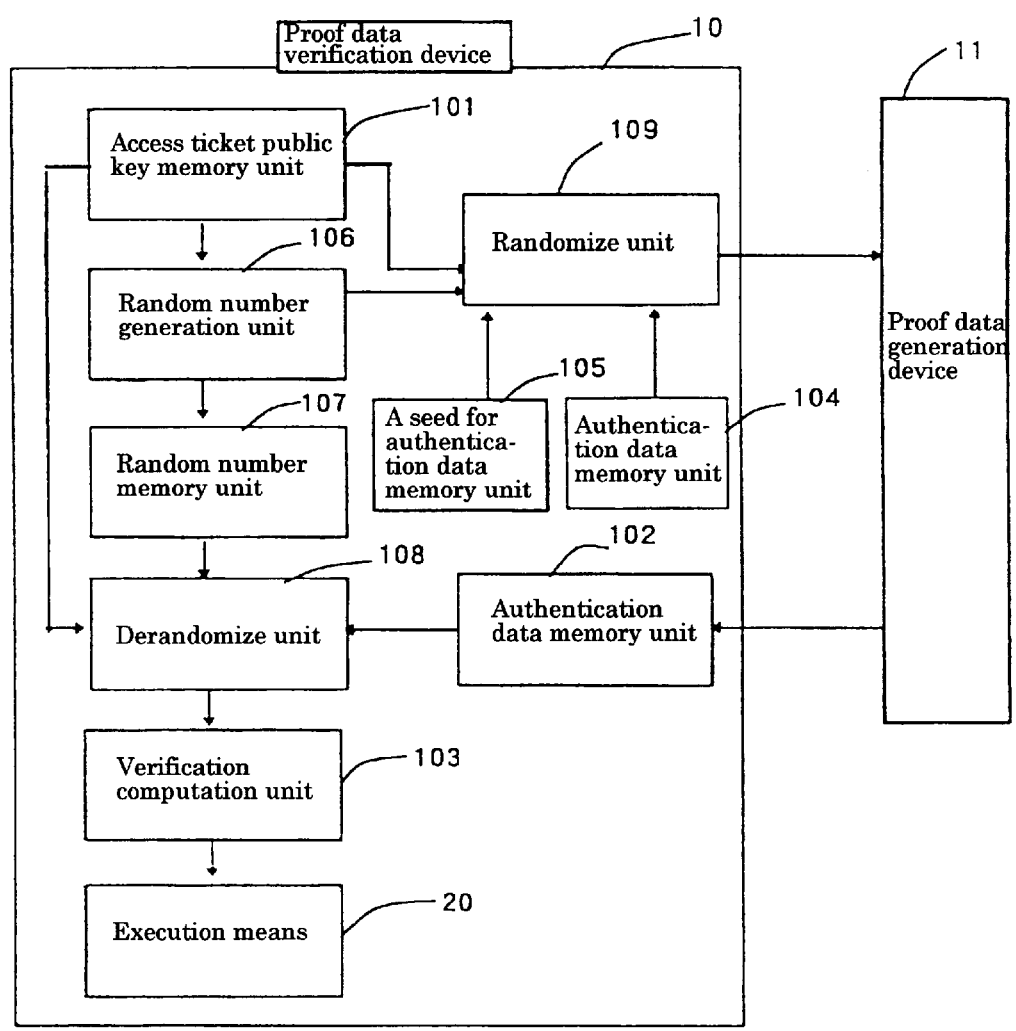
FIG. 5 is a block diagram showing a third proof data verification device.
Figure 6:
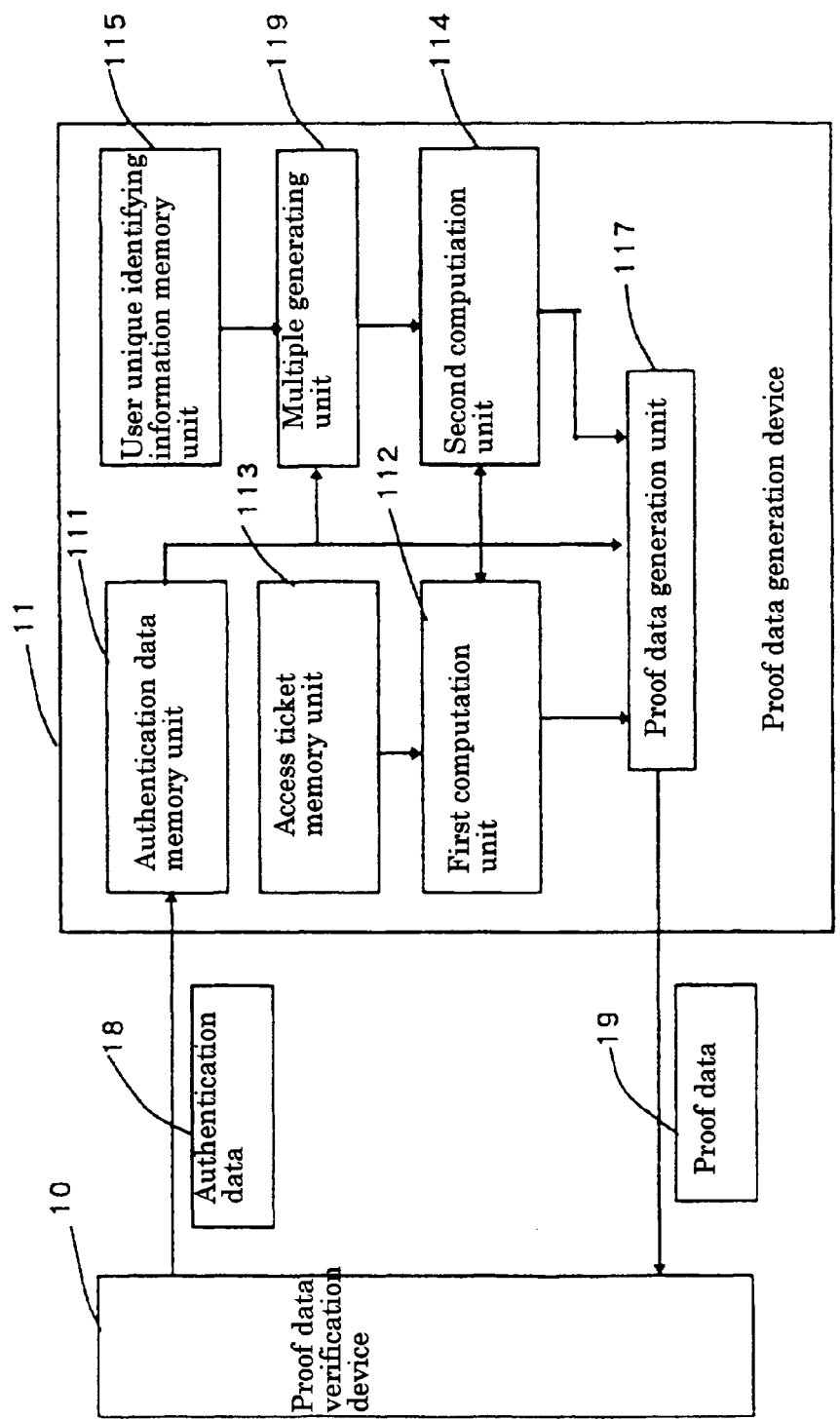
FIG. 6 is a block diagram showing a proof data generation device using an elliptic curve cipher.
Figure 7:
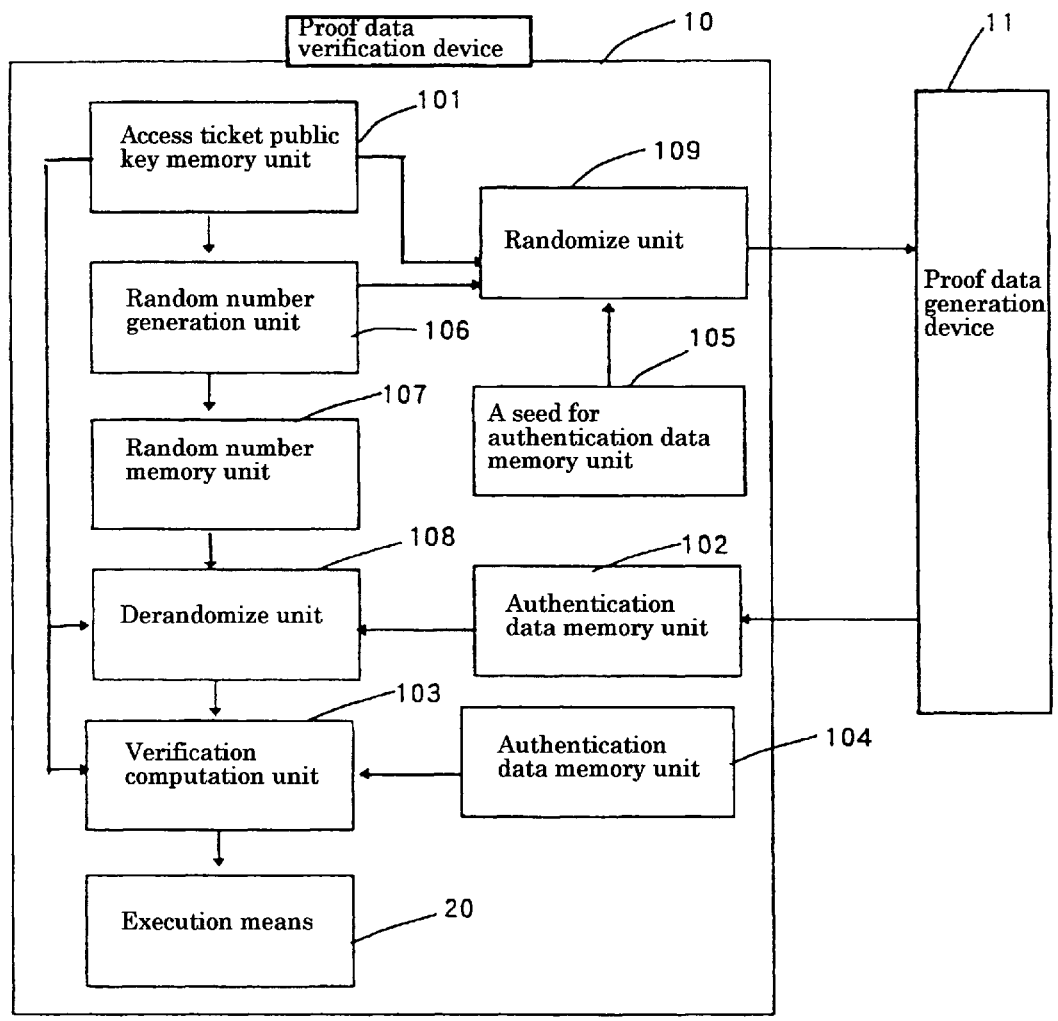
FIG. 7 is a block diagram showing a fourth proof data verification device.
Figure 8:
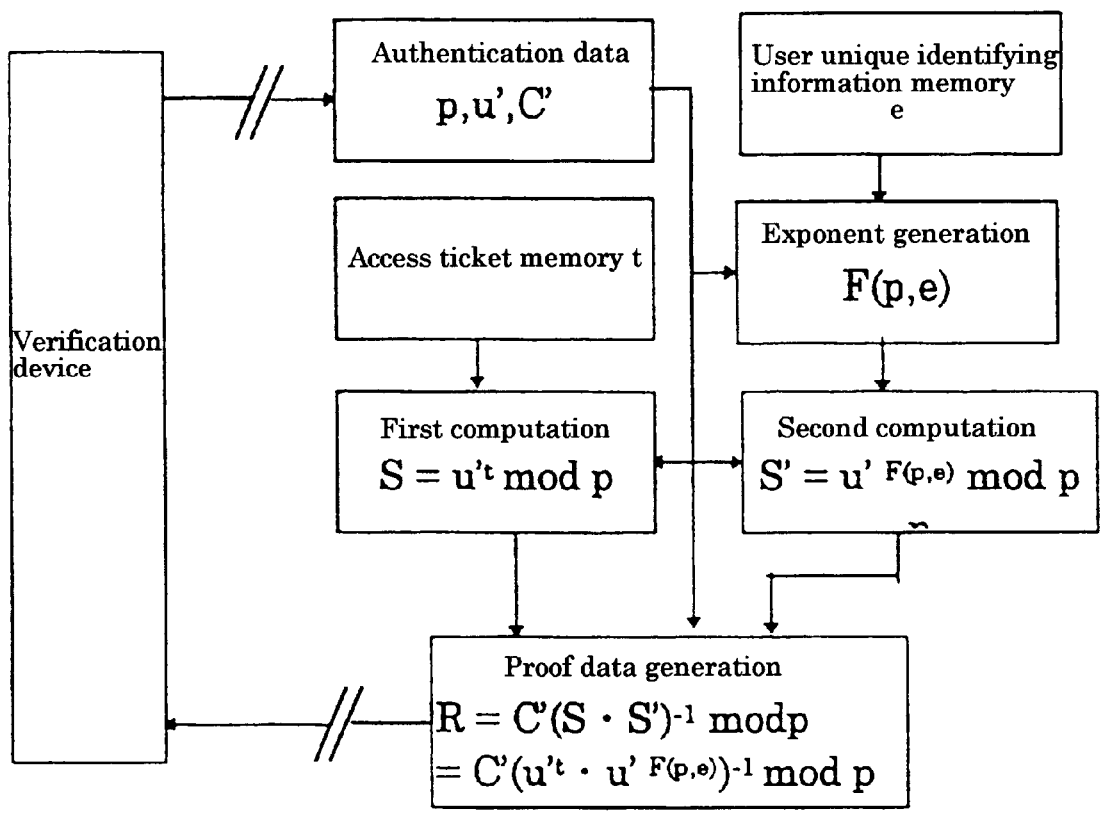
FIG. 8 is a diagram showing an operation of the proof data generation device according to the embodiments 3 and 5.
Figure 9:
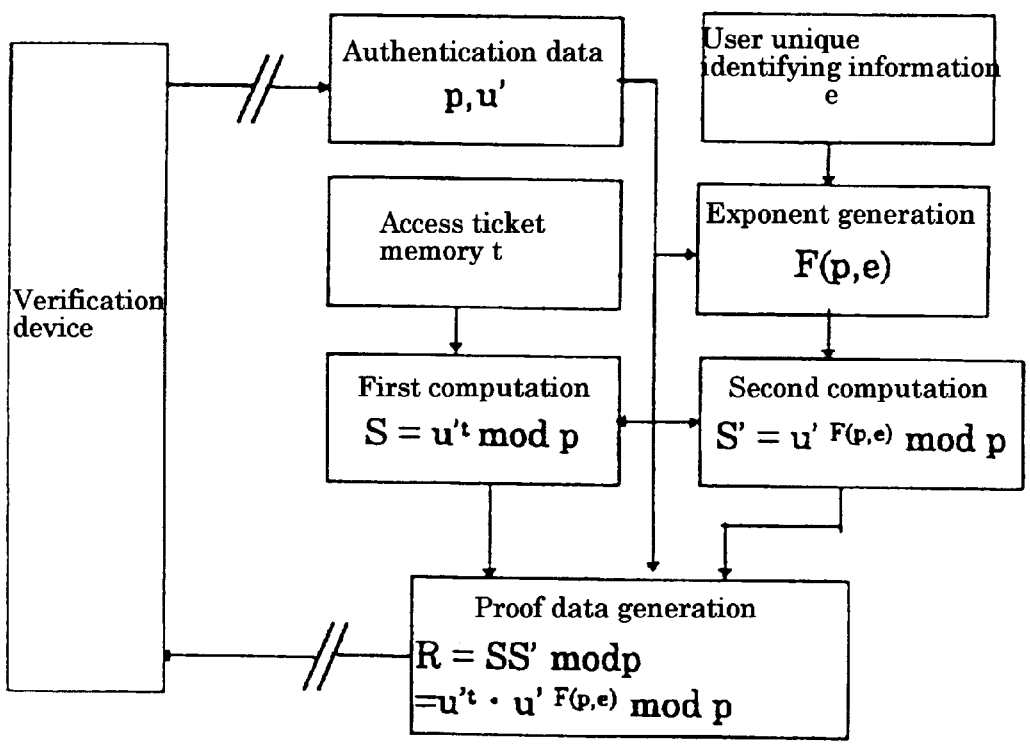
FIG. 9 is a diagram showing an operation of the proof data generation device according to the embodiments 1, 2 and 4.
Figure 10:
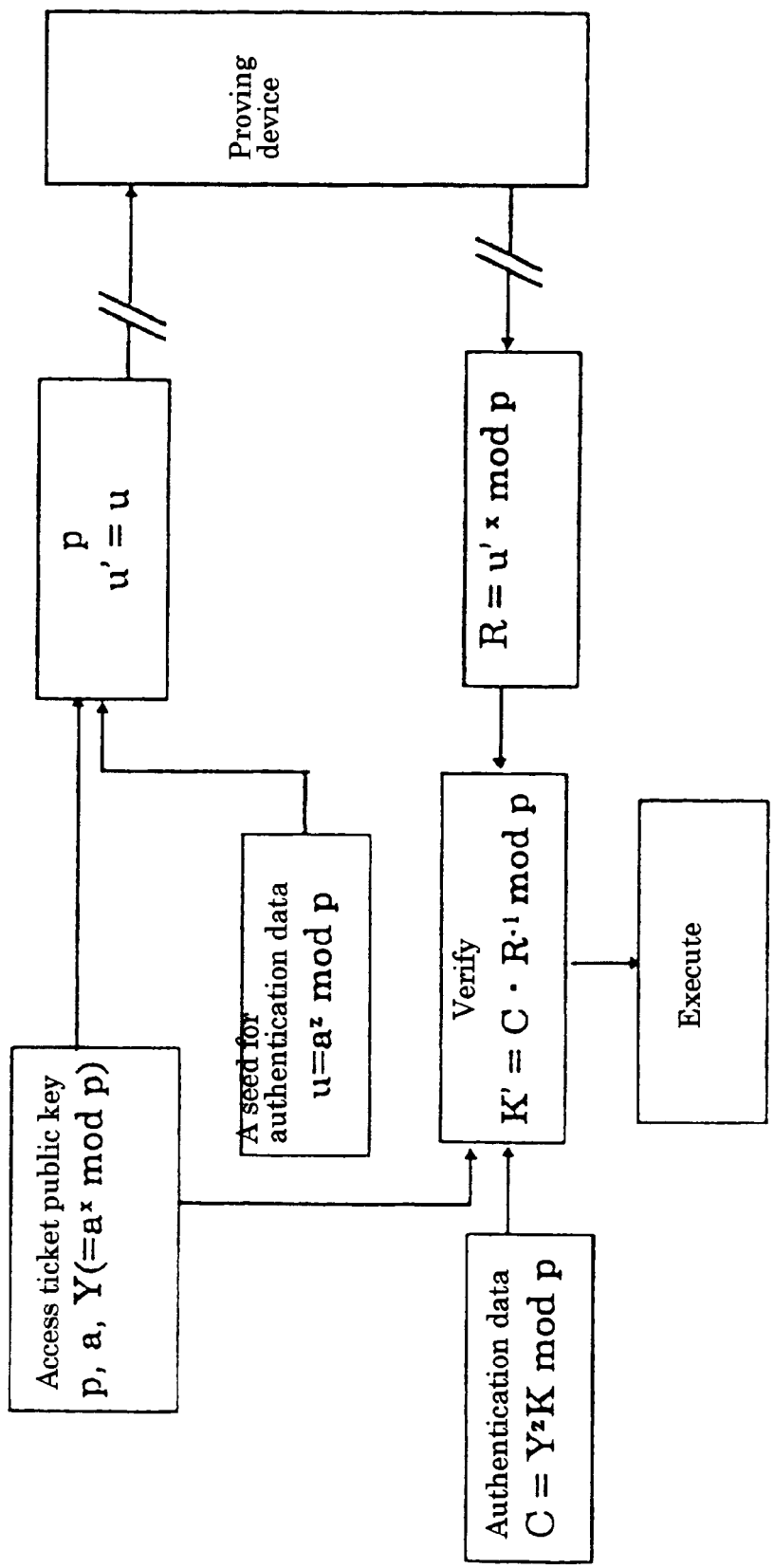
FIG. 10 is a diagram showing an operation of a proof data verification device according to the embodiment 1.
Figure 11:
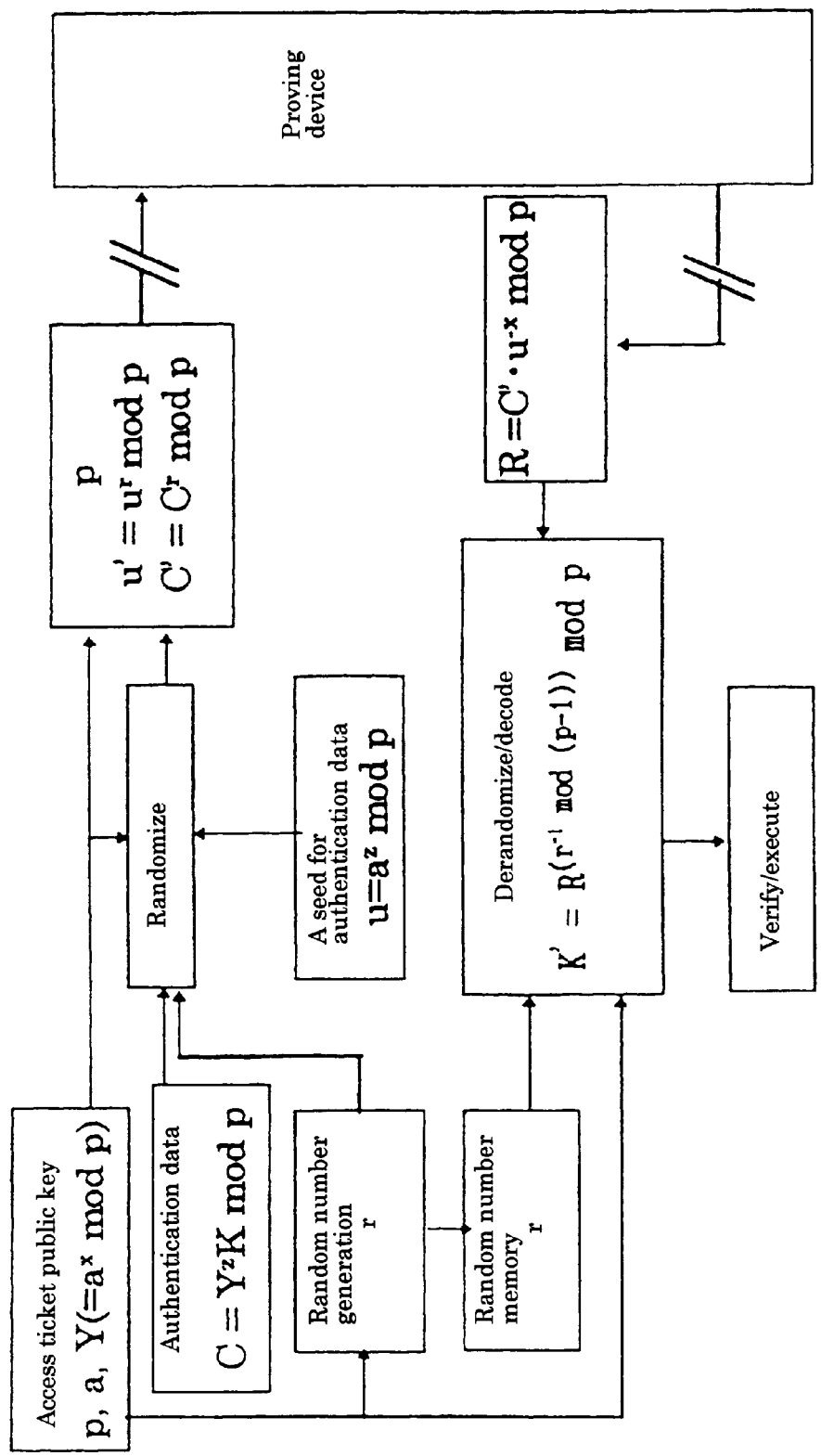
FIG. 11 is a diagram showing an operation of a proof data verification device according to the embodiment 3.
Figure 12:
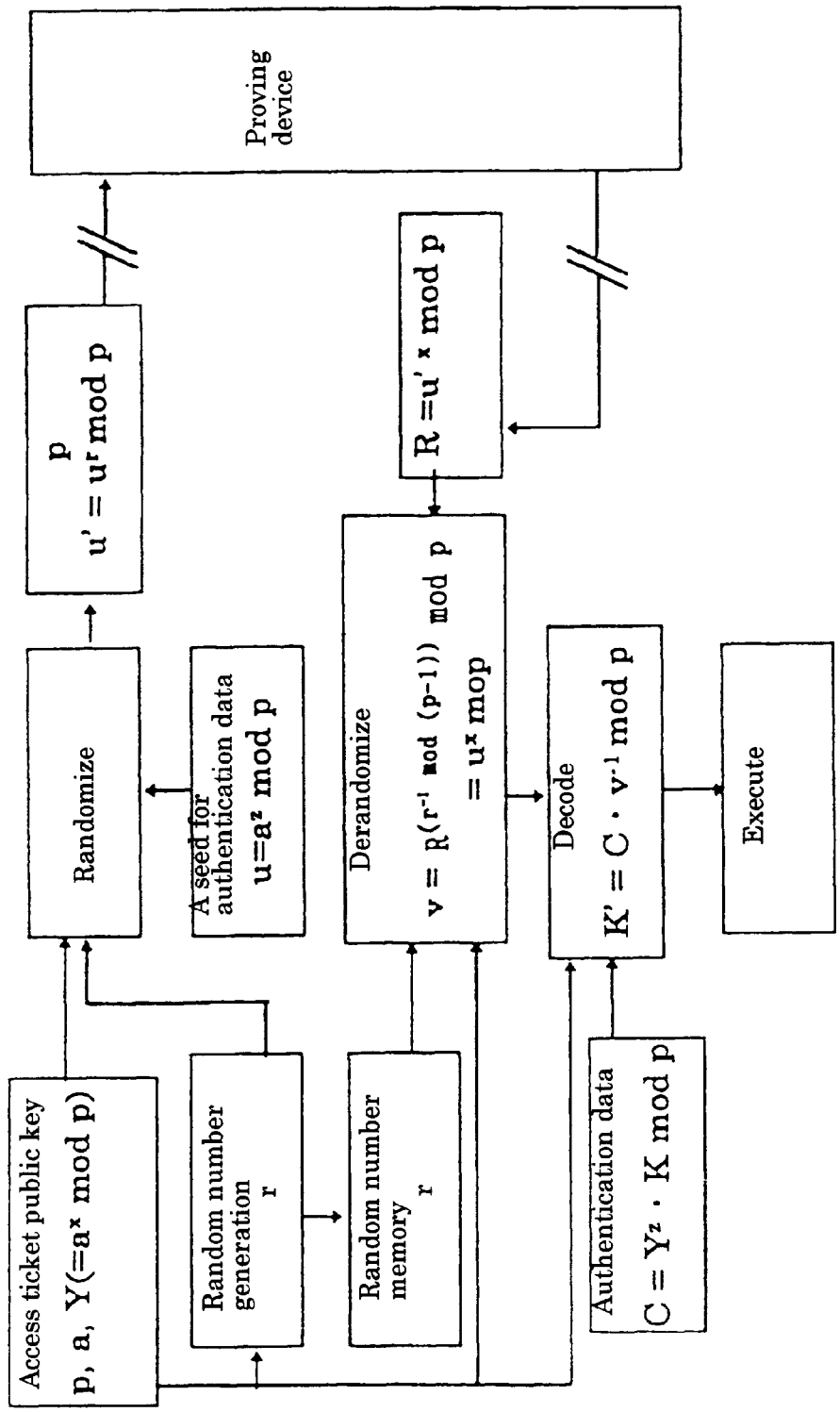
FIG. 12 is a diagram showing an operation of a proof data verification device according to the embodiment 2.
Figure 13:
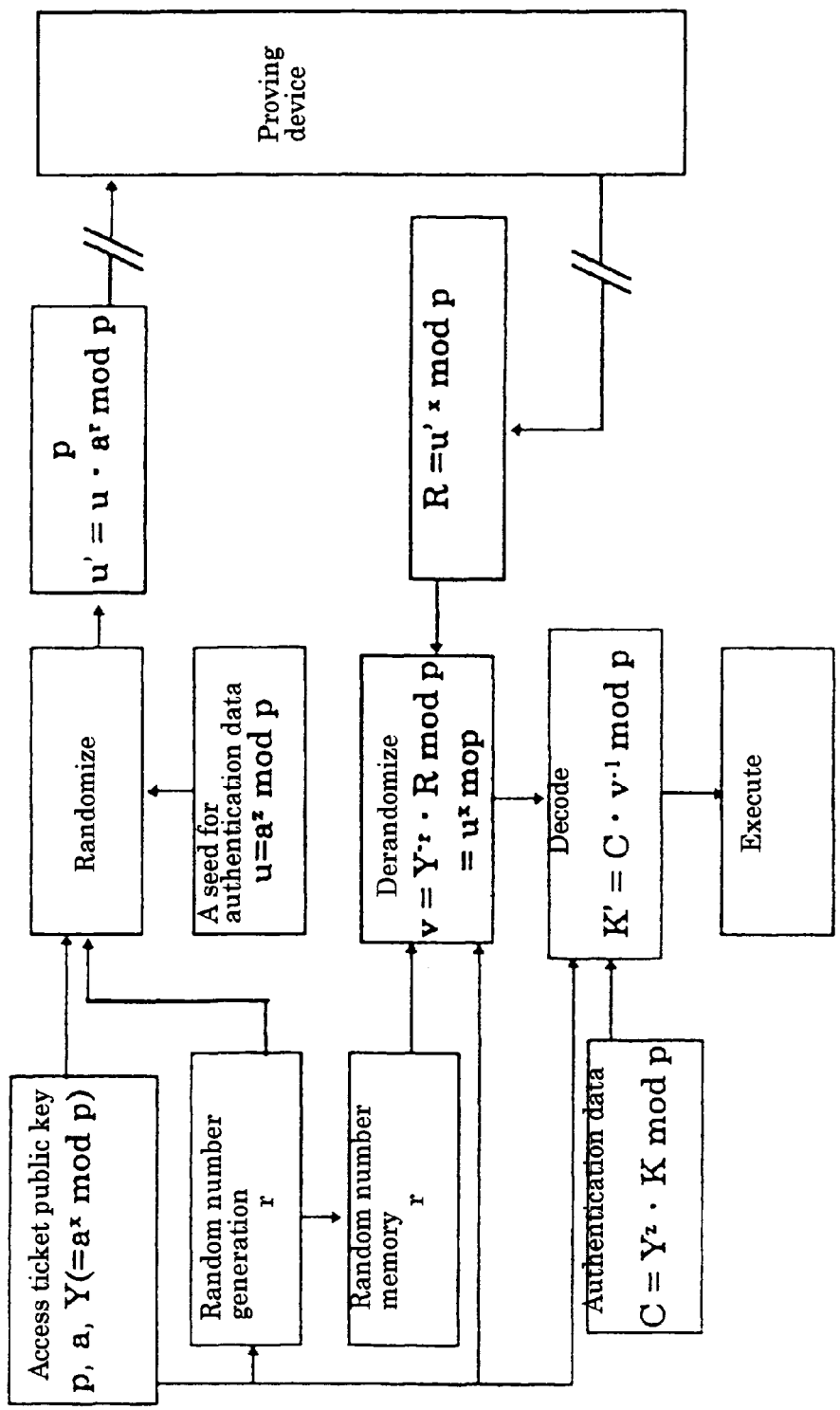
FIG. 13 is a diagram showing an operation of a proof data verification device according to the embodiment 4.
Figure 14:
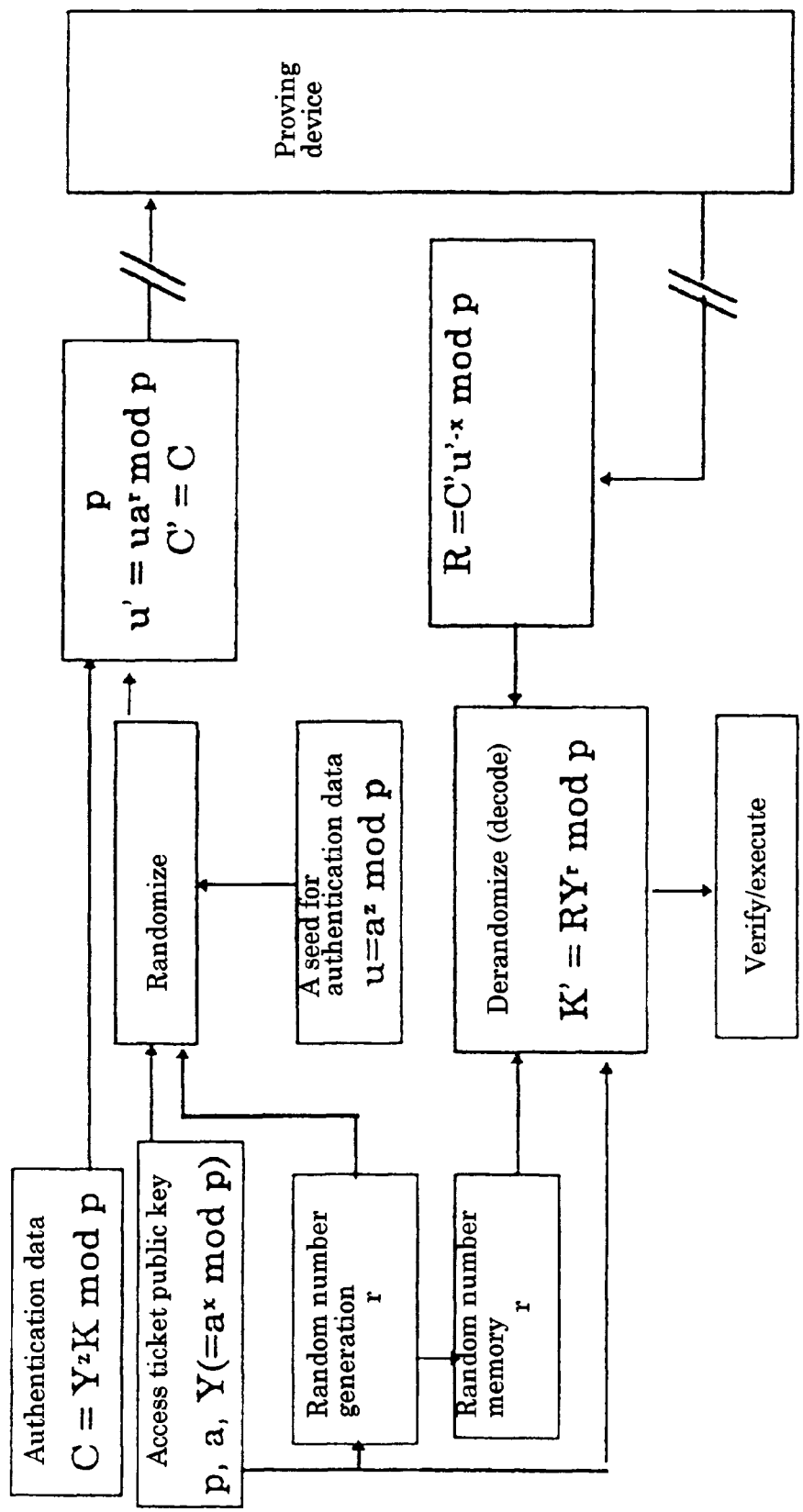
FIG. 14 is a diagram showing an operation of a proof data verification device according to the embodiment 5.
Figure 15:
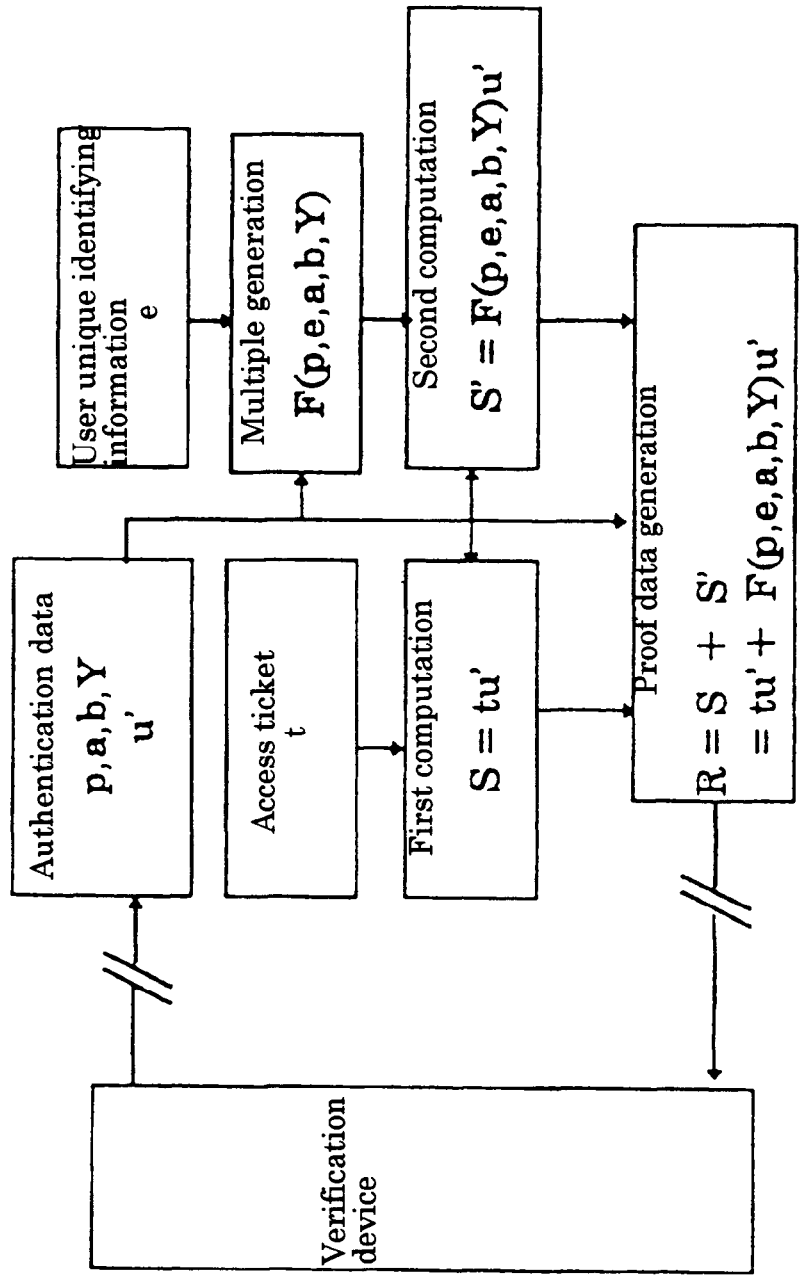
FIG. 15 is a diagram showing an operation of a proof data generation device according to embodiments 12, 17, and 18.
Figure 16:
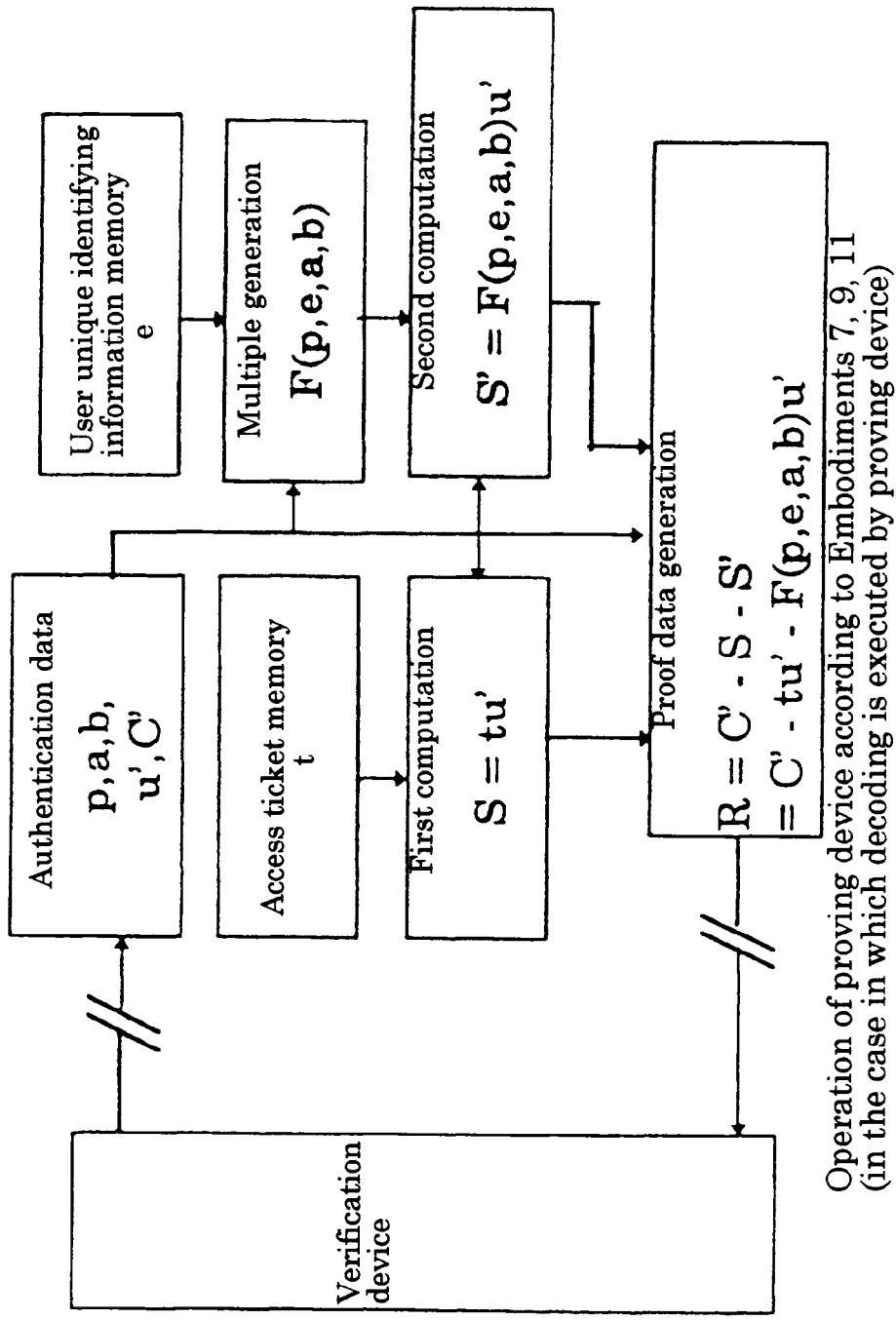
FIG. 16 is a diagram showing an operation of a proof data generation device according to embodiments 7, 9, and 11.
Figure 17:
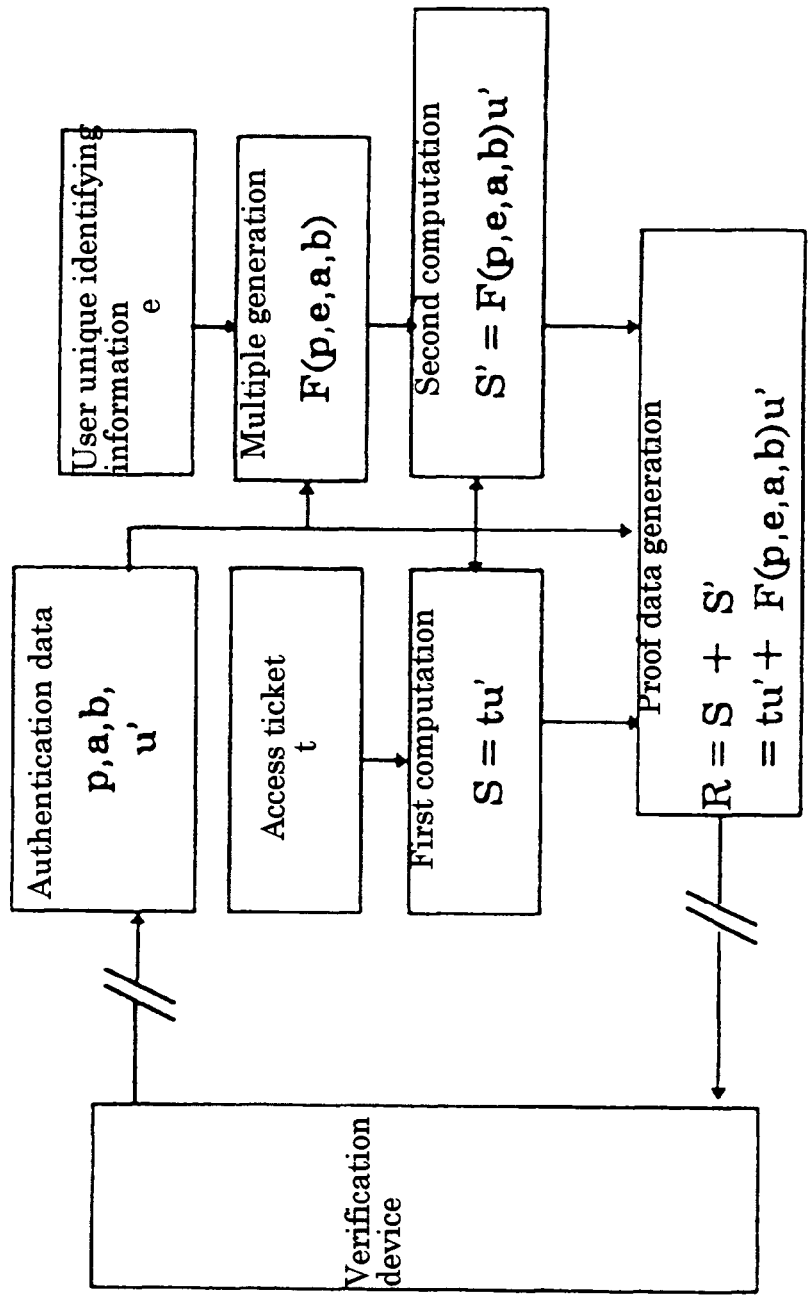
FIG. 17 is a diagram showing an operation of a proof data generation device according to embodiments 6, 7, 10, 13, 15, and 16.
Figure 18:
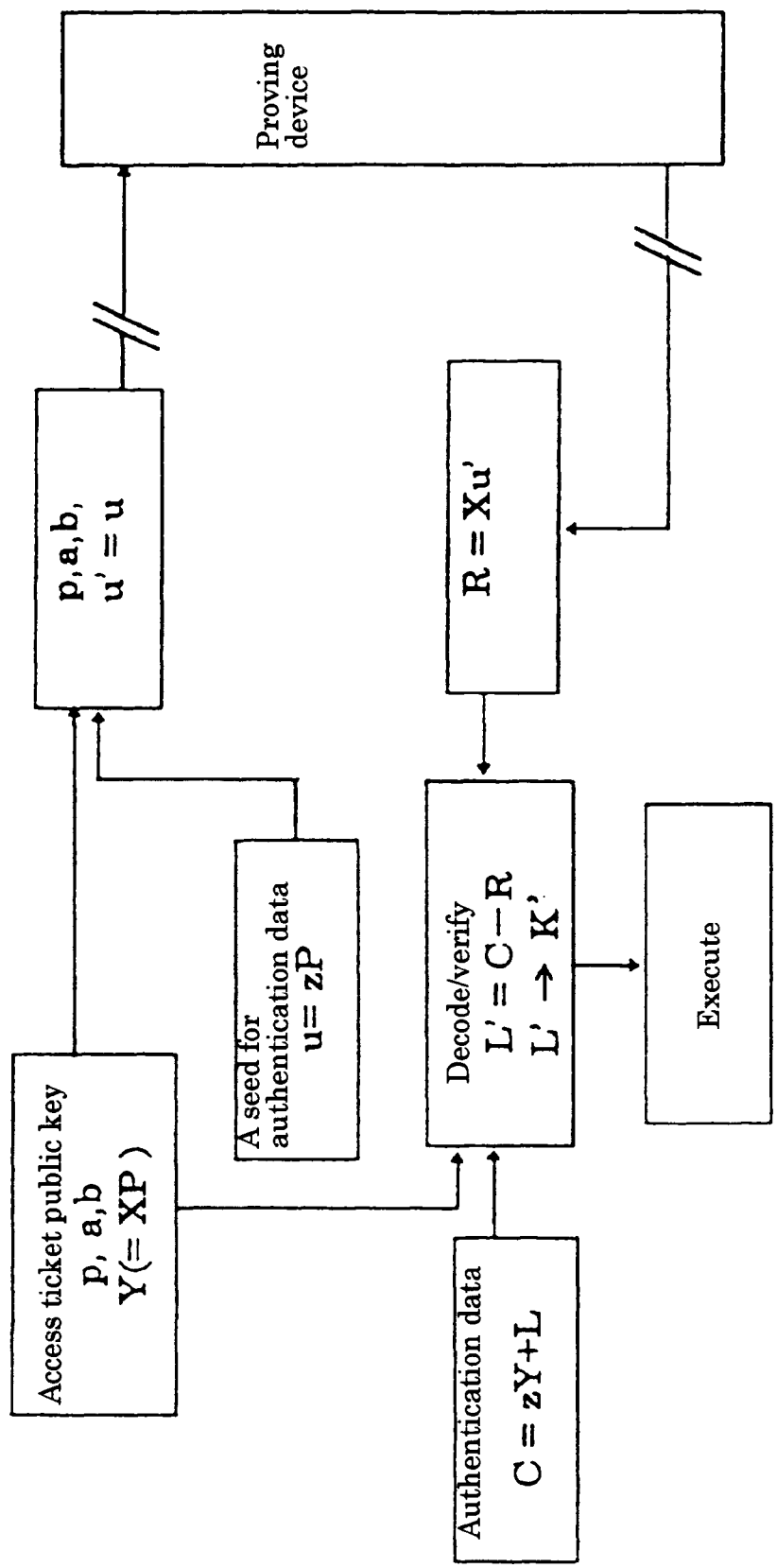
FIG. 18 is a diagram showing an operation of a proof data verification device according to the embodiment 6.
Figure 19:
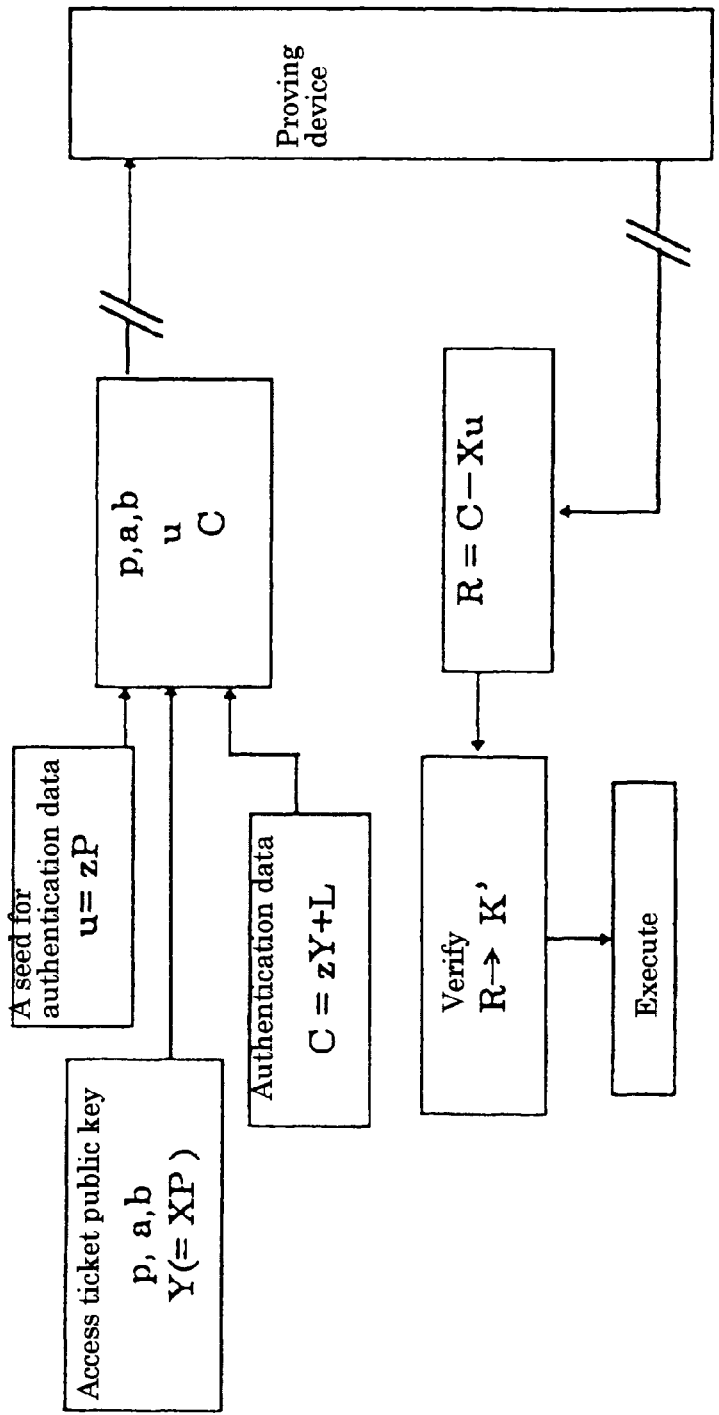
FIG. 19 is a diagram showing an operation of a proof data verification device according to the embodiment 7.
Figure 20:
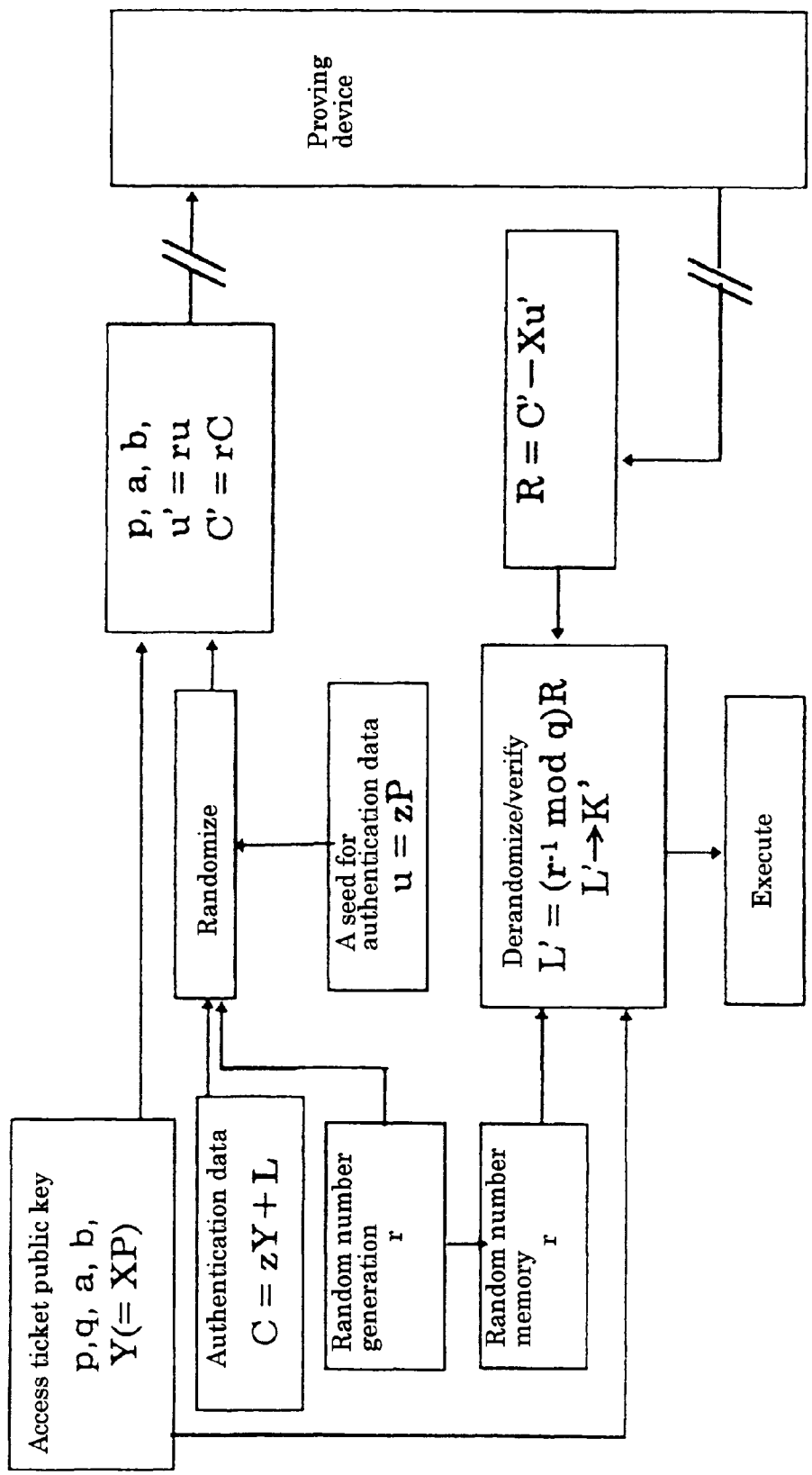
FIG. 20 is a diagram showing an operation of a proof data verification device according to the embodiment 9.
Figure 21:
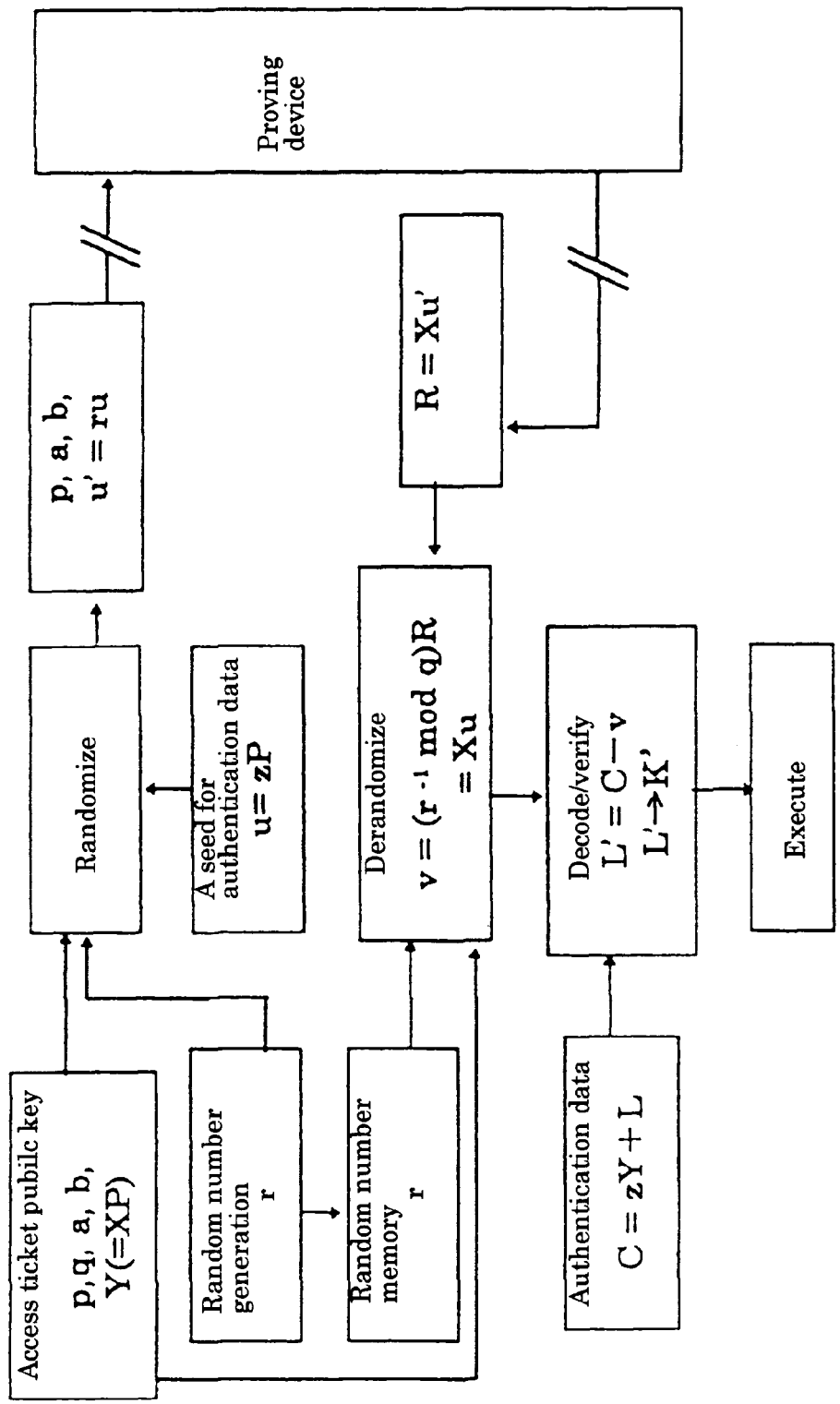
FIG. 21 is a diagram showing an operation of a proof data verification device according to the embodiment 8.
Figure 22:
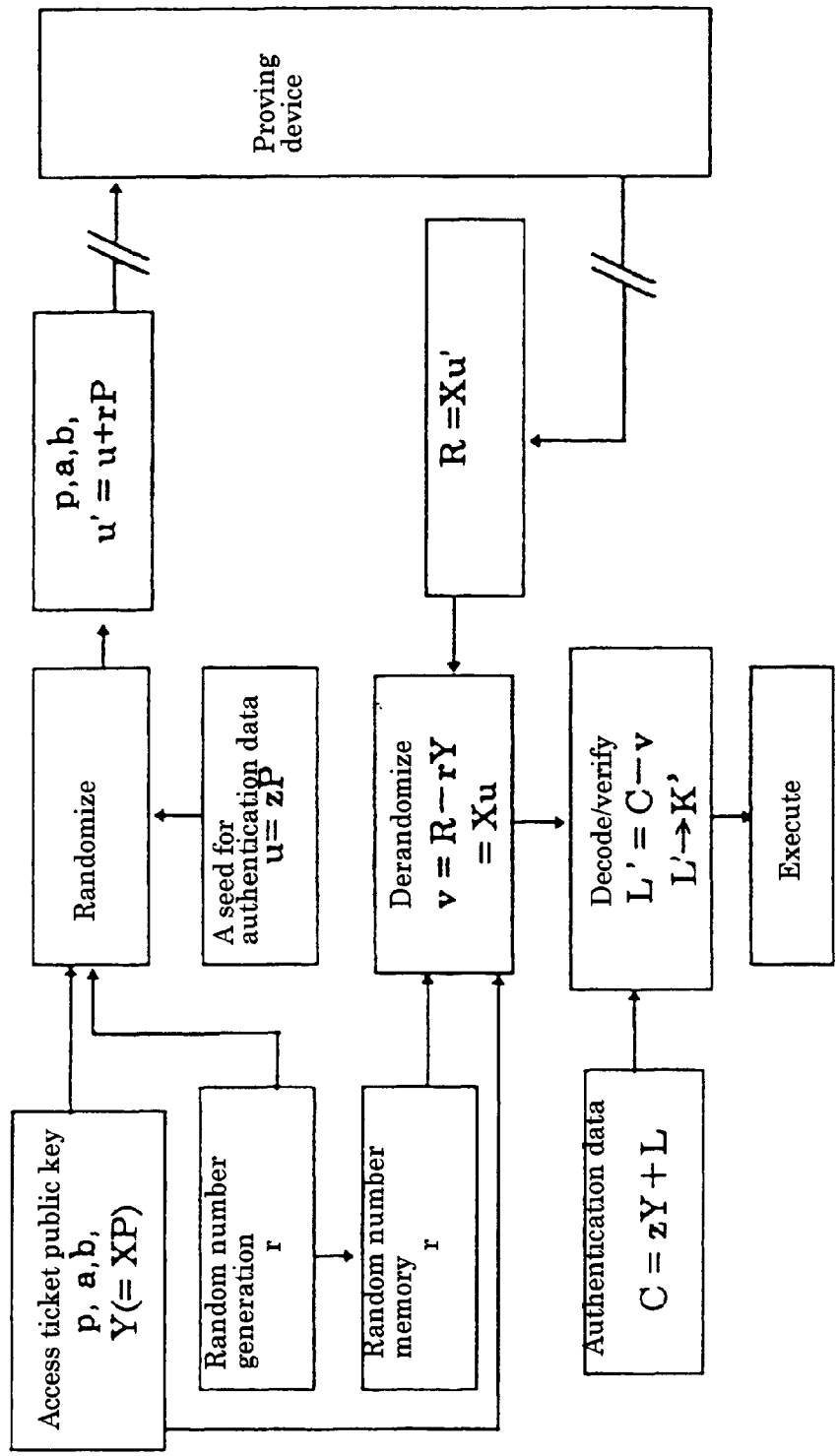
FIG. 22 is a diagram showing an operation of a proof data verification device according to the embodiment 10.
Figure 23:
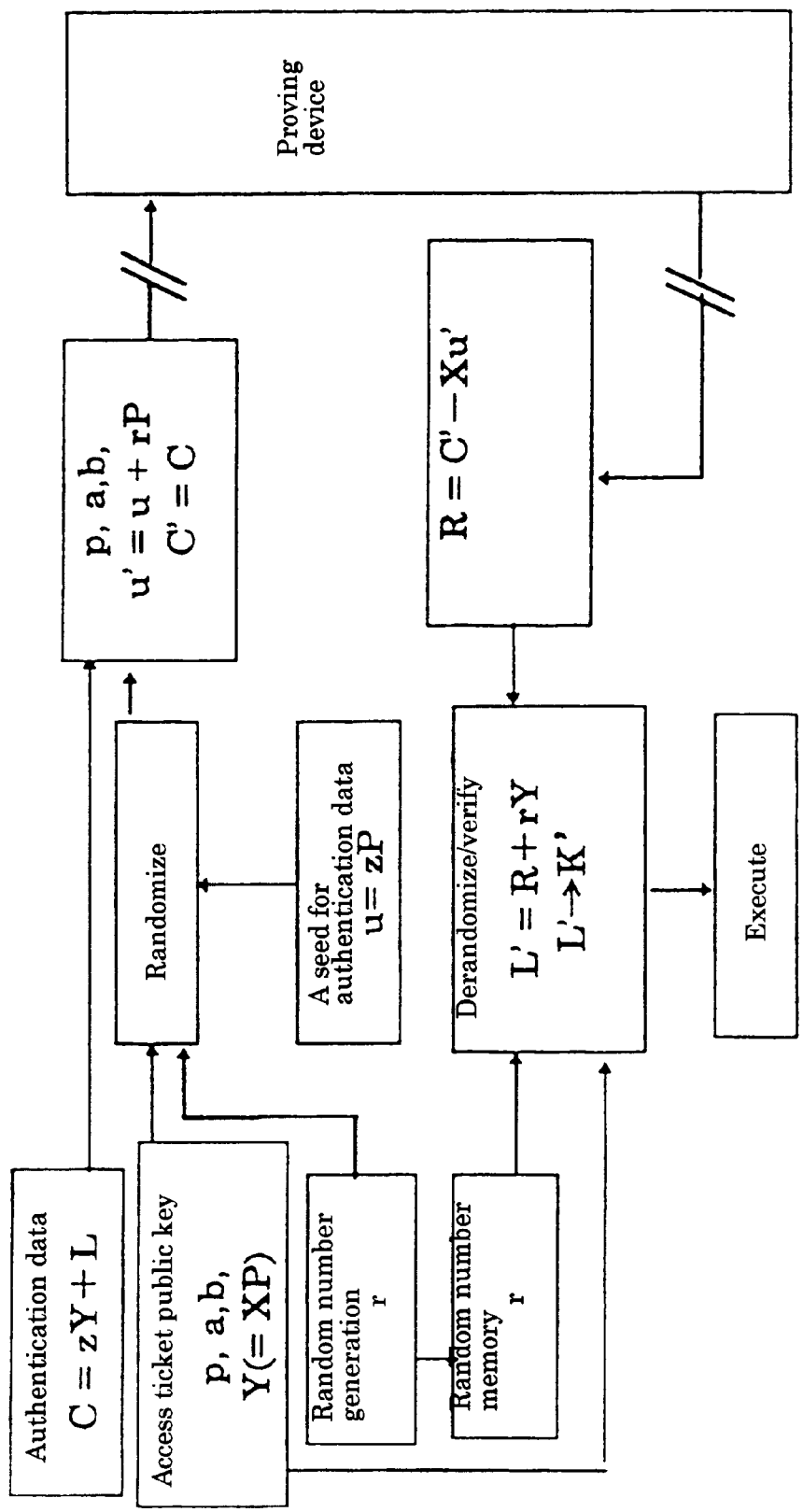
FIG. 23 is a diagram showing an operation of a proof data verification device according to the embodiment 11.
Figure 24:
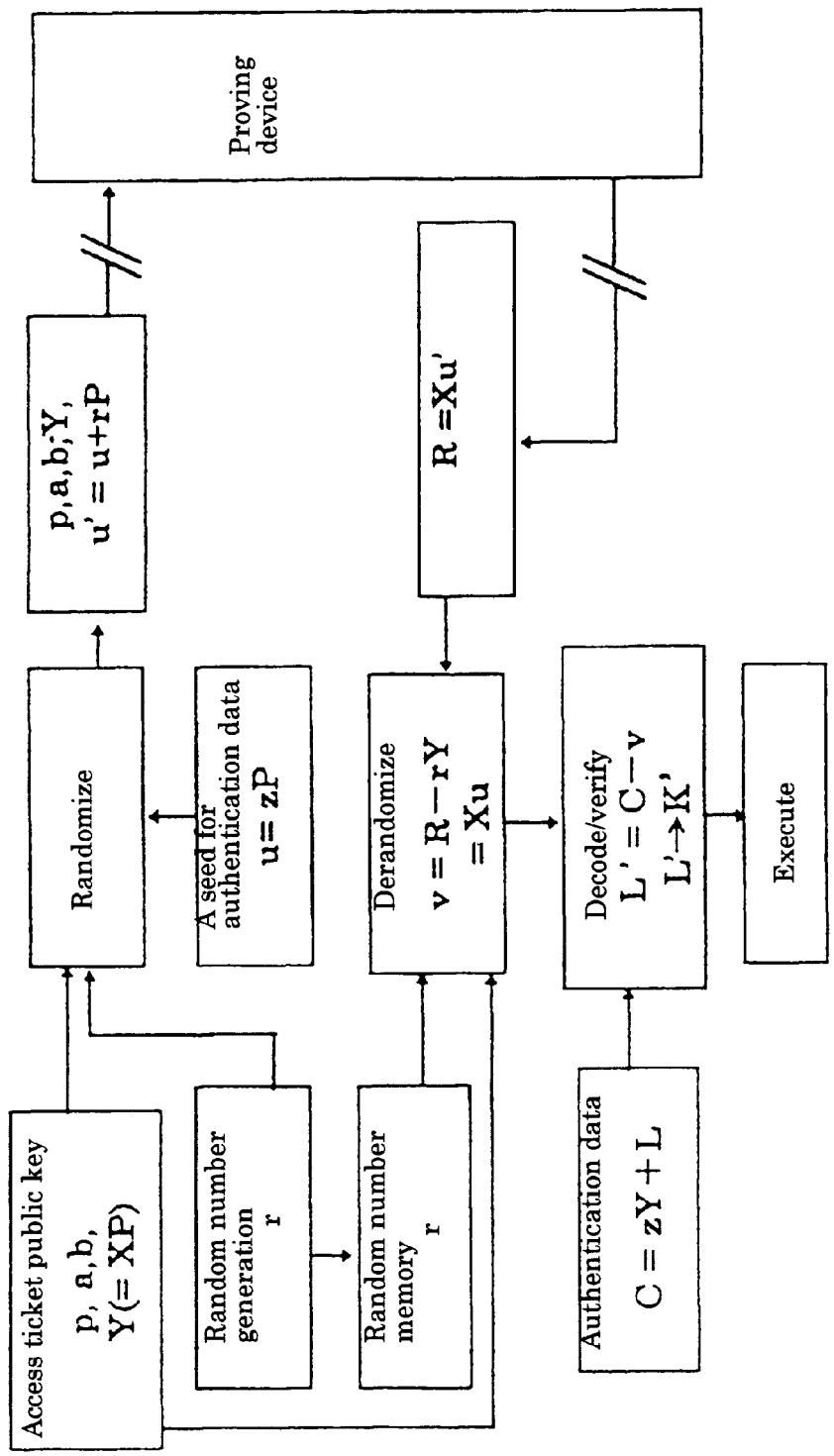
FIG. 24 is a diagram showing an operation of a proof data verification device according to the embodiment 12.
Figure 31:
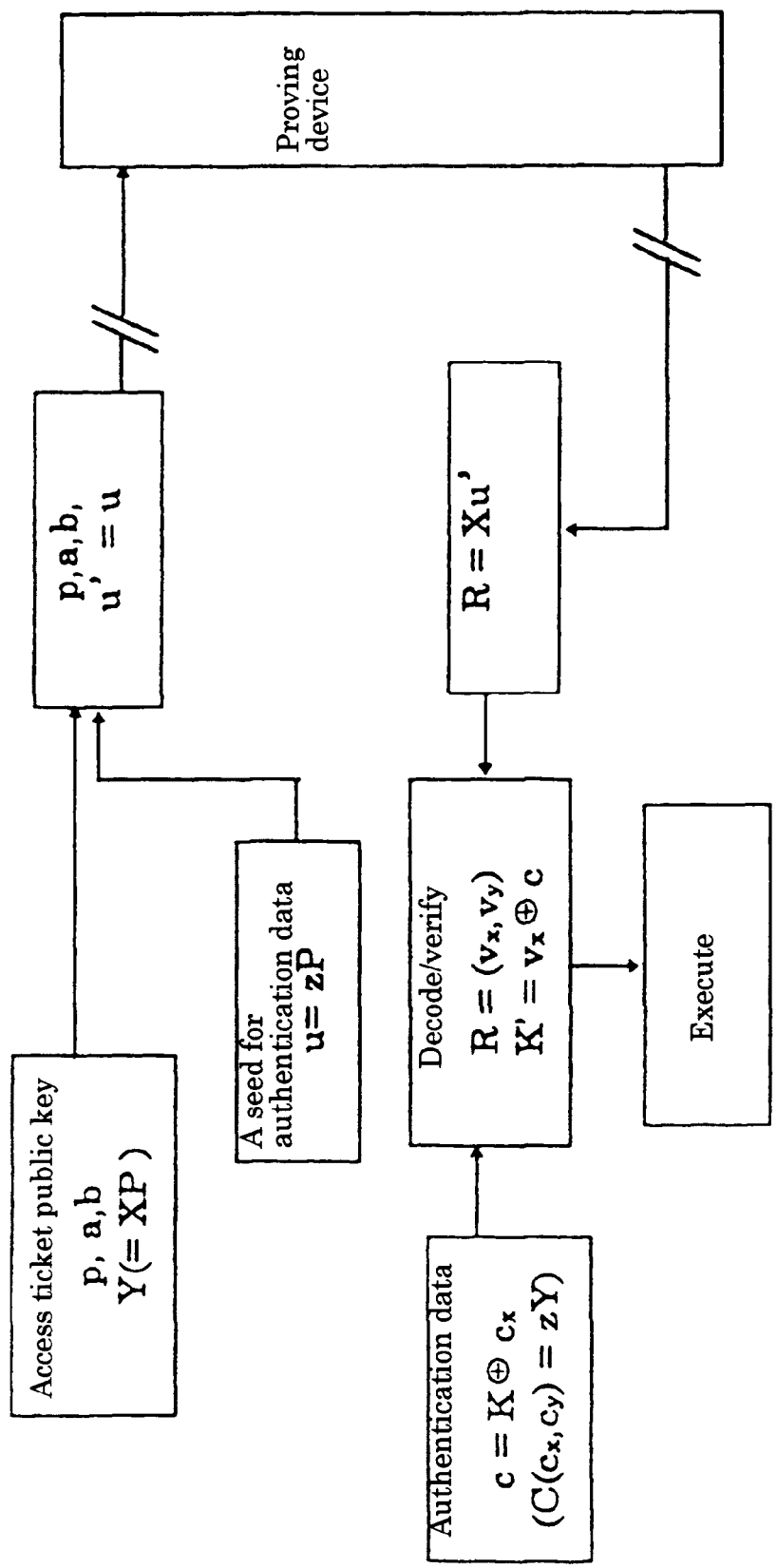
FIG. 31 is a diagram showing an operation of a proof data verification device according to an embodiment 13.
Figure 32:
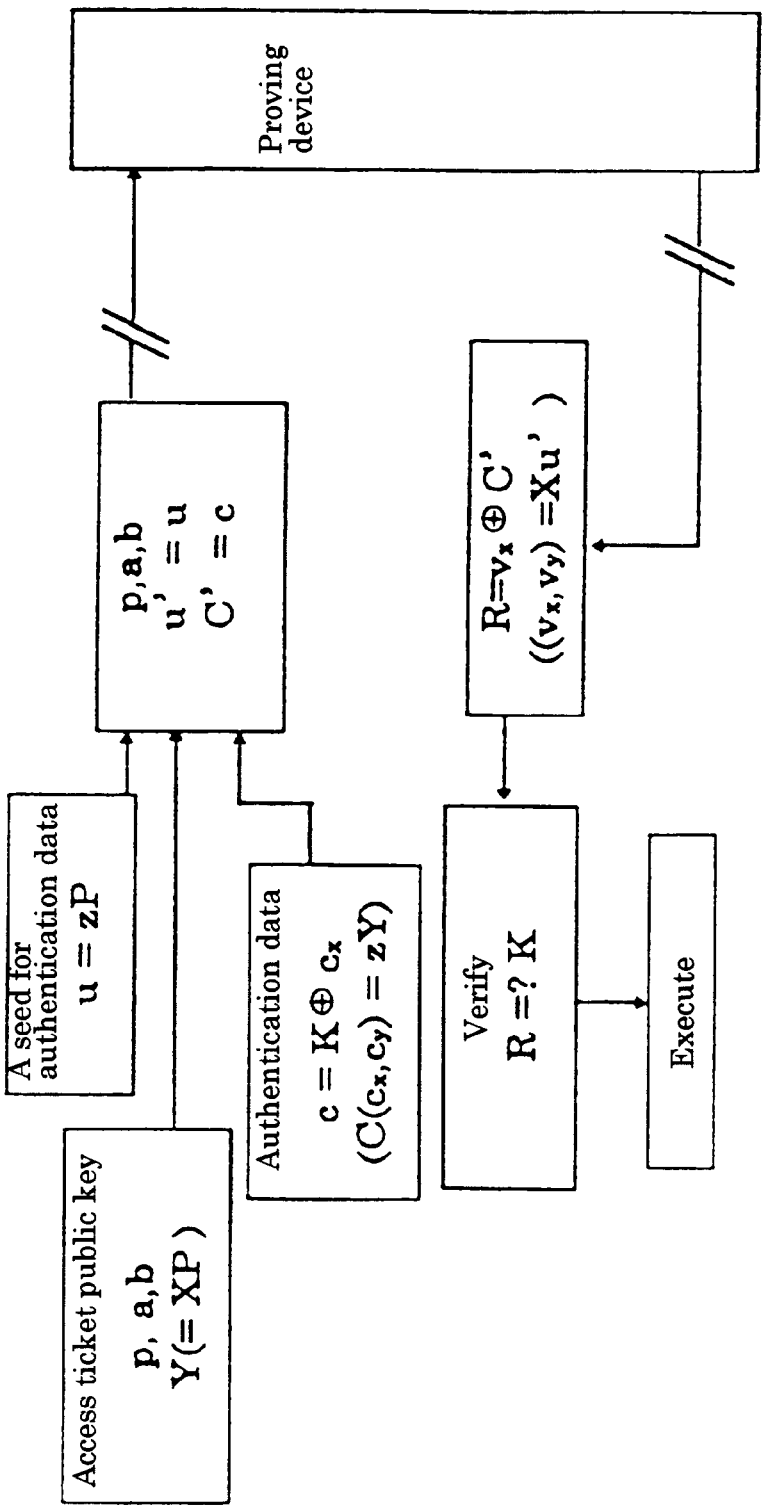
FIG. 32 is a diagram showing an operation of a proof data verification device according to an embodiment 14.
Figure 33:
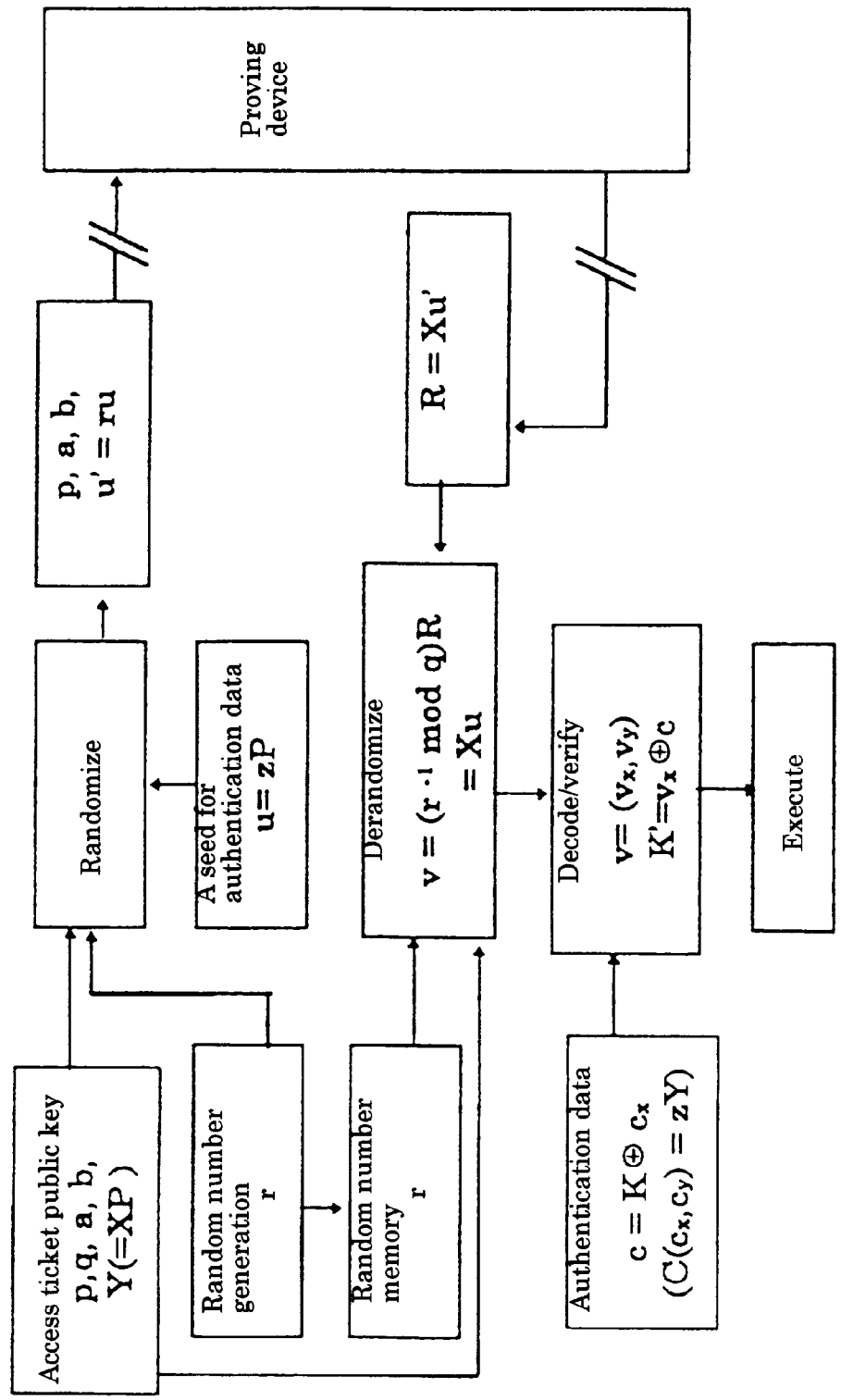
FIG. 33 is a diagram showing an operation of a proof data verification device according to an embodiment 15.
Figure 34:
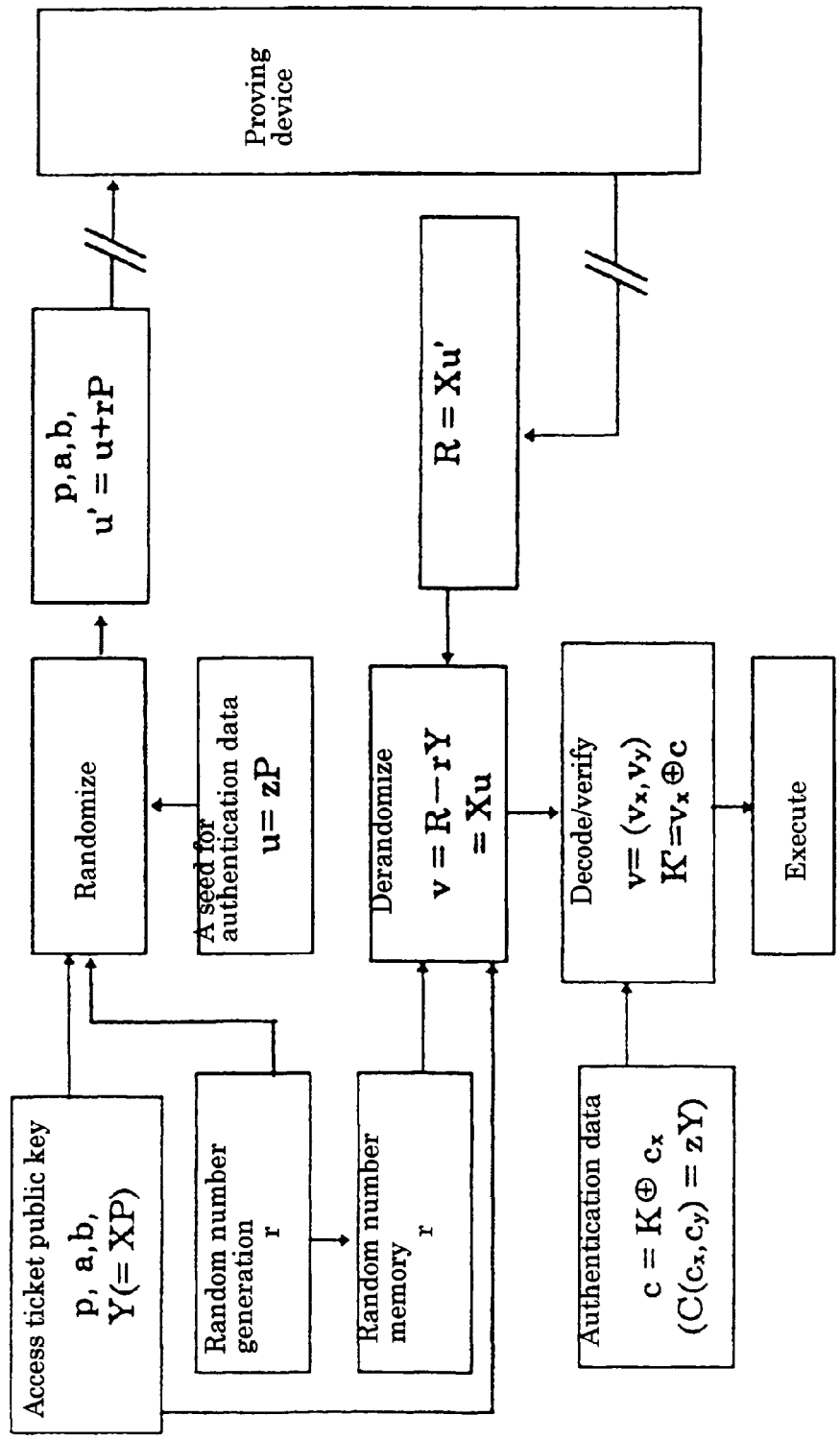
FIG. 34 is a diagram showing an operation of a proof data verification device according to an embodiment 16.
Figure 35:
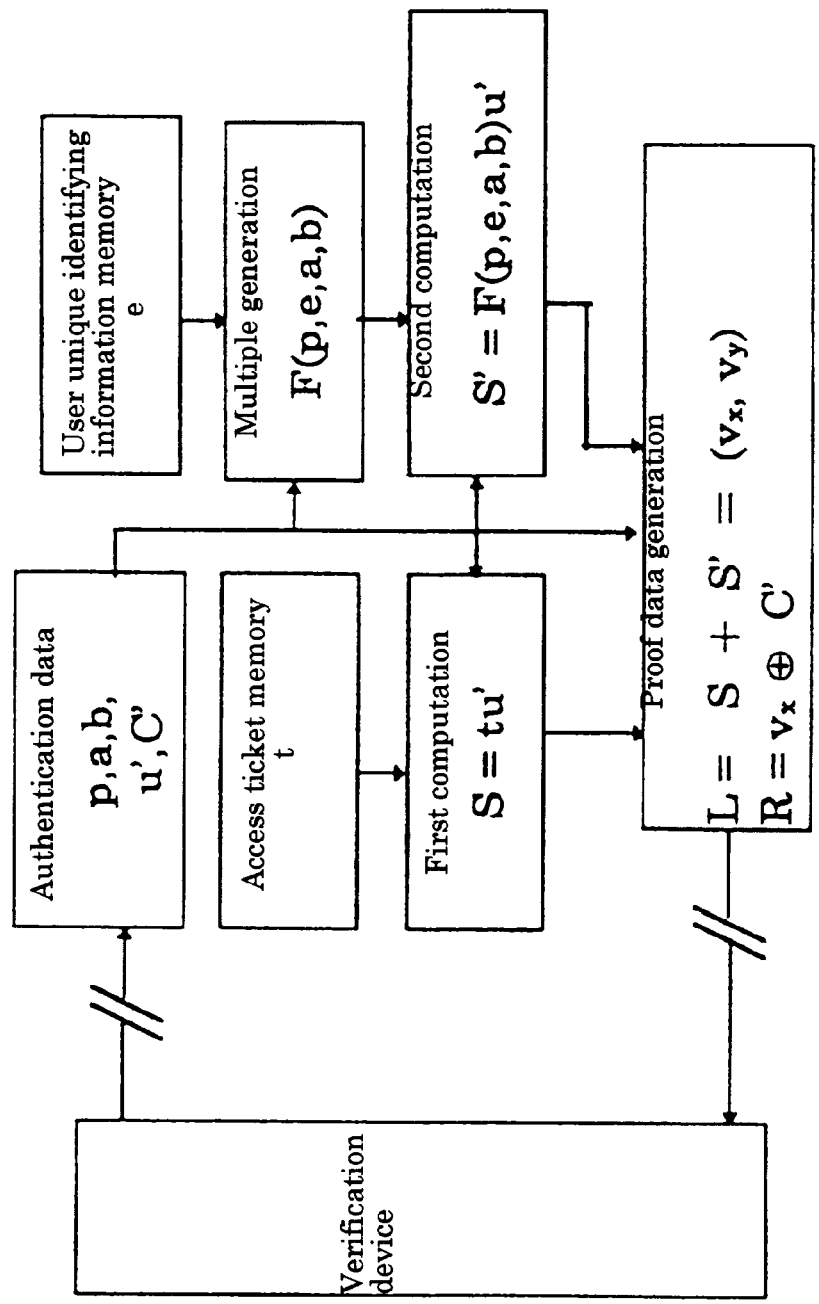
FIG. 35 is a diagram showing an operation of a proof data generation device according to an embodiment 14.
Figure 36:
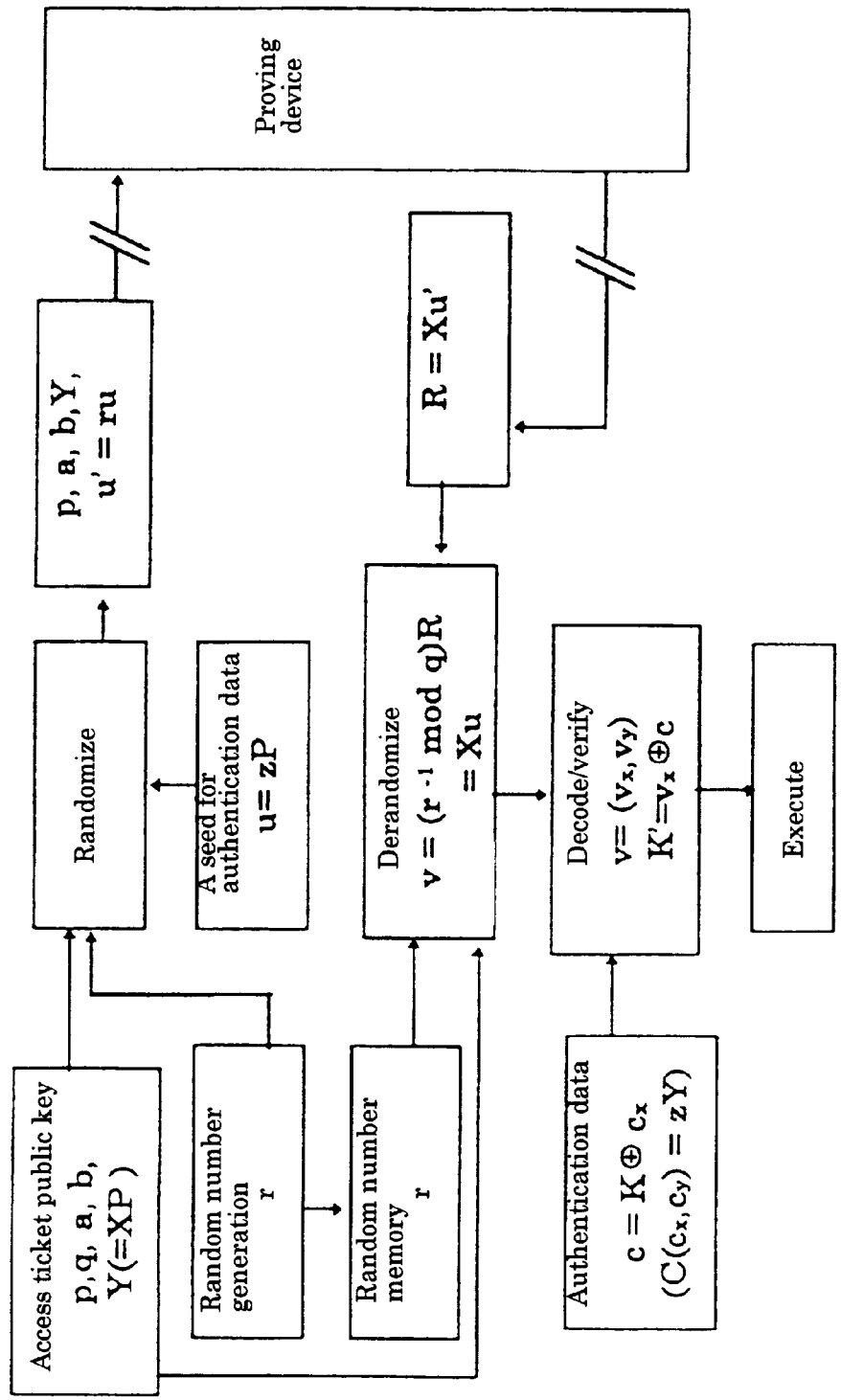
FIG. 36 is a diagram showing an operation of a proof data verification device according to an embodiment 17.
Figure 37:
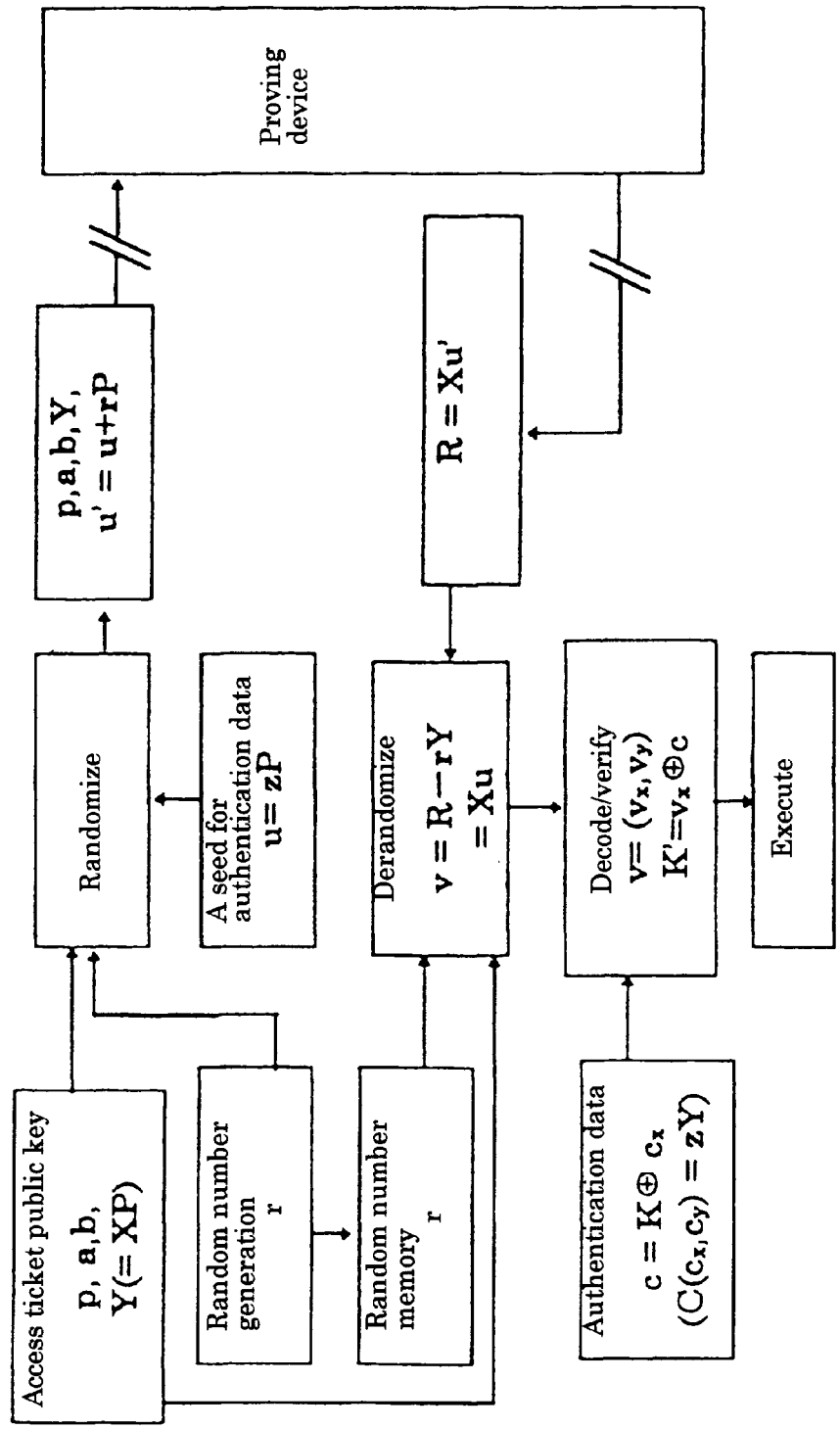
FIG. 37 is a diagram showing an operation of a proof data verification device according to an embodiment 18.

| Embodiment | proving device | Verification device | Proof operation | Verification operation |
|---|---|---|---|---|
| First embodiment | FIG. 2 | FIG. 3 | FIG. 9 | FIG. 10 |
| Second embodiment | FIG. 2 | FIG. 7 | FIG. 9 | FIG. 12 |
| Third embodiment | FIG. 2 | FIG. 5 | FIG. 8 | FIG. 11 |
| Fourth embodiment | FIG. 2 | FIG. 7 | FIG. 9 | FIG. 13 |
| Fifth embodiment | FIG. 2 | FIG. 5 | FIG. 8 | FIG. 14 |
| Sixth embodiment | FIG. 6 | FIG. 3 | FIG. 17 | FIG. 18 |
| Seventh embodiment | FIG. 6 | FIG. 4 | FIG. 16 | FIG. 19 |
| Eighth embodiment | FIG. 6 | FIG. 7 | FIG. 17 | FIG. 21 |
| Ninth embodiment | FIG. 6 | FIG. 5 | FIG. 16 | FIG. 20 |
| Tenth embodiment | FIG. 6 | FIG. 7 | FIG. 17 | FIG. 22 |
| Eleventh embodiment | FIG. 6 | FIG. 5 | FIG. 16 | FIG. 23 |
| Twelfth embodiment | FIG. 6 | FIG. 7 | FIG. 15 | FIG. 24 |
| Thirteenth embodiment | FIG. 6 | FIG. 3 | FIG. 17 | FIG. 31 |
| Fourteenth embodiment | FIG. 6 | FIG. 4 | FIG. 35 | FIG. 32 |
| Fifteenth embodiment | FIG. 6 | FIG. 7 | FIG. 17 | FIG. 33 |
| Sixteenth embodiment | FIG. 6 | FIG. 7 | FIG. 17 | FIG. 34 |
| Seventeenth embodiment | FIG. 6 | FIG. 7 | FIG. 15 | FIG. 36 |
| Eighteenth embodiment | FIG. 6 | FIG. 7 | FIG. 15 | FIG. 37 |

[First embodiment]

In this embodiment, a random number effect (randomizing) is not given, and a decryption is executed by the verification device side. FIG. 2 shows the manner in which a proof data generation device according to this embodiment is arranged, and FIG. 3 shows the manner in which a verification device is arranged. FIG. 9 shows an operation of the proof data generation device according to this embodiment, and FIG. 10 shows an operation of the verification device.

In the first embodiment according to this embodiment, unique security characteristic information X is a secret key of ElGamal cipher under a modulus p (p is a sufficiently large prime number), and Y is a corresponding public key, i.e. it satisfies the following equation (1-1):

$$Y = a^x \bmod p \quad (1\text{-}1)$$

Here, a is a generator of a finite multiplicative group of an order p, i.e. it satisfies the following equations (1-2) and (1-3):

$$a \neq 0 \quad (1\text{-}2)$$

$$\min\{x > 0 | a^x = 1 \bmod p\} = p - 1 \quad (1\text{-}3)$$

Then, in order to identify the user, user unique identifying information e which is a number different at every user is determined. An access ticket t is generated on the basis of the following equation (1-4):

$$t = X - F(p, e) \qquad (1\text{-}4)$$

where X is referred to as an access ticket secret key, and Y is referred to as an access ticket public key.

A function F is a function in which function values are difficult to collide. Thus, the function F may be determined by use of a one-direction hash function h, for example, as in the following equation (1-5) or (1-6):

$$F(x, y) = h(x|y) \qquad (1\text{-}5)$$

$$F(x, y, z, w) = h(x|y|z|w) \qquad (1\text{-}6)$$

where x|y represents a connection of bits of x and y.

The one-direction function is a function having a feature such that it is considerably difficult to calculate different x and y which satisfy h(x)=h(y). As an example of the one-direction hash function, there are known MD2, MD4, MD5 produced by RSA Data Security Inc., and SHS (Secure Hash Standard) which is the standard determined by the Federal Government of U.S.A.

In the following description, data K to be enciphered is referred to as verification data, and data R which is generated by the proof data generation device for proof is referred to as proof data. Moreover, data which is received by the proof data generation device from the verification device in order to generate proof data and data which is used by the verification device in order to verify a decrypted value are referred to as authentication data.

The first embodiment will be described more fully with reference to the drawings. As shown in FIG. 2, the proof data generation device 11 includes a received authentication data memory unit 111, a first computing unit 112, an access ticket memory unit 113, a second computing unit 114, a user unique identifying information memory unit 115, an exponent generating unit 116, a proof data generating unit 117 and the like.

As shown in FIG. 3, the proof data verification device 10 includes an access ticket public key memory unit 101, a reception data memory unit 102, a verification computing unit 103, an authentication data memory unit 104, an a seed for authentication data memory unit 105, an execution means 20 and the like.

An operation of this embodiment will be described below.

1. When a user accesses digital contents which should be authenticated by the device for authenticating user's access rights to resources, the proof data verification device 10 is activated.

When the proof data verification device 10 is arranged as a part of an application program which is operated on the PC or workstation of the user, the user activates the application program by use of an ordinary method using a pointing device such as a keyboard or a mouse. The execution of the application program reaches a program which comprises the proof data verification device 10, whereby the proof data verification device 10 is activated.

When the proof data verification device 10 is constructed on other PC or workstation (called a server) connected via the network, the user activates a communication program on the user's own PC or workstation to issue a communication open request to the server in accordance with a predetermined procedure, whereby the proof data verification device 10 on the server is activated. If a user's communication program communicates with the server in accordance with a procedure called a TCP/IP, for example, then when the proof data verification device is previously made corresponding to a specific port of the server and the user's communication program is set in such a manner that it issues a TCP connection request to the server by designating the above-mentioned port, a daemon (inetd) on the server becomes able to activate the proof data verification device 10 in response to the TCP connection request. This method for realizing such activation is widely used in a network such as an Internet.

The proof data verification device 10 can be arranged as an apparatus for a special purpose. For example, the proof data verification device 10 is arranged as a program printed on a ROM (read-only memory) within an IC card reader/writer, and the proof data generation device is arranged as a program installed on a micro-controller of the IC card. In this case, when the user inserts the IC card into the reader/writer, the proof data verification device 10 is activated.

2. The proof data verification device 10 stores authentication data u' and a modulus p stored in the access ticket public key memory unit 101 in the received authentication data memory unit 111 disposed within the proof data generation device 11. A seed for authentication data u is stored in the a seed for authentication data memory unit 105 and authentication data C is stored in the authentication data memory unit 104, and the data u and C satisfy the following features.

The a seed for authentication data u is a number which is obtained by exponentiation of the above-mentioned a by use of a predetermined random number z as an exponent under the modulus p, i.e. satisfies the following equation (1-7):

$$u = a^z \bmod p \qquad (1\text{-}7)$$

When proof data is set to proper data K, C is a product of a number which is obtained by exponentiation of the access ticket public key Y by use of the random number z as an exponent under the modulus p and the verifying data K, and satisfies the following equation (1-8):

$$C = Y^z K \bmod p \qquad (1\text{-}8)$$

If the proof data verification device 10 is arranged in such a manner that the verifying data K is not stored in the proof data verification device 10 but only C which is the enciphered result is stored in the proof data verification device 10, then it is possible to avoid a risk in which verifying data is leaked from the proof data verification device 10.

In this embodiment, authentication data u' is the same as the a seed for authentication data u:

$$u' = u \qquad (1\text{-}9)$$

3. The first computing unit 112 within the proof data generation device 11 obtains the access ticket t from the access ticket memory unit 113 and obtains S by executing the following equation (1-10) under the modulus p written in the received authentication data memory unit 111.

$$S = u'^t \bmod p \qquad (1\text{-}10)$$

4. The exponent generating unit 116 within the proof data generation device 11 obtains the user unique identifying information e stored in the user unique identifying information memory unit 115, and executes the following equation (1-11):

$$F(e, p) \qquad (1\text{-}11)$$

5. The second computing unit 114 within the proof data generation device 11 obtains S' by executing a calculation in the following equation (1-12) by use of data generated in the exponent generating unit 116.

$$S' = u^{F(p,e)} \bmod p \quad (1\text{-}12)$$

6. The proof data generating unit 117 within the proof data generation device 11 obtains S' and S from the first and second computing units 112, 114, and obtains R by calculating the following equation (1-13):

$$R = S \cdot S' \bmod p \quad (1\text{-}13)$$

7. The proof data generation device 11 returns R to the reception data memory unit 102 of the proof data verification device 10.

8. The verification computing unit 103 (verification means 15) within the proof data verification device 10 extracts the authentication data C from the authentication data memory unit 104, and calculates the following equation (1-14):

$$K' = C \cdot R^{-1} \bmod p \quad (1\text{-}14)$$

9. Only when a combination of the access ticket t used in the proof data generation device 11 and the user unique identifying information e is correct, K' which is the calculated result and the verifying data K agree with each other, and hence the verification is carried out correctly.

10. Although the calculated K' is transferred to the execution means 20 within the verification means 10, the execution means 20 executes the normal processing as long as K'=K is established.

In a method in which the proof data verification device 10 verifies whether or not K and K' are identical to each other, several examples will be described below.

Figure 25:
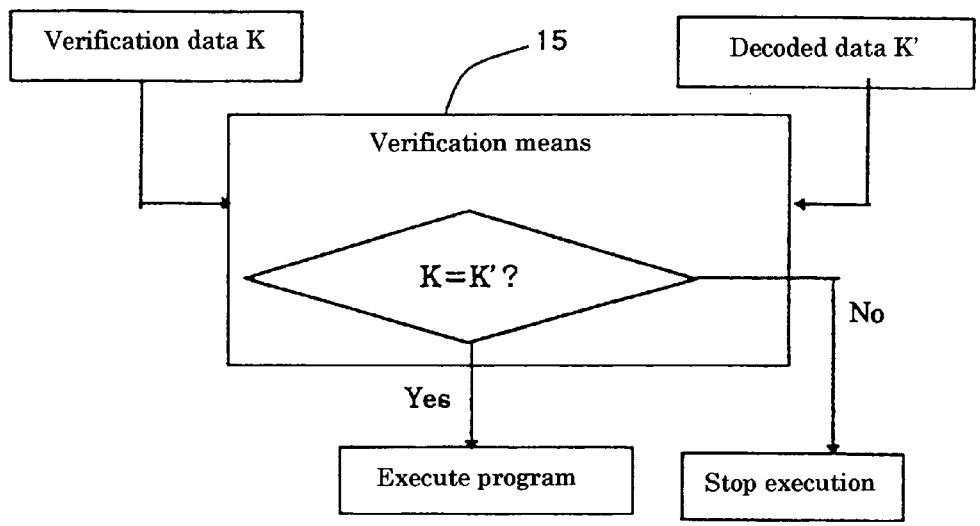
FIG. 25 is a diagram showing a method of verifying decrypted results (when decrypted results are directly compared)

[1] An example in which verification data and decrypted results are directly compared with each other:

In the example shown in FIG. 25, the verification means 15 (verification computing unit 103) stores therein the verifying data K in advance. A comparing unit within the verification means 15 directly compares the verification data K with data K' which is obtained by decrypting the authentication data, and executes the normal processing when K'=K is established. When K'=K is not established, the comparing unit executes an error processing such as stopping the processing.

In this example, from a safety standpoint, there is a weak point in which the verification data K to be verified itself appears in the apparatus. When the proof data verification device is arranged as the program which is operable on the user's PC or workstation, for example, it is not always impossible, even if difficult, for the user to exploit the verification data K by analyzing the program. If the user learns the value of the verification data K, then the user becomes able to make an apparatus which can imitate the operation of the proof data generation device 10, thereby making illegal access possible.

Figure 26:
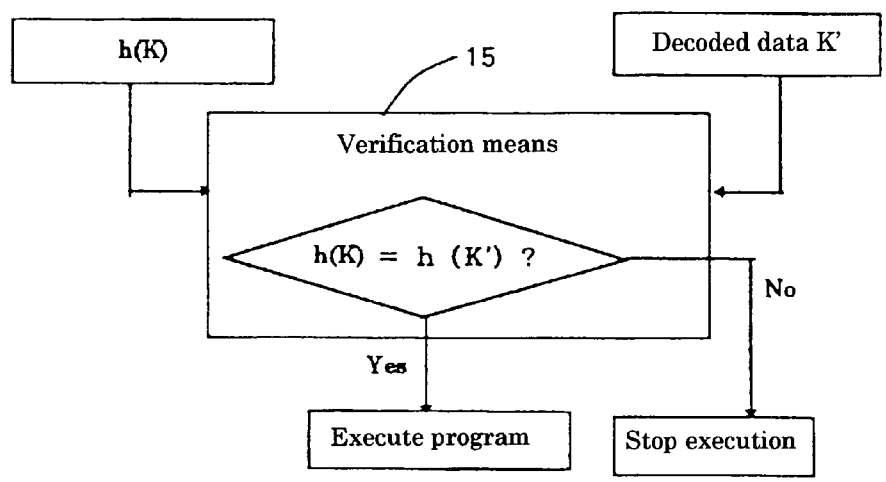
FIG. 26 is a diagram showing a method of verifying decrypted results (when one-direction function is used)

[2] An example using one-direction function:

To improve the above-mentioned drawback, in the example shown in FIG. 26, verification data stored in the verification means 15 is not set to the verification data K itself but set to data h(K) which is obtained by applying the above-mentioned one-direction hash function h to the verification data K. Due to the nature of the one-direction hash function, it is considerably difficult to calculate x which can satisfy y=h(x) from data y stored in the proof data memory means.

The verification means 15 includes the conversion unit for returning a result which is obtained by applying the one-direction hash function to inputted data. The comparing unit compares an output h(K') which is obtained by inputting data K' of decrypted authentication data as the hash function with the stored data (=h(K)).

In the example of this method, because the verification data does not appear in the program and it is very difficult to calculate K from the data h(K) stored in the proof data memory means, this method is safer than the example of the method [1].

However, the comparing unit is arranged as a conditional sentence in the program. Therefore, when the proof data verification device is arranged as the program and can be easily analyzed and altered, there is then the possibility that the program will be altered so as to skip the above-mentioned conditional sentence. In this aspect, the above-mentioned method [2] still has a weak point.

Figure 27:
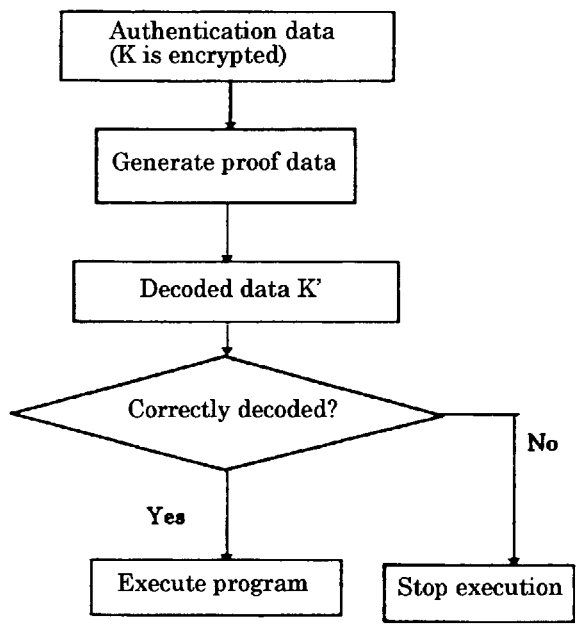
FIG. 27 is a diagram showing a method of verifying decrypted results (when a decrypted value is a decryption key for other data)

[3] An example in which a decrypted value is a decryption key for decrypting specific data:

In the example shown in FIG. 27, data stored for verification is enciphered data and the data K' which is obtained by decrypting the authentication data is a key for decrypting the thus enciphered data.

The verification means 15 decodes the value of the data K' as the decryption key of the encryption used to encrypt the data stored for verification, and enables the program to be executed only when the enciphered data can be decrypted.

According to this example, since the decryption key itself does not appear in the verification device, a safety can be improved.

Figure 28:
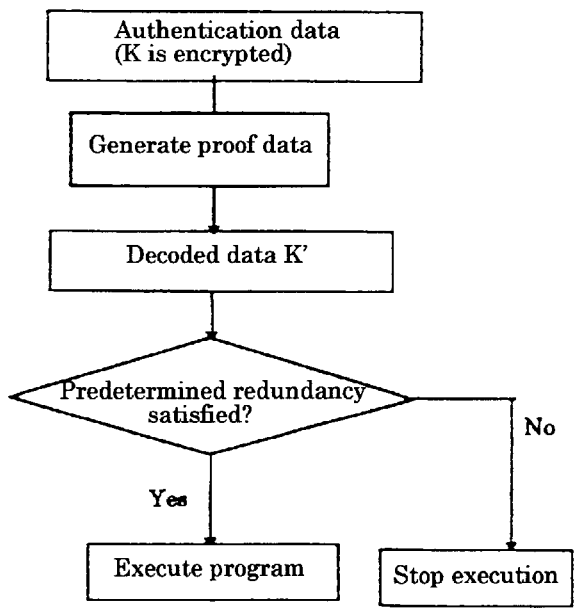
FIG. 28 is a diagram showing a method of verifying decrypted results (when a redundancy of a decrypted value is verified)

[4] An example for confirming whether or not a decrypted value satisfies a specific redundancy:

In the example shown in FIG. 28, the verification device 10 includes a redundancy verification means, and the verification means 15 sends the value of data K' which is obtained by decrypting the authentication data to the redundancy verification means. Only when the redundancy verification means confirms that the above-mentioned data satisfies the specific redundancy, the program becomes possible to be executed.

As an example of redundancy, there can be enumerated the cases in which decrypted data repeats a certain specific pattern, data of a specific position satisfies a specific condition, or data has a meaning as a specific language.

Figure 29:
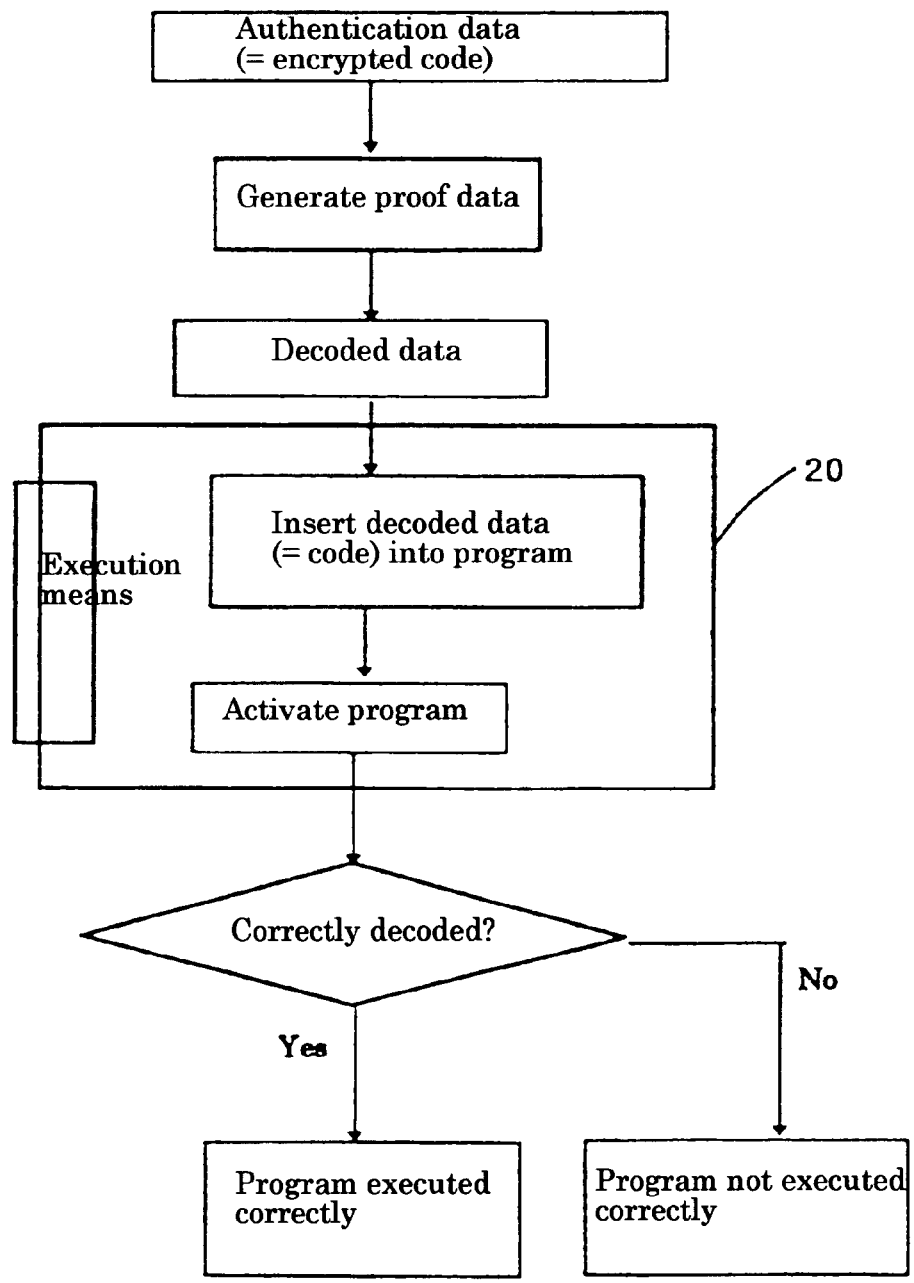
FIG. 29 is a diagram showing a method of verifying decrypted results (when a decrypted value is a program code)

[5] An example in which a program code itself is enciphered:

In the example shown in FIG. 29, data which is obtained by encrypting partly or wholly the program code stored in the proof data verification device 10 is stored in the authentication data memory means 104 as authentication data. Specifically, the data K' which is obtained by decrypting the authentication data becomes a part of or whole of the program code.

The execution means 20 inserts the data K' into the program at its previously-determined position, and then executes the inserted program. Only when the proof data generation device 11 returns correct data, i.e. only when the data K' is obtained by correctly decrypting the code, it becomes possible to execute the program.

The execution means 20 may activate the file after the file in which the decrypted code is inserted into the original program was generated. In this case, it should be preferable from a safety standpoint that the program is activated after the decrypted code is inserted into the program on the memory under the condition that the program is developed on the memory.

In this example, since a part of whole of the code which is indispensable to the execution of the program is encrypted, even when a safety is comparatively low in which the execution means is arranged as an application program operable on the user's PC or workstation, it is possible to prevent the program from being executed illegally.

Figure 30:
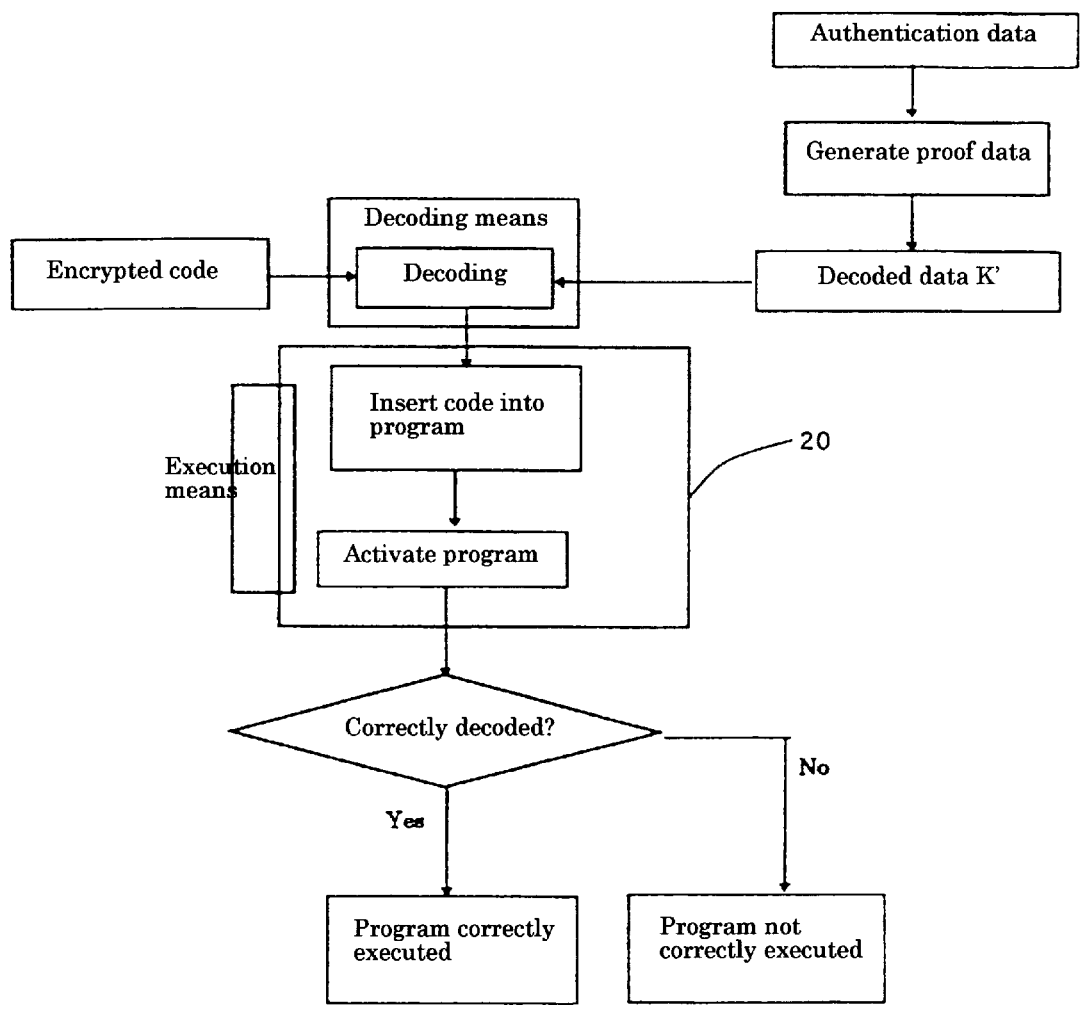
FIG. 30 is a diagram showing a method of verifying decrypted results (when a decrypted value is a key used to decode a program code)

[6] An example in which a decrypted value is a decryption key for a program:

In the example shown in FIG. 30, the proof data verification device 10 holds data which is obtained by encrypting a part of whole of the program code, and the data K which is obtained by decrypting the authentication data becomes a decryption key necessary for decrypting the encrypted program code. According to this example, regardless of the size of a code to be encrypted, it becomes possible to suppress the size of the data K' to a constant small value. Hence, a communication overhead can be reduced.

The verification means 15 decodes the encrypted program code stored by use of the data K'. The execution means 20 inserts the decrypted code into the program at its previously-determined position, and then executes the inserted program. Only when the proof data generation device 11 returns correct data, i.e. only when a code is decrypted by the data K', it becomes possible to execute the program.

[Second embodiment]

A second embodiment according to the present invention will be described next. This embodiment is a modified example of the first embodiment, and differs from the first embodiment in that this embodiment uses a random number effect.

In this embodiment, the manner in which the ElGamal public key encryption is arranged, the manner in which the access ticket t, the a seed for authentication data u and the authentication data C are generated, and features to be satisfied are similar to those of the first embodiment.

In this embodiment, there will be described an example in which a random number effect is given to authentication data and proof data so that, when these data are stolen on the communication line, these data can be prevented from being used again.

FIG. 2 shows the manner in which the proof data generation device 11 according to this embodiment is arranged, and FIG. 7 shows the manner in which the verification device 10 is arranged. FIG. 9 shows an operation of the proof data generation device 11 according to this embodiment, and FIG. 12 shows an operation of the verification device 10 according to this embodiment.

This embodiment will be described further with reference to the drawings. This embodiment is the same as the first embodiment in that the proof data generation device 11 shown in FIG. 2 is used. As shown in FIG. 7, the verification device 10 includes the access ticket public key 101, the reception data memory unit 102, the verification computing unit 103, the authentication data memory unit 104, the a seed for authentication data memory unit 105, the random number generating unit 106, the random number memory unit 107, the random number effect eliminating (de-randomizing) unit 108, the random number supplying unit 109 and the like.

An operation of this embodiment will be described below.

1. The proof data verification device 10 is activated when accessed by the user.

As a method of realizing the proof data verification device 10, it is possible to use any one of an application program operable on the user' PC or workstation, a server program on the server connected to the user's PC or workstation through a network, or an exclusively-designed apparatus such as an IC card reader/writer. This embodiment is the same as the first embodiment from this aspect, and this is also true in the following embodiments.

2. The proof data verification device 10 stores the authentication data u' and the modulus p stored in the access ticket public key memory unit 101 in the reception data memory unit 111 within the proof data generation device 11.

A seed for authentication data u is stored in the a seed for authentication data memory unit 105, and authentication data C is stored in the authentication data memory unit 102.

The proof data verification device 10 generates a random number r by the random number generating unit 106 in such a manner that the random number r becomes relatively prime with a value (p−1) which is obtained by subtracting 1 from the modulus p stored in the access ticket public key memory unit 101, and stores the random number r thus generated in the random number memory unit 107.

Then, the random number effect supplying unit 109 obtains data u from the a seed for authentication data memory unit 105, and calculates authentication data u' based on the following equation (2-1):

$$u' = u^r \bmod p \qquad (2\text{-}1)$$

As described above, the random number effect is given to the authentication data and the random number effect is eliminated when proof data returned from the proof data generation device 11 is verified, thereby making it possible to prevent a so-called replay attack. This is also true in the following embodiments.

3. The first computing unit 112 within the proof data generation device 11 obtains the access ticket t from the access ticket memory unit 114, and obtains S by executing the following equation (2-2) under the modulus p written in the received authentication data memory unit 111.

$$S = u^t \bmod p \qquad (2\text{-}2)$$

4. The exponent generating unit 116 within the proof data generation device 11 obtains the user unique identifying information e from the user unique identifying information memory unit 115, and executes the following equation (2-3):

$$F(p, e) \qquad (2\text{-}3)$$

5. The second computing unit 114 within the proof data generation device 11 obtains S' by executing the calculation of the following equation (2-4) by use of data generated in the exponent generating unit 116:

$$S' = u'^{F(p, e)} \bmod p \qquad (2\text{-}4)$$

6. The proof data generating unit 117 within the proof data generation device 11 obtains S' and S from the first and second computing units 112, 114, and obtains R by executing the calculation of the following equation (2-5):

$$R = S'S \bmod p \qquad (2\text{-}5)$$

7. The proof data generation device 11 returns R to the reception data memory unit 102 of the proof data verification device 10.

8. The random number effect eliminating unit 108 within the proof data verification device 10 obtains the previously-generated random number r from the random number memory unit 107, and executes the calculation of the following equation (2-6):

$$(v = R^{(r^{-1} \bmod (p-1))} \bmod p) \qquad (2\text{-}6)$$

Then, the calculation of the following equation (2-7) is executed by use of the calculated result v and the C stored in the authentication data memory unit 104:

$$K'=C\cdot v^{-1} \bmod p \tag{2-7}$$

9. So long as the combination of the access ticket t and the user unique identifying information e used in the proof data generation device 11 is correct, the calculated result K' and the verification data K agree with each other, and a correct verification is carried out.

When the calculated result K' and the verification data K are compared with each other, it is possible to use a method similar to that of the first embodiment.

[Third embodiment]

A third embodiment according to the present invention is a modified example of the second embodiment and in which a random number effect is given and a decrypting is executed on the proof data generation device 11 side.

In this embodiment, the manner in which the ElGamal public key encryption is arranged, the manner in which the access ticket t, the a seed for authentication data u and the authentication data C are generated, and features to be satisfied are similar to those of the first embodiment.

FIG. 2 shows a manner in which the proof data generation device is arranged, and FIG. 5 shows a manner in which the verification device is arranged. FIG. 8 shows an operation of the proof data generation device according to this embodiment, and FIG. 11 shows an operation of the verification device according to this embodiment.

In FIG. 5, like elements and parts identical to those of FIG. 7 are marked with the same reference numerals.

An operation of this embodiment will be described hereinafter.

1. The proof data verification device 10 is activated when accessed by the user.

2. The proof data verification device 10 stores authentication data u', C' and the modulus p stored in the access ticket public key memory unit 101 in the received authentication data memory unit 111 within the proof data generation device 11.

A seed for authentication data u is stored in the a seed for authentication data memory unit 105, and authentication data C is stored in the authentication data memory unit 104.

The proof data verification device 10 generates by the random number generating unit 106 the random number r in such a manner that the random number r becomes relatively prime with a value (p−1) which is obtained by subtracting 1 from the modulus p stored in the access ticket public key memory unit 101, and records resultant random number r in the random number memory unit 107.

Then, the random number effect supplying unit 109 obtains the data u from the a seed for authentication data memory unit 105, and calculates authentication data u' by calculating the following equation (3-1):

$$u'=u^r \bmod p \tag{3-1}$$

Also, the authentication data C' is generated as follows:

The data C is obtained from the authentication data memory unit 104, and the calculation of the following equation (3-2) is executed:

$$C'=C^r \bmod p \tag{3-2}$$

3. The first computing unit 112 within the proof data generation device 11 obtains the access ticket t from the access ticket memory unit 113, and obtains S by executing the following equation (3-3) under the modulus p written in the reception data memory unit 111:

$$S=u'^t \bmod p \tag{3-3}$$

4. The exponent generating unit 116 within the proof data generation device 11 obtains the user unique identifying information e from the user unique identifying information memory unit 115, and executes the calculation of the following equation (3-4):

$$F(p, e) \tag{3-4}$$

5. The second computing unit 114 within the proof data generation device 11 obtains S' by executing the calculation of the following equation (3-5) by use of data generated in the exponent generating unit 116.

$$S'=u'^{F(p,e)} \bmod p \tag{3-5}$$

6. The proof data generating unit 117 within the proof data generation device 11 obtains S' and S from the first and second computing units 112, 114, and obtains R by executing the calculation of the following equation (3-6):

$$R=C'(S', S)^{-1} \bmod p \tag{3-6}$$

7. The proof data generation device 11 returns R to the reception data memory unit 102 of the proof data verification device 10.

8. The random number effect eliminating unit 108 within the proof data verification device 10 obtains the previously-generated random number r from the random number memory unit 107, and executes the calculation of the following equation (3-7):

$$(K'=R^{(r^{-1} \bmod (p-1))} \bmod p) \tag{3-7}$$

9. So long as the combination of the access ticket t and the user unique identifying information e used in the proof data generation device 11 is correct, the calculated result K' and the verification data K agree with each other, and a correct verification is carried out.

When the calculated result K' and the verification data K are compared with each other, it is possible to use a method similar to that of the first embodiment.

[Fourth embodiment]

A fourth embodiment according to the present invention is also a modified example of the second embodiment and in which a random number effect is given and a decrypting is executed on the proof data verification device 10 side. The fourth embodiment is different from the second embodiment in the manner in which the random number effect is given.

In this embodiment, the manner in which the ElGamal public key encryption is arranged, the manner in which the access ticket t, the a seed for authentication data u and the authentication data C are generated, and features to be satisfied are similar to those of the first embodiment.

FIG. 2 shows a manner in which the proof data generation device is arranged, and FIG. 7 shows a manner in which the verification device is arranged. FIG. 9 shows an operation of the proof data generation device according to this embodiment, and FIG. 13 shows an operation of the verification device according to this embodiment.

An operation of this embodiment will be described hereinafter.

1. The proof data verification device 10 is activated when accessed by the user.

2. The proof data verification device 10 stores the authentication data u' and the modulus p stored in the access ticket public key memory unit 101 in the reception data memory unit 111 within the proof data generation device 11.

A seed for authentication data u is stored in the a seed for authentication data memory unit 105, and authentication data C is stored in the authentication data memory unit 104.

The proof data verification device 10 generates a random number r by the random number generating unit 106 and stores the random number r thus generated in the random number memory unit 107.

Then, the random number effect supplying unit 109 obtains data u from the a seed for authentication data memory unit 105, and calculates authentication data u' based on the following equation (4-1):

$$u'=u \cdot a^r mod p \qquad (4\text{-}1)$$

3. The first computing unit 112 within the proof data generation device 11 obtains the access ticket t from the access ticket memory unit 113, and obtains S by executing the following equation (4-2) under the modulus p written in the reception data memory unit 111.

$$S=u'^t mod p \qquad (4\text{-}2)$$

4. The exponent generating unit 116 within the proof data generation device 11 obtains the user unique identifying information e from the user unique identifying information memory unit 115, and executes the calculation of the following equation (4-3):

$$F(p, e) \qquad (4\text{-}3)$$

5. The second computing unit 114 within the proof data generation device 11 obtains S' by executing the calculation of the following equation (4-4) by use of data generated in the exponent generating unit 116:

$$S'=u'^{F(p, e)} mod p \qquad (4\text{-}4)$$

6. The proof data generating unit 117 within the proof data generation device 11 obtains S' and S from the first and second computing units 112, 114, and obtains R by executing the calculation of the following equation (4-5):

$$R=S'S mod p \qquad (4\text{-}5)$$

7. The proof data generation device 11 returns R to the reception data memory unit 102 of the proof data verification device 10.

8. The random number effect eliminating unit 108 within the proof data verification device 10 obtains the previously-generated random number r from the random number memory unit 107, and executes the calculation of the following equation (4-6):

$$v=Y^{-r} \cdot R mod p \qquad (4\text{-}6)$$

Then, C is extracted from the authentication data memory unit 104, and the calculation of the following equation (4-7) is executed:

$$K'=C \cdot v^{-1} mod p \qquad (4\text{-}7)$$

9. So long as the combination of the access ticket t and the user unique identifying information e used in the proof data generation device 11 is correct, the calculated result K' and the verification data K agree with each other, and a correct verification is carried out.

When the calculated result K' and the verification data K are compared with each other, it is possible to use a method similar to that of the first embodiment.

[Fifth embodiment]

A fifth embodiment according to the present invention is also a modified example of the second embodiment and in which a random number effect is given and a decrypting is executed on the proof data generation device 11 side.

In this embodiment, the manner in which the ElGamal public key encryption is arranged, the manner in which the access ticket t, the a seed for authentication data u and the authentication data C are generated, and features to be satisfied are similar to those of the first embodiment.

FIG. 2 shows a manner in which the proof data generation device is arranged, and FIG. 5 shows a manner in which the verification device is arranged. FIG. 8 shows an operation of the proof data generation device according to this embodiment, and FIG. 14 shows an operation of the verification device according to this embodiment.

An operation of this embodiment will be described hereinafter.

1. The proof data verification device 10 is activated when accessed by the user.

2. The proof data verification device 10 stores authentication data u', C' and the modulus p stored in the access ticket public key memory unit 101 in the reception data memory unit 111 within the proof data generation device 11.

A seed for authentication data u is stored in the a seed for authentication data memory unit 105, and authentication data C is stored in the authentication data memory unit 104.

The proof data verification device 10 generates the random number r by the random number generating unit 106, and records resultant random number r in the random number memory unit 107.

Then, the random number effect supplying unit 109 obtains the data u from the a seed for authentication data memory unit 105, and calculates authentication data u' by calculating the following equation (5-1):

$$u'=u \cdot a^r mod p \qquad (5\text{-}1)$$

3. The first computing unit 112 within the proof data generation device 11 obtains the access ticket t from the access ticket memory unit 113, and obtains S by executing the following equation (5-2) under the modulus p written in the reception data memory unit 111:

$$S=u'^t mod p \qquad (5\text{-}2)$$

4. The exponent generating unit 116 within the proof data generation device 11 obtains the user unique identifying information e from the user unique identifying information memory unit 115, and executes the calculation of the following equation (5-3):

$$F(p, e) \qquad (5\text{-}3)$$

5. The second computing unit 114 within the proof data generation device 11 obtains S' by executing the calculation of the following equation (5-4) by use of data generated in the exponent generating unit 116.

$$S'=u'^{F(p,e)} mod p \qquad (5\text{-}4)$$

6. The proof data generating unit 117 within the proof data generation device 11 obtains S' and S from the first and second computing units 112, 114, and obtains R by executing the calculation of the following equation (5-5):

$$R=C'(S', S)^{-1} mod p \qquad (5\text{-}5)$$

7. The proof data generation device 11 returns R to the reception data memory unit 102 of the proof data verification device 10.

8. The random number effect eliminating unit 108 within the proof data verification device 10 obtains the previously-generated random number r from the random number memory unit 107, obtains Y from the access ticket public key memory unit 101, and executes the calculation of the following equation (5-6):

$$K'=Y^r \cdot R \bmod p \qquad (5\text{-}6)$$

9. So long as the combination of the access ticket t and the user unique identifying information e used in the proof data generation device 11 is correct, the calculated result K' and the verification data K agree with each other, and a correct verification is carried out.

When the calculated result K' and the verification data K are compared with each other, it is possible to use a method similar to that of the first embodiment.

[Sixth embodiment]

In a sixth embodiment according to the present invention, instead of the ElGamal public key encryption, there is used an encryption system which is defined on an elliptic curve on a finite field. Moreover, the random number effect is not given and the decryption is executed on the proof data verification device 10 side.

In this embodiment, an elliptic curve $E: y^2 = X^3 + ax + b$ (however, $4a^3 + 27b^2 \neq 0$) on a finite field Fp (p is a value multiplied by a prime number larger than 3) having p elements is selected and one point on the E is set to P.

Here, unique security characteristic information is set to X, and a point Y is generated as in the following equation (6-1):

$$Y = XP \qquad (6\text{-}1)$$

Then, in order to identify the user, there is determined user unique identifying information e which is a number different at every user. The access ticket t is generated on the basis of the following equation (6-2):

$$t = X - F(p, e, a, b) \qquad (6\text{-}2)$$

X is referred to as an access ticket secrete key, and Y is referred to as an access ticket public key.

Also, points u and C on the E are defined as follows: The point u is a number which is obtained by multiplying the above-mentioned point P by a predetermined random number z, i.e. it satisfies the following equation (6-3):

$$u = zP \qquad (6\text{-}3)$$

Verification data is set to K, and K is made corresponding to a point L on the E. The point C is a sum of a number which is obtained by multiplying the access ticket public key Y by the random number z and the point L and satisfies the following equation (6-4).

$$C = L + zY \qquad (6\text{-}4)$$

As a method of making the data K correspond to the point L, there can be used a method described in "Encryption/zero-knowledge proof/number theory" (pp. 231, edited by Okamoto/Ohta under the supervision of Information Processing Society of Japan) published by KYORITSU SHUPPAN CO., TLD, for example.

If the verification data K is not held in the proof data verification device but instead only the C which is the encrypted result is held in the proof data verification device, then it is possible to avoid the risk such that the verification data K is leaked from the proof data verification device.

FIG. 6 shows the manner in which the proof data generation device according to this embodiment is arranged, and FIG. 3 shows the manner in which the proof data verification device according to this embodiment is arranged. Also, FIG. 17 shows an operation of the proof data generation device according to this embodiment, and FIG. 18 shows an operation of the proof data verification device according to this embodiment.

A fundamental configuration of the proof data generation device 11 shown in FIG. 6 is similar to the one of the proof data generation device 11 shown in FIG. 2 or the like, and therefore corresponding elements and parts are marked with the reference numerals. Incidentally, in FIG. 6, a multiple generating unit 119 is used instead of the exponent generating unit 116 shown in FIG. 2.

An operation of this embodiment will be described hereinafter.

1. The proof data verification device 10 is activated when accessed by the user.

As a method of realizing the proof data verification device 10, there can be used any of an application program operable on the user' PC or workstation, a server program on the server connected to the user's PC or workstation through a network or an exclusively-designed apparatus such as an IC card reader/writer. This embodiment is the same as the first embodiment from this aspect, and this is also true in any of the following embodiments.

2. A seed for authentication data u on the point E is stored in the a seed for authentication data memory unit 105, and authentication data C on the point E is stored in the authentication data memory unit 104.

The proof data verification device 10 stores the authentication data u' and parameters p, a, b, which are stored in the access ticket public key memory unit 101 so as to define the elliptic curve E, in the reception data memory unit 111 within the proof data generation device 11.

In this embodiment, the authentication data u' is the a seed for authentication data u.

$$u' = u \qquad (6\text{-}5)$$

3. The first computing unit 112 within the proof data generation device 11 obtains the access ticket t from the access ticket memory unit 113, and obtains S by executing the following equation (6-6).

$$S = tu' \qquad (6\text{-}6)$$

4. The multiple generating unit 119 within the proof data generation device 11 obtains the user unique identifying information e from the user unique identifying information memory unit 115, and executes the following equation (6-7):

$$F(p, e, a, b) \qquad (6\text{-}7)$$

5. The second computing unit 114 within the proof data generation device 11 obtains S' by executing the calculation of the following equation (6-8) by use of data generated in the multiple generating unit 119:

$$S' = F(p, e, a, b)u' \qquad (6\text{-}8)$$

6. The proof data generating unit 117 within the proof data generation device 11 obtains S' and S from the first and second computing units 112, 114, and obtains R by executing the calculation of the following equation (6-9):

$$R = S + S' \qquad (6\text{-}9)$$

7. The proof data generation device 11 returns R to the reception data memory unit 102 of the proof data verification device 10.

8. The verification computing unit 103 within the proof data verification device 10 extracts authentication data C from the authentication data memory unit 104, and executes the calculation of the following equation (6-10):

$$L'=C-R \qquad (6\text{-}10)$$

9. The verification computing unit 103 calculates data K' corresponding to a point L'.

As a method of making the point L corresponding to the data K, there can be used a method described in "Encryption/zero-knowledge proof/number theory" (pp. 231, edited by Okamoto/Ohta under the supervision of Information Processing Society of Japan) published by KYORITSU SHUPPAN CO., LTD., for example.

So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

While the elliptic curve E is expressed as $y^2=x^3+ax+b$ in this embodiment, the present invention is not limited thereto, and the following arrangements are also possible.

1) An elliptic curve E of a finite field of characteristic 2 is expressed as $y^2+cy\equiv x^3+ax+b \bmod p$ (however, $b\neq 0$). Then, as a parameter for defining an elliptic curve, in addition to that shown in this embodiment, c is sent to the proof data generation device, and the proof data generation device calculates F (p, e, a, b, c) by use of the user unique identifying information.

2) An elliptic curve E on a finite field of characteristic 2 is expressed as $y^2+xy\equiv x^3+ax+b \bmod p$ (however $a\neq 0$).

3) An elliptic curve E on a finite field of characteristic 3 is expressed as $y^2\equiv x^3+ax^2+bx+c \bmod p$. Then, as a parameter for defining an elliptic curve, in addition to the one shown in this embodiment, c is sent to the proof data generation device, and the proof data generation device calculates F (p, e, a, b, c) by use of user unique identifying information, and then calculates S' based on the above-mentioned calculated result.

These methods can similarly be applied to all of the following embodiments.

[Seventh embodiment]

A seventh embodiment of the present invention is a modified example of the sixth embodiment, and is different from the sixth embodiment in that a decryption is executed on the proof data generation device side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the sixth embodiment.

As a method of making the point on the elliptic curve and the data correspond to each other, it is possible to use a method similar to that of the sixth embodiment.

FIG. 6 shows the manner in which the proof data generation device according to this embodiment is arranged, and FIG. 4 shows the manner in which the proof data verification device according to this embodiment is arranged. Also, FIG. 16 shows an operation of the proof data generation device according to this embodiment, and FIG. 19 shows an operation of the proof data verification device according to this embodiment. In FIG. 4, elements and parts corresponding to those of the proof data verification device 10 shown in FIG. 3 or the like are marked with the same reference numerals.

An operation of this embodiment will be described hereinafter.

1. The proof data verification device 10 is activated when accessed by the user.

2. A seed for authentication data u on the point E is stored in the a seed for authentication data memory unit 105, and authentication data C on the point E is stored in the authentication data memory unit 104.

The proof data verification device 10 stores the authentication data u, C, and parameters p, a, b, which are stored in the access ticket public key memory unit 101 so as to define the elliptic curve E, in the reception data memory unit 111 within the proof data generation device 11.

3. The first computing unit 112 within the proof data generation device 11 obtains the access ticket t from the access ticket memory unit 113, and obtains S by executing the following equation (7-1).

$$S=tu \qquad (7\text{-}1)$$

4. The multiple generating unit 119 within the proof data generation device 11 obtains the user unique identifying information e from the user unique identifying information memory unit 115, and executes the calculation of the following equation (7-2):

$$F(p, e, a, b) \qquad (7\text{-}2)$$

5. The second computing unit 114 within the proof data generation device 11 obtains S' by executing the calculation of the following equation (7-3) by use of data generated in the multiple generating unit 119:

$$S'=F(p, e, a, b)u \qquad (7\text{-}3)$$

6. The proof data generating unit 117 within the proof data generation device 11 obtains S' and S from the first and second computing units 112, 114, and obtains R by executing the calculation of the following equation (7-4):

$$R=C-S-S' \qquad (7\text{-}4)$$

7. The proof data generation device 11 returns R to the reception data memory unit 102 of the proof data verification device 10.

8. The verification computing unit 103 calculates the data K' corresponding to the point R. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Eighth embodiment]

An eighth embodiment according to the present invention is a modified example of the sixth embodiment and in which a random number effect is given and decryption is carried out on the proof data verification device 10 side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the sixth embodiment. As a method of making the point on the elliptic curve and the data correspond to each other, it is possible to use a method similar to that of the sixth embodiment.

Incidentally an order of the point P is set to q.

FIG. 6 shows the manner in which the proof data generation device 11 according to this embodiment is arranged, and FIG. 7 shows the manner in which the proof data verification device 10 according to this embodiment is arranged. Also, FIG. 17 shows an operation of the proof data generation device 11 according to this embodiment, and FIG. 21 shows an operation of the proof data verification device 10 according to this embodiment.

An operation of this embodiment will be described hereinafter.

1. The proof data verification device 10 is activated when accessed by the user.

2. A seed for authentication data u on the point E is stored in the a seed for authentication data memory unit 105, and authentication data C on the point E is stored in the authentication data memory unit 104.

The proof data verification device 10 stores the authentication data u' and parameters p, a, b, which are stored in the access ticket public key memory unit 101 so as to define the elliptic curve E, in the reception data memory unit 111 within the proof data generation device 11.

The proof data verification device 10 generates the random number r by the random number generating unit 106 in such a manner that the random number r becomes relatively prime with the order q of the point p stored in the access ticket public key memory unit 101, and then stores the thus generated random number r in the random number memory unit 107.

Here, the authentication data u' is generated as follows. That is, the random number effect supplying unit 109 obtains the data u from the a seed for authentication data memory unit 105, and executes the calculation of the following equation (8-1):

$$u'=ru \qquad (8\text{-}1)$$

As described above, it the random number effect is given to the authentication data and the random number effect is eliminated when the proof data returned from the proof data generation device 11 is verified, then a so-called replay attack can be prevented. This is also true in the following embodiments.

3. The first computing unit 112 within the proof data generation device 11 obtains the access ticket t from the access ticket memory unit 113, and obtains S by executing the following equation (8-2).

$$S=tu' \qquad (8\text{-}2)$$

4. The multiple generating unit 119 within the proof data generation device 11 obtains the user unique identifying information e from the user unique identifying information memory unit 115, and executes the calculation of the following equation (8-3):

$$F(p, e, a, b) \qquad (8\text{-}3)$$

5. The second computing unit 114 within the proof data generation device 11 obtains S' by executing the calculation of the following equation (8-4) by use of data generated in the multiple generating unit 119:

$$S'=F(p, e, a, b)u' \qquad (8\text{-}4)$$

6. The proof data generating unit 117 within the proof data generation device 11 obtains S' and S from the first and second computing units 112, 114, and obtains R by executing the calculation of the following equation (8-5):

$$R=S+S' \qquad (8\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, and executes the calculation of the following equation (8-6):

$$v=(r^{-1}\bmod q)R \qquad (8\text{-}6)$$

Then, the calculation of the following equation (8-7) is executed by use of the calculated result v and the C stored in the authentication data memory unit 104:

$$L'=C-v \qquad (8\text{-}7)$$

9. The verification computing unit 103 calculates the data K' corresponding to the point L'. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Ninth embodiment]

A ninth embodiment according to the present invention is a modified example of the seventh embodiment and in which a random number effect is given and decryption is carried out on the proof data generation device 11 side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the sixth embodiment.

As a method of making the point on the elliptic curve and the data correspond to each other, it is possible to use a method similar to that of the sixth embodiment.

Incidentally an order of the point P is set to q.

FIG. 6 shows the manner in which the proof data generation device 11 according to this embodiment is arranged, and FIG. 5 shows the manner in which the proof data verification device 10 according to this embodiment is arranged. Also, FIG. 16 shows an operation of the proof data generation device 11 according to this embodiment, and FIG. 20 shows an operation of the proof data verification device 10 according to this embodiment.

An operation of this embodiment will be described hereinafter.

1. The proof data verification device 10 is activated when accessed by the user.

2. A seed for authentication data u on the point E is stored in the a seed for authentication data memory unit 105, and authentication data C on the point E is stored in the authentication data memory unit 104.

The proof data verification device 11 stores the authentication data u', C', and parameters p, a, b, which are stored in the access ticket public key memory unit 101 so as to define the elliptic curve E, in the reception data memory unit 111 within the proof data generation device 11.

The proof data verification device 10 generates the random number r by the random number generating unit 106 in such a manner that the random number r becomes relatively prime with the order q of the point P stored in the access ticket public key memory unit 101, and then stores the thus generated random number r in the random number memory unit 107.

Here, the authentication data u' is generated as follows. That is, the random number effect supplying unit 109 obtains the data u from the a seed for authentication data memory unit 105, and executes the calculation of the following equation (9-1):

$$u'=ru \qquad (9\text{-}1)$$

Also, the authentication data C' is generated as follows: The data C stored in the authentication data memory unit 104 is obtained and the calculation of the following equation (9-2) is executed:

$$C'=rC \qquad (9\text{-}2)$$

3. The first computing unit 112 within the proof data generation device 11 obtains the access ticket t from the access ticket memory unit 113, and obtains S by executing the following equation (9-3).

$$S=tu' \qquad (9\text{-}3)$$

4. The multiple generating unit 119 within the proof data generation device 11 obtains the user unique identifying information e from the user unique identifying information memory unit 115, and executes the calculation of the following equation (9-4):

$$F(p, e, a, b) \qquad (9\text{-}4)$$

5. The second computing unit 114 within the proof data generation device 11 obtains S' by executing the calculation of the following equation (9-5) by use of data generated in the multiple generating unit 119:

$$S'=F(p, e, a, b)u' \qquad (9\text{-}5)$$

6. The proof data generating unit 117 within the proof data generation device 11 obtains S' and S from the first and second computing units 112, 114, and obtains R by executing the calculation of the following equation (9-6):

$$R=C'-S-S' \qquad (9\text{-}6)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, extracts the order q of the point P from the access ticket public key memory unit 101, and executes the calculation of the following equation (9-7):

$$L'=(r^{-1}modq)R \qquad (9\text{-}7)$$

9. The verification computing unit 103 calculates the data K' corresponding to the point L'. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Tenth embodiment]

A tenth embodiment according to the present invention shows a modified example of the sixth embodiment similarly to the eighth embodiment. In this embodiment, a random number effect is given and decryption is carried out on the proof data verification device 10 side. This embodiment is different from the eighth embodiment in the manner of giving a random number effect.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the sixth embodiment.

Also, ass a method of making the point on the elliptic curve and the data corresponding to each other, it is possible to use a method similar to that of the sixth embodiment.

FIG. 6 shows the manner in which the proof data generation device according to this embodiment is arranged, and FIG. 7 shows the manner in which the proof data verification device according to this embodiment is arranged. Also, FIG. 17 shows an operation of the proof data generation device according to this embodiment, and FIG. 22 shows an operation of the proof data verification device according to this embodiment.

An operation of this embodiment will be described hereinafter.

1. The proof data verification device 10 is activated when accessed by the user.

2. A seed for authentication data u on the point E is stored in the a seed for authentication data memory unit 105, and authentication data C on the point E is stored in the authentication data memory unit 104.

The proof data verification device 10 stores the authentication data u' and parameters p, a, b, which are stored in the access ticket public key memory unit 101 so as to define the elliptic curve E, in the reception data memory unit 111 within the proof data generation device 11.

The proof data verification device 10 generates the random number r by the random number generating unit 106 and then stores the thus generated random number r in the random number memory unit 107.

Here, the authentication data u is generated as follows. That is, the random number effect supplying unit 109 obtains the data u from the a seed for authentication data memory unit 105, and executes the calculation of the following equation (10-1):

$$u'=r+rP \qquad (10\text{-}1)$$

3. The first computing unit 112 within the proof data generation device 11 obtains the access ticket t from the access ticket memory unit 113, and obtains S by executing the following equation (10-2).

$$S=tu' \qquad (10\text{-}2)$$

4. The multiple generating unit 119 within the proof data generation device 11 obtains the user unique identifying information e from the user unique identifying information memory unit 115, and executes the calculation of the following equation (10-3):

$$F(p, e, a, b) \qquad (10\text{-}3)$$

5. The second computing unit 114 within the proof data generation device 11 obtains S' by executing the calculation of the following equation (10-4) by use of data generated in the multiple generating unit 119:

$$S'=F(p, e, a, b)u' \qquad (10\text{-}4)$$

6. The proof data generating unit 117 within the proof data generation device 11 obtains S' and S from the first and second computing units 112, 114, and obtains R by executing the calculation of the following equation (10-5):

$$R=S+S' \qquad (10\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, and executes the calculation of the following equation (10-6):

$$v=R-rY \qquad (10\text{-}6)$$

Then, C is extracted from the authentication data memory unit 104, and the calculation of the following equation (10-7) is executed by use of the value of the above-mentioned v:

$$L'=C-v \qquad (10\text{-}7)$$

9. The verification means calculates the data K' corresponding to the point L'. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Eleventh embodiment]

An eleventh embodiment according to the present invention is a modified example of the seventh embodiment and in which a random number effect is given and decryption is carried out on the proof data generation device 11 side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the sixth embodiment.

Also, as a method of making the point on the elliptic curve and the data corresponding to each other, it is possible to use a method similar to that of the sixth embodiment.

FIG. 6 shows the manner in which the proof data generation device 11 according to this embodiment is arranged, and FIG. 5 shows the manner in which the proof data verification device 10 according to this embodiment is arranged. Also, FIG. 16 shows an operation of the proof data generation device 11 according to this embodiment, and FIG. 23 shows an operation of the proof data verification device 10 according to this embodiment.

An operation of this embodiment will be described hereinafter.

1. The proof data verification device 10 is activated when accessed by the user.

2. A seed for authentication data u on the point E is stored in the a seed for authentication data memory unit 105, and authentication data C on the point E is stored in the authentication data memory unit 104.

The proof data verification device 10 stores the authentication data u', C' and parameters p, a, b, which are stored in the access ticket public key memory unit 101 so as to define the elliptic curve E, in the reception data memory unit 111 within the proof data generation device 11. However, it is to be noted that C'=C.

The proof data verification device 10 generates the random number r by the random number generating unit 106 and then stores the thus generated random number r in the random number memory unit 107.

Here, the authentication data u' is generated as follows. That is, the random number effect supplying unit 109 obtains the data u from the a seed for authentication data memory unit 105, and executes the calculation of the following equation (11-1):

$$u'=r+ra \qquad (11\text{-}1)$$

3. The first computing unit 112 within the proof data generation device 11 obtains the access ticket t from the access ticket memory unit 113, and obtains S by executing the following equation (11-2).

$$S=tu' \qquad (11\text{-}2)$$

4. The multiple generating unit 119 within the proof data generation device 11 obtains the user unique identifying information e from the user unique identifying information memory unit 115, and executes the calculation of the following equation (11-3):

$$F(p, e, a, b) \qquad (11\text{-}3)$$

5. The second computing unit 114 within the proof data generation device 11 obtains S' by executing the calculation of the following equation (11-4) by use of data generated in the multiple generating unit 119:

$$S'=F(p, e, a, b)u' \qquad (11\text{-}4)$$

6. The proof data generating unit 117 within the proof data generation device 11 obtains S' and S from the first and second computing units 112, 114, and obtains R by executing the calculation of the following equation (11-5):

$$R=C'-S-S' \qquad (11\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, extracts Y from the access ticket public key memory unit 101, and executes the calculation of the following equation (11-6):

$$L'=R+rY \qquad (11\text{-}6)$$

9. The verification means calculates the data K' corresponding to the point L'. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Twelfth embodiment]

A twelfth embodiment according to the present invention is a modified example of the sixth embodiment and in which a random number effect is given and decryption is carried out on the proof data verification device 10 side.

In this embodiment, a method of setting an elliptic curve on a finite field, a method of arranging an encryption on an elliptic curve E, a method of a seed for authentication data u and authentication data C, and features that should be satisfied are similar to those of the sixth embodiment. In this embodiment, the access ticket t is generated by the following equation (12-0):

$$t=X-F(p, e, a, b, Y) \tag{12-0}$$

Also, as a method of making the point on the elliptic curve and the data correspond to each other, it is possible to use a method similar to that of the sixth embodiment.

FIG. 6 shows the manner in which the proof data generation device according to this embodiment is arranged, and FIG. 7 shows the manner in which the proof data verification device according to this embodiment is arranged. Also, FIG. 15 shows an operation of the proof data generation device according to this embodiment, and FIG. 24 shows an operation of the proof data verification device according to this embodiment.

An operation of this embodiment will be described hereinafter.

1. The proof data verification device 10 is activated when accessed by the user.

2. A seed for authentication data u on the point E is stored in the a seed for authentication data memory unit 105, and authentication data C on the point E is stored in the authentication data memory unit 104.

The proof data verification device 10 stores the authentication data u' and parameters p, a, b, which are stored in the access ticket public key memory unit 101 so as to define the elliptic curve E, and the public key Y in the reception data memory unit 111 within the proof data generation device 11.

The proof data verification device 10 generates the random number r by the random number generating unit 106 and then stores the thus generated random number r in the random number memory unit 107.

Here, the authentication data u' is generated as follows. That is, the random number effect supplying unit 109 obtains the data u from the a seed for authentication data memory unit 105, and executes the calculation of the following equation (12-1):

$$u'=r+rP \tag{12-1}$$

3. The first computing unit 112 within the proof data generation device 11 obtains the access ticket t from the access ticket memory unit 113, and obtains S by executing the following equation (12-2).

$$S=tu' \tag{12-2}$$

4. The multiple generating unit 119 within the proof data generation device 11 obtains the user unique identifying information e from the user unique identifying information memory unit 115, and executes the calculation of the following equation (12-3):

$$F(p, e, a, b, Y) \tag{12-3}$$

5. The second computing unit 114 within the proof data generation device 11 obtains S' by executing the calculation of the following equation (12-4) by use of data generated in the multiple generating unit 119:

$$S'=F(p, e, a, b, Y)u' \tag{12-4}$$

6. The proof data generating unit 117 within the proof data generation device 11 obtains S' and S from the first and second computing units 112, 114, and obtains R by executing the calculation of the following equation (12-5):

$$R=S+S' \tag{12-5}$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, and executes the calculation of the following equation (12-6):

$$v=R-rY \tag{12-6}$$

Then, C is extracted from the authentication data memory unit 104, and the calculation of the following equation (12-7) is executed by use of the value of the above-mentioned v:

$$L'=C-v \tag{12-7}$$

9. The verification computing unit 103 calculates the data K' corresponding to the point L'. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to the one of the first embodiment.

[Thirteenth embodiment]

A thirteenth embodiment according to the present invention is a modified example of the sixth embodiment and in which a random number effect is given and decryption is carried out on the proof data verification device 10 side.

In this embodiment, a method of setting an elliptic curve on a finite field, a method of arranging an encryption on an elliptic curve E, a method of generating an access ticket t, a seed for authentication data, and features that should be satisfied are similar to those of the sixth embodiment.

In this embodiment, proof data is set to K. A point C ($c_x$, $c_y$) on a point E which is obtained by multiplying the access ticket public key Y by the above-mentioned predetermined random number z is generated by the following equation (13-1):

$$C(c_x, c_y)=zY \tag{13-1}$$

Further, a calculated result obtained by calculating the proof data K and a value cx of x coordinate at the point C in an exclusive-OR fashion is set to authentication data c.

$$c=K \oplus cx \tag{13-2}$$

FIG. 6 shows the manner in which the proof data generation device according to this embodiment is arranged, and FIG. 3 shows the manner in which the proof data verification device according to this embodiment is arranged. Also, FIG. 17 shows an operation of the proof data generation device according to this embodiment, and FIG. 31 shows an operation of the proof data verification device according to this embodiment.

An operation of this embodiment will be described hereinafter.

1. The proof data verification device 10 is activated when accessed by the user.

2. A seed for authentication data c is stored in the authentication data memory unit 104.

The proof data verification device 10 stores the authentication data u'(=u) and parameters p, a, b, which are stored in the access ticket public key memory unit 101 so as to define the elliptic curve E, in the reception data memory unit 111 within the proof data generation device 11.

3. The first computing unit 112 within the proof data generation device 11 obtains the access ticket t from the access ticket memory unit 113, and obtains S by executing the following equation (13-3).

$$S=tu' \qquad (13\text{-}3)$$

4. The multiple generating unit 119 within the proof data generation device 11 obtains the user unique identifying information e from the user unique identifying information memory unit 115, and executes the calculation of the following equation (13-4):

$$F(p, e, a, b) \qquad (13\text{-}4)$$

5. The second computing unit 114 within the proof data generation device 11 obtains S' by executing the calculation of the following equation (13-5) by use of data generated in the multiple generating unit 119:

$$S'=F(p, e, a, b)u' \qquad (13\text{-}5)$$

6. The proof data generating unit 117 within the proof data generation device 11 obtains R' and S from the first and second computing units 112, 114, and obtains R by executing the calculation of the following equation (13-6):

$$R=S+S' \qquad (13\text{-}6)$$

7. The proof data generation device 11 returns R to the reception data memory unit 102 of the proof data verification device 10.

8. The random number effect eliminating unit 103 within the proof data verification device 10 extracts the authentication data c from the authentication data memory unit 104, and calculates an exclusive-OR of proof data R and x coordinates $v_x$ as follows:

$$K'=v_x \oplus c \text{ (however, coordinates at the point R are set to } (v_x, v_y)) \qquad (13\text{-}7)$$

9. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Fourteenth embodiment]

A fourteenth embodiment according to the present invention is a modified example of the thirteenth embodiment and in which a random number effect is given and decryption is carried out on the proof data generation device 11 side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the thirteenth embodiment.

FIG. 6 shows the manner in which the proof data generation device according to this embodiment is arranged, and FIG. 4 shows the manner in which the proof data verification device according to this embodiment is arranged. Also, FIG. 35 shows an operation of the proof data generation device according to this embodiment, and FIG. 32 shows an operation of the proof data verification device according to this embodiment.

An operation of this embodiment will be described hereinafter.

1. The proof data verification device 10 is activated when accessed by the user.

2. The proof data verification device 10 stores the authentication data u'(=u) and C'(=c) and parameters p, a, b, which are stored in the access ticket public key memory unit 101 so as to define the elliptic curve E, in the reception data memory unit 111 within the proof data generation device 11.

3. The first computing unit 112 within the proof data generation device 11 obtains the access ticket t from the access ticket memory unit 113, and obtains S by executing the following equation (14-1).

$$S=tu' \qquad (14\text{-}1)$$

4. The multiple generating unit 119 within the proof data generation device 11 obtains the user unique identifying information e from the user unique identifying information memory unit 115, and executes the calculation of the following equation (14-2):

$$F(p, e, a, b) \qquad (14\text{-}2)$$

5. The second computing unit 114 within the proof data generation device 11 obtains S' by executing the calculation of the following equation (14-3) by use of data generated in the multiple generating unit 119:

$$S'=F(p, e, a, b)u' \qquad (14\text{-}3)$$

6. The proof data generating unit 117 within the proof data generation device 11 obtains S' and S from the first and second computing units 112, 114, and obtains L by executing the calculation of the following equation (14-4):

$$L=S+S' \qquad (14\text{-}4)$$

Then, R is obtained by use of the proof data c and the x coordinate $v_x$ at the point L in accordance with the calculation of the following equation (14-5)]

$$R=v_y \oplus C' \text{ (however, coordinates at the point L are set to } (v_x, v_y)) \qquad (14\text{-}5)$$

7. The proof data generation device 11 returns R to the reception data memory unit 102 of the proof data verification device 10.

8. So long as a combination of the access ticket t and the user unique identifying information e used in the proof data generation device 11 is correct, the received R and the verification data K agree with each other so that verification is carried out correctly.

When the received R and the verification data K are compared with each other, it is possible to use a method similar to that of the first embodiment.

[Fifteenth embodiment]

A fifteenth embodiment according to the present invention is a modified example of the thirteenth embodiment and in which decryption is carried out on the proof data verification device 10 side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the thirteenth embodiment. In this embodiment, an order of point P is set to q.

FIG. 6 shows the manner in which the proof data generation device according to this embodiment is arranged, and FIG. 7 shows the manner in which the proof data verification device according to this embodiment is arranged. Also, FIG. 17 shows an operation of the proof data generation device according to this embodiment, and FIG. 33 shows an operation of the proof data verification device according to this embodiment.

An operation of this embodiment will be described hereinafter.

1. The proof data verification device 10 is activated when accessed by the user.

2. Authentication data c is stored in the authentication data memory unit 104.

The proof data verification device 10 generates the random number r by the random number generating unit 106 in such a manner that the random number r becomes relatively prime with the order q of the point P stored in the access ticket public key memory unit 101, and records the thus generated random number r in the random number memory unit 107.

Then, the random number supplying unit 109 obtains the data u from the a seed for authentication data memory unit 105, and executes the calculation of the following equation (15-1):

$$u'=ru \qquad (15\text{-}1)$$

The proof data verification device 10 stores the thus generated authentication data u' and parameters p, a, b, which are stored in the access ticket public key memory unit 101 so as to define the elliptic curve E, in the reception data memory unit 111 within the proof data generation device 11.

3. The first computing unit 112 within the proof data generation device 11 obtains the access ticket t from the access ticket memory unit 113, and obtains S by executing the following equation (15-2).

$$S=tu' \qquad (15\text{-}2)$$

4. The multiple generating unit 119 within the proof data generation device 11 obtains the user unique identifying information e from the user unique identifying information memory unit 115, and executes the calculation of the following equation (15-3):

$$F(p, e, a, b) \qquad (15\text{-}3)$$

5. The second computing unit 114 within the proof data generation device 11 obtains S' by executing the calculation of the following equation (15-4) by use of data generated in the multiple generating unit 119:

$$S'=F(p, e, a, b)u' \qquad (15\text{-}4)$$

6. The proof data generating unit 117 within the proof data generation device 11 obtains S' and S from the first and second computing units 112, 114, and obtains R by executing the calculation of the following equation (15-5):

$$R=S+S' \qquad (15\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, extracts the order q of the point P from the access ticket public key memory unit 101, and calculates the following equation (15-6):

$$v=(r^{-1}modq)R \qquad (15\text{-}6)$$

9. The verification computing unit 103 within the proof data verification device 10 extracts the authentication data c from the authentication data memory unit 104, and calculates an exclusive OR K' of x coordinates $v_x$ of c and v as follows:

$K'=v_y \oplus c$ (however, coordinates at the point R are set to $(v_x, v_y)$) (15-7)

10. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Sixteenth embodiment]

A sixteenth embodiment according to the present invention is a modified example of the thirteenth embodiment and in which decryption is carried out on the proof data verification device 10 side. The sixteenth embodiment differs from the fifteenth embodiment in the manner of handling a random number effect.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the thirteenth embodiment.

FIG. 6 shows the manner in which the proof data generation device according to this embodiment is arranged, and FIG. 7 shows the manner in which the proof data verification device according to this embodiment is arranged. Also, FIG. 17 shows an operation of the proof data generation device according to this embodiment, and FIG. 34 shows an operation of the proof data verification device according to this embodiment.

An operation of this embodiment will be described hereinafter.

1. The proof data verification device 10 is activated when accessed by the user.

2. Authentication data c is stored in the authentication data memory unit 104.

The proof data verification device 10 generates the random number r by the random number generating unit 106, and records the thus generated random number r in the random number memory unit 107.

Then, the random number supplying unit 109 obtains the data u from the a seed for authentication data memory unit 105, and executes the calculation of the following equation (16-1):

$$u'=u+rP \qquad (16\text{-}1)$$

The proof data verification device 10 stores the thus generated authentication data u' and parameters p, a, b, which are stored in the access ticket public key memory unit 101 so as to define the elliptic curve E, in the reception data memory unit 111 within the proof data generation device 11.

3. The first computing unit 112 within the proof data generation device 11 obtains the access ticket t from the access ticket memory unit 113, and obtains S by executing the following equation (16-2).

$$S=tu'\quad(16\text{-}2)$$

4. The multiple generating unit 119 within the proof data generation device 11 obtains the user unique identifying information e from the user unique identifying information memory unit 115, and executes the calculation of the following equation (16-3):

$$F(p, e, a, b)\quad(16\text{-}3)$$

5. The second computing unit 114 within the proof data generation device 11 obtains S' by executing the calculation of the following equation (16-4) by use of data generated in the multiple generating unit 119:

$$S'=F(p, e, a, b)u'\quad(16\text{-}4)$$

6. The proof data generating unit 117 within the proof data generation device 11 obtains S' and S from the first and second computing units 112, 114, and obtains R by executing the calculation of the following equation (16-5):

$$R=S+S'\quad(16\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, and calculates the following equation (16-6):

$$v=R-rY\quad(16\text{-}6)$$

9. The verification computing unit 103 within the proof data verification device 10 extracts the authentication data c from the authentication data memory unit 104, and calculates an exclusive OR K' of x coordinates $v_x$ of c and v as follows:

$$K'=v_x \oplus c \text{ (however, coordinates at the point R are set to } (v_x, v_y))\quad(16\text{-}7)$$

10. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Seventeenth embodiment]

A seventeenth embodiment according to the present invention is a modified example of the thirteenth embodiment and in which decryption is carried out on the proof data verification device 10 side.

In this embodiment, a method of setting an elliptic curve on a finite field, a method of arranging an encryption on an elliptic curve E, a method of generating an access ticket t, a seed for authentication data u and authentication data C, and features that should be satisfied are similar to those of the thirteenth embodiment. Incidentally, in this embodiment, an order of point P is set to q. In this embodiment, the access ticket is generated by the following equation (17-0):

$$t=X-F(p, e, a, b, Y)\quad(17\text{-}0)$$

FIG. 6 shows the manner in which the proof data generation device according to this embodiment is arranged, and FIG. 7 shows the manner in which the proof data verification device according to this embodiment is arranged. Also, FIG. 15 shows an operation of the proof data generation device according to this embodiment, and FIG. 36 shows an operation of the proof data verification device according to this embodiment.

An operation of this embodiment will be described hereinafter.

1. The proof data verification device 10 is activated when accessed by the user.

2. Authentication data c is stored in the authentication data memory unit 104.

The proof data verification device 10 generates the random number r by the random number generating unit 106 in such a manner that the random number r becomes relatively prime with the order q of the point P stored in the access ticket public key memory unit 101, and records the thus generated random number r in the random number memory unit 107.

Then, the random number supplying unit 109 obtains the data u from the a seed for authentication data memory unit 105, and executes the calculation of the following equation (17-1):

$$u'=ru\quad(17\text{-}1)$$

The proof data verification device 10 stores the thus generated authentication data u', parameters p, a, b, which are stored in the access ticket public key memory unit 101 so as to define the elliptic curve E, and the public key Y in the reception data memory unit 111 within the proof data generation device 11.

3. The first computing unit 112 within the proof data generation device 11 obtains the access ticket t from the access ticket memory unit 113, and obtains S by executing the following equation (17-2).

$$S=tu'\quad(17\text{-}2)$$

4. The multiple generating unit 119 within the proof data generation device 11 obtains the user unique identifying information e from the user unique identifying information memory unit 115, and executes the calculation of the following equation (17-3):

$$F(p, e, a, b, Y)\quad(17\text{-}3)$$

5. The second computing unit 114 within the proof data generation device 11 obtains S' by executing the calculation of the following equation (17-4) by use of data generated in the multiple generating unit 119:

$$S'=F(p, e, a, b, Y)u'\quad(17\text{-}4)$$

6. The proof data generating unit 117 within the proof data generation device 11 obtains S' and S from the first and second computing units 112, 114, and obtains R by executing the calculation of the following equation (17-5):

$$R=S+S'\quad(17\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, extracts the order q of the point P from the access ticket public key memory unit 101, and calculates the following equation (17-6):

$$v=(r^{-1}mod\,q)R \quad (17\text{-}6)$$

9. The verification computing unit 103 within the proof data verification device 10 extracts the authentication data c from the authentication data memory unit 104, and calculates an exclusive OR K' of x coordinates $v_x$ of c and v as follows:

$K'=v_y \oplus c$ (however, coordinates at the point R
are set to $(v_x, v_y)$) (17-7)

10. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

[Eighteenth embodiment]

An eighteenth embodiment according to the present invention is a modified example of the thirteenth embodiment and in which decryption is carried out on the proof data verification device 10 side.

In this embodiment, a method of setting an elliptic curve on a finite field, a method of arranging an encryption on an elliptic curve E, a method of generating a seed for authentication data u and authentication data C, and features that should be satisfied are similar to those of the thirteenth embodiment. Moreover, in this embodiment, the access ticket t is generated by the following equation (18-0):

$$t=X-F(p, e, a, b, Y) \quad (18\text{-}0)$$

FIG. 6 shows the manner in which the proof data generation device according to this embodiment is arranged, and FIG. 7 shows the manner in which the proof data verification device according to this embodiment is arranged. Also, FIG. 15 shows an operation of the proof data generation device according to this embodiment, and FIG. 37 shows an operation of the proof data verification device according to this embodiment.

An operation of this embodiment will be described hereinafter.

1. The proof data verification device 10 is activated when accessed by the user.

2. Authentication data c is stored in the authentication data memory unit 104.

The proof data verification device 10 generates the random number r by the random number generating unit 106, and records the thus generated random number r in the random number memory unit 107.

Then, the random number supplying unit 109 obtains the data u from the a seed for authentication data memory unit 105, and executes the calculation of the following equation (18-1):

$$u'=u+rP \quad (18\text{-}1)$$

The proof data verification device 10 stores the thus generated authentication data u', parameters p, a, b, which are stored in the access ticket public key memory unit 101 so as to define the elliptic curve E, and the public key Y in the reception data memory unit 111 within the proof data generation device 11.

3. The first computing unit 112 within the proof data generation device 11 obtains the access ticket t from the access ticket memory unit 113, and obtains S by executing the following equation (18-2).

$$S=tu' \quad (18\text{-}2)$$

4. The multiple generating unit 119 within the proof data generation device 11 obtains the user unique identifying information e from the user unique identifying information memory unit 115, and executes the calculation of the following equation (18-3):

$$F(p, e, a, b, Y) \quad (18\text{-}3)$$

5. The second computing unit 114 within the proof data generation device 11 obtains S' by executing the calculation of the following equation (18-4) by use of data generated in the multiple generating unit 119:

$$S'=F(p, e, a, b, Y)u' \quad (18\text{-}4)$$

6. The proof data generating unit 117 within the proof data generation device 11 obtains S' and S from the first and second computing units 112, 114, and obtains R by executing the calculation of the following equation (18-5):

$$R=S+S' \quad (18\text{-}5)$$

7. The proof data generation device 11 returns R to the reception data memory unit 102 of the proof data verification device 10.

8. The random number effect eliminating unit 108 within the proof data verification device 10 extracts the previously-generated random number r from the random number memory unit 107, and calculates the following equation (18-6):

$$v=R-rY \quad (18\text{-}6)$$

9. The verification computing unit 103 within the proof data verification device 10 extracts the authentication data c from the authentication data memory unit 104, and calculates an exclusive OR K' of x coordinates $v_x$ of c and v as follows:

$K'=v_y \oplus c$ (however, coordinates at the point R
are set to $(v_x, v_y)$) (18-7)

10. So long as a combination of the access ticket t and the user unique identifying information e used in the proof data generation device 11 is correct, the calculated result K' and the verification data K agree with each other so that verification is carried out correctly.

When the calculated result K' and the verification data K are compared with each other, it is possible to use a method similar to that of the first embodiment.

As is clear from the above description, according to the present invention, since the proof support data (access ticket) is introduced, the unique security characteristic information and the user unique identifying information can be made independent. Accordingly, it is sufficient that both of the protect side and the user side is provided with only one piece of inherent information.

The access ticket is a data calculated based on inherent information of a specific user and unique security characteristic information, and it is difficult to calculate the unique security characteristic information from the access ticket without having user unique identifying information. Then, correct proof data is calculated only when a correct combination of user unique identifying information and access ticket, i.e. a combination of user unique identifying information and access ticket calculated based on the user unique identifying information is inputted. Accordingly, the user holds the inherent information in advance, and the protect side such as a programmer prepares unique security characteristic information independently of the user unique identifying information. The, the protect side makes and distributes the access ticket in response to the user unique identifying information and unique security characteristic information used in making an application program or the like, thereby making it possible to authenticating user's access rights such as an execution control.

Furthermore, according to the present invention, since an asymmetric key encryption system defined on the elliptic curve on the finite field is used as the unique security characteristic information, in comparison with the case in which RSA public key encryption key or the like is used, even when a length of a key is reduced, equivalent safety can be obtained, and also processing can be executed at high speed.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A device for authenticating user's access rights to resources by verifying legitimacy of proof data generated in order to prove the right of said user, said device for authenticating user's access rights to resources comprising:

first memory means for storing first authentication data;

second memory means for storing unique identifying information of the user;

third memory means for storing proof support information which are executed results obtained when said the user unique identifying information and unique security characteristic information are calculated in a predetermined manner;

proof data generation means for generating proof data by the application of specified calculation to said first authentication data stored in said first memory means, said the user unique identifying information stored in said second memory means, and said proof support information stored in said third memory means; and verification means for verifying the legitimacy of said proof data by verifying that said authentication data and unique security characteristic information satisfy a specific predefined relation, provided that, in particular, said unique security characteristic information X is a decryption key in an asymmetric cryptosystem arranged in such a way as to satisfy a relationship expressed as $Y=a^x \bmod p$, where p is a modulus and a is a positive integer, said proof data generation means generating a value which is obtained by multiplying said first authentication data stored in said first memory means by a power of said X value under the modulus p as proof data, and said verfication means verifies the legitimacy of proof data by verifying that the proof proof data generated by said proof data generation means is identical with decryption of the data which is encrypted with encryption key corresponding to said decryption key.

2. The device for authenticating user's access rights to resources according to claim 1, wherein fourth memory means is provided for storing second authentication data, said second authentication data is obtained by encrypting proper data by use of an encryption key corresponding to said decryption key, and said verification means verifies the legitimacy of the results which obtained by the application of specified calculation to said proof data generated by said proof data generation means and said second authentication data stored in said fourth memory means by verifying that the results is identical with decryption of said second authentication data by said decryption key corresponding to said encryption key which is said unique security characteristic information.

3. The device for authenticating user's access rights to resources according to claim 1, further comprising random number generation means, said random number generation means storing randomized values by resultant random numbers as said first authentication data.

4. The device for authenticating user's access rights to resources as claimed in claim 3, wherein said verification means de-randomize said proof data generated by said proof data generation means by executing predefined calculations to said random number and said proof data.

5. The device for authenticating user's access rights to resources according to claim 3, wherein fifth memory means is provided for storing a seed for authentication data and sixth memory means for storing random numbers generated by said random number generation means, and said random number generation means stores generated random numbers in said sixth memory means while randomizing the seed for authentication data stored in said fifth memory means by executing predefined calculations to the random number stored in said sixth memory means and the seed stored in said fifth memory means and then storing the randomized seed as first authentication data in said first memory means.

6. The device for authenticating user's access rights to resources as claimed in claim 5, wherein said data verification means de-randomize proof data generated by said proof data generation means by executing predefined calculations to the random number stored in said sixth memory means and said proof data.

7. A device for authenticating user's access rights to resources by verifying legitimacy of proof data generated in order to prove said user's right, said device for authenticating user's access rights to resources comprising:

first memory means for storing first authentication data;

second memory means for storing unique identifying information of the user;

third memory means for storing proof support information which are results obtained by the application of specified calculation to said the user unique identifying information and unique security characteristic information;

fourth memory means for storing second authentication data;

random number generation means;

proof data generation means for generating proof data by the application of specified calculation to said first authentication data stored in said first memory means, said the user unique identifying information stored in said second memory means, and said proof support information stored in said third memory means; and verification means for verifying whether or not said proof data generated by said proof data generation means is generated based on said unique security characteristic information, said second authentication data is obtained by encrypting predetermined data by use of an encryption key corresponding to said decryption key, said random number generation means storing, in said first memory means, a set of a first authentication data $C_1$ and a second authentication data $C_2$ which are randomized by said random number, said verification means verifying the legitimacy of a value which is de-randomize proof data generated by said proof data generation means by verifying that the value is identical with decryption of the second authentication data $C_2$ stored in said fourth memory means by decryption key which is said unique security characteristic information;

provided that, in particular, said unique security characteristic information X is a decryption key in an asymmetric cryptosystem arranged in such a way as to satisfy a relationship expressed as $Y=a^x \bmod p$ where p is a modulus and a is a positive integer.

8. The device for authenticating user's access rights to resources according to claim 7, wherein fifth memory means is provided for storing a seed for authentication data and sixth memory means for storing generated random numbers, and said random number generation means stores generated random numbers in said sixth memory means and stores, in said first memory means, a set of value which is obtained by randomizing the seed for authentication data stored in said fifth memory means and a value which is obtained by randomizing second authentication data stored in said fourth memory means.

9. The device for authenticating user's access rights to resources according to claim 7, wherein fifth memory means is provided for storing a seed for authentication data and sixth memory means for storing generated random numbers, and said random number generation means stores the random numbers thus generated in said sixth memory means and also stores, in said first memory means, a set of a value which is obtained by randomizing the seed for authentication data stored in said fifth memory means and said second authentication data stored in said fourth memory means.

10. The device for authenticating user's access rights to resources as claimed in claim 8, wherein said data verification means de-randomize the proof data generated by said proof data generation means by executing predefined calculations to said random number and said proof data.

11. The device for authenticating user's access rights to resources as claimed in claim 1, wherein said proof data generation means comprises first calculation means, second calculation means and third calculation means, said first calculation means calculates authentication data stored in said first memory means and proof support information stored in said third memory means in a predetermined manner, said second calculation means calculates authentication data stored in said first memory means and user unique identifying information stored in said second memory means in a predetermined manner, and said third calculation means computes calculated results of said first calculation means and calculated results of said second calculation means in a predetermined manner, thereby resulting in said proof data being generated.

12. The device for authenticating user's access rights to resources as claimed in claim 2, wherein when unique security characteristic information is a decryption key X which satisfies $Y=a^x \bmod p$ where p is the modulus and a is the positive integer, an encryption key corresponding to said key X is Y, u is a number ($u=a^z \bmod p$) which is obtained by exponentiation of said a by an exponent of a predetermined number z under said modulus p and C is a product of a number which is obtained by exponentiation of said Y by an exponent of said random number z under said modulus p and data K ($C=Y^z K \bmod p$), u is stored in said first memory means as authentication data, C is stored in said fourth memory means, and said verification means verifies that data which is obtained by dividing C stored in said fourth memory means by proof data R generated by said proof data generation means and said K are congruent to each other under the modulus p ($K \bmod p = CR^{-1} \bmod p$).

13. The device for authenticating user's access rights to resources as claimed in claim 6, wherein when unique security characteristic information is a decryption key X which satisfies $Y=a^x \bmod p$ where p is the modulus and a is the positive integer, an encryption key corresponding to said key X is Y, u is a number ($u=a^z \bmod p$) which is obtained by exponentiation of said a by an exponent of a predetermined number z under said modulus p and C is a product of a number which is obtained by exponentiation of said Y by an exponent of said random number z under said modulus p and data K ($C=Y^z K \bmod p$), u is stored in said fifth memory means as a seed for authentication data, C is stored in said fourth memory means, said random number generation means stores a number $u'(=u^r \bmod p)$ which is obtained by exponentiation of said u by an exponent of a generated random number r under the modulus p in said first memory means together with the modulus p as authentication data, said verification means calculates a number v expressed by the following equation (1):

$$(v = R^{(r^{-1} \bmod (p-1))} \bmod p) \quad (1)$$

where proof data R generated by said proof data generation means is squared by use of an inverse number of a modulus (p−1) of the random number r stored in said sixth memory means as an exponent under the modulus p, and said verification means verifies that data which is obtained by dividing C stored in said fourth memory means by said v and said K are congruent to each other under the modulus p ($K \bmod p = Cv^{-1} \bmod p$).

14. The device for authenticating user's access rights to resources as claimed in claim 6, wherein when unique security characteristic information is a decryption key X which satisfies $Y=a^x \bmod p$ where p is the modulus and a is the positive integer, an encryption key corresponding to said key X is Y, u is a number ($u=a^z \bmod p$) which is obtained by exponentiation of said a by an exponent of a predetermined number z under said modulus p and C is a product of a number which is obtained by exponentiation of said Y by an exponent of said random number z under said modulus p and data K ($C=Y^z K \bmod p$), u is stored in said fifth memory means as a seed for authentication data, C is stored in said fourth memory means, said random number generation means stores a number u' ($=a^r u \bmod p$) which is obtained by exponentiation of said a by an exponent of a generated random number r under the modulus p in said first memory means together with the modulus p as authentication data, said verification means calculates a number v ($=RY^{-r} \bmod p$) which is obtained by dividing proof data R generated by proof data generation means under said modulus p by a value which is obtained by exponentiation of said Y by the random number r stored in said sixth memory means, and said verification means verifies that data which is obtained by dividing C stored in said fourth memory means by said v and said K are congruent to each other under the modulus p ($K \bmod p = Cv^{-1} \bmod p$).

15. The device for authenticating user's access rights to resources as claimed in claim 8, wherein when unique security characteristic information is a decryption key X which satisfies $Y=a^x \bmod p$ where p is the modulus and a is the positive integer, an encryption key corresponding to said key X is Y, u is a number ($u=a^z \bmod p$) which is obtained by exponentiation of said a by an exponent of a predetermined number z under said modulus p and C is a product of a number which is obtained by exponentiation of said Y by an exponent of said random number z under said modulus p and data K ($C=Y^zK\bmod p$), u is stored in said fifth memory means as a seed for authentication data, C is stored in said fourth memory means, said random number generation means stores a combination of a number u' ($=u^r\bmod p$) which is obtained by exponentiation of said u by an exponent of the generated random number r under the modulus p and a number C' ($=C^r\bmod p$) which is obtained by exponentiation of said C by an exponent of the generated random number r under the modulus p in said first memory means together with the modulus p as authentication data, and said verification means verifies whether or not the number which is obtained by exponentiation of proof data R generated by said proof data generation means by an exponent of a reciprocal number under a modulus (p−1) stored in said sixth memory means is congruent with said K under the modulus p expressed by the following equation:

$$(K\bmod p = R^{(r^{-1}\bmod(p-1)}\bmod p) \tag{2}$$

16. The device for authenticating user's access rights to resources as claimed in claim 9, wherein when unique security characteristic information is a decryption key X which satisfies $Y=a^X\bmod p$ where p is the modulus and a is the positive integer, an encryption key corresponding to said key X is Y, u is a number ($u=a^z\bmod p$) which is obtained by exponentiation of said a by an exponent of a predetermined number z under said modulus p and C is a product of a number which is obtained by exponentiation of said Y by an exponent of said random number z under said modulus p and data K ($C=Y^zK\bmod p$), u is stored in said fifth memory means as a seed for authentication data, C is stored in said fourth memory means, said random number generation means stores a combination of a number u' ($=ua^r\bmod p$) which is obtained by multiplying said u by a number which is obtained by exponentiation of said a as an exponent of the generated random number r under the modulus p with said a and said C in said first C memory means together with the modulus p as authentication data, and said verification means verifies whether or not a value which is obtained by multiplying a value which is obtained by exponentiation of said Y by said random number r stored in said sixth memory means with proof data R generated by said proof data generation means and said K are congruent with each other ($K\bmod p = Ry^r\bmod p$).

17. The device for authenticating user's access rights to resources as claimed in claim 1, wherein said proof support information t stored in said third memory means is data t ($=X-F(p, e)$) which is obtained by subtracting a collision-free function value $F(p, e)$ dependent on user identification information e stored in said second memory means and said p from said X, and said proof data generation means calculates X-power (($u'$)$^X\bmod p$) of u' under the modulus p from said t, said e and said authentication data u' written in said first memory means.

18. The device for authenticating user's access rights to resources as claimed in claim 7, wherein said proof support information t stored in said third memory means is data t ($=X-F(p, e)$) which is obtained by subtracting a collision-free function $F(p, e)$ dependent on user identification information e stored in said second memory means and said p from said X, and said proof data generation means calculates a value ($C'(u')^{-X}\bmod p$) which is obtained by dividing said C' by X-power of said u' under the modulus p from said t, said e and said authentication data u' and C' written in said first memory means.

19. The device for authenticating user's access rights to resources as claimed in claim 1, wherein said proof support information t stored in said third memory means is data t ($=X-F(Y, e)$) which is obtained by subtracting a collision-free function $F(Y, e)$ dependent on user identification information e stored in said second memory means and said encryption key Y from said X, and said proof data generation means calculates a value (($u'$)$^X\bmod p$) X-power of said u' under the modulus p from said t, said e and said authentication data u' written in said first memory means.

20. The device for authenticating user's access rights to resources as claimed in claim 7, wherein said proof support information t stored in said third memory means is data t ($=X-F(Y, e)$) which is obtained by subtracting a collision-free function $F(Y, e)$ dependent on user identification information e stored in said second memory means and said encryption key Y from said X, and said proof data generation means calculates a value ($C'(u')^{-X}\bmod p$) which is obtained by dividing said C' by X-power of said u' under the modulus p from said t, said e and said authentication data u' and C' written in said first memory means.

21. The device for authenticating user's access rights to resources as claimed in claim 17, wherein said proof data generation means comprises first calculation means, second calculation means, and third calculation means, said first calculation means calculates a value (($u'$)$^t\bmod p$) which is obtained by exponentiation of said u' with said t under said modulus p, said second calculation means calculates a value (($u'$)$^{F(p,e)}\bmod p$) which is obtained by exponentiation of said u with said $F(p, e)$ under said modulus p, and said third calculation means generates proof data R ($=(u')^t(u')^{F(p,e)}\bmod p$) by multiplying a calculated result of said first calculation means by a calculated result of said second calculation means under said modulus p.

22. The device for authenticating user's access rights to resources as claimed in claim 18, wherein said proof data generation means comprises first calculation means, second calculation means, and third calculation means, said first calculation means calculates a value (($u'$)$^t\bmod p$) which is obtained by exponentiation of said u' with said t under said modulus p, said second calculation means calculates a value (($u'$)$^{F(p,e)}\bmod p$) which is obtained by exponentiation of said u with said $F(p, e)$ under said modulus p, and said third computing computes a reciprocal number of a value which is obtained by multiplying a calculated result of said first calculation means by a calculated result of said second calculation means under said modulus p and generates proof data R ($=C'(u')^t(u')^{F(p,e)})^{-1}\bmod p$) by multiplying said calculated result by said C'.

23. The device for authenticating user's access rights to resources as claimed in claim 19, wherein said proof data generation means comprises first calculation means, second calculation means, and third calculation means, said first calculation means calculates a value (($u'$)$^t\bmod p$) which is obtained by exponentiation of said u' with said t under said modulus p, said second calculation means calculates a value (($u'$)$^{F(Y,e)}\bmod p$) which is obtained by exponentiation of said u with said $F(Y, e)$ under said modulus p, and said third computing generates proof data R ($=(u')^t(u')^{F(Y,e)}\bmod p$) by multiplying a calculated result of said first calculation means by a calculated result of said second calculation means.

24. The device for authenticating user's access rights to resources as claimed in claim 20, wherein said proof data generation means comprises first calculation means, second calculation means, and third calculation means, said first calculation means calculates a value (($u'$)$^t\bmod p$) which is obtained by exponentiation of said u' with said t under said modulus p, said second calculation means calculates a value (($u'$)$^{F(Y,e)}\bmod p$) which is obtained by exponentiation of said u with said F(Y, e) under said modulus p, and said third computing computes a reciprocal number of a value which is obtained by multiplying a calculated result of said first calculation means by a calculated result of said second calculation means under said modulus p and generates proof data R (=C'(u')$^{F(Y,e)}$(u')$^{F(Y,e)})^{-1}$modp) by multiplying said calculated result by said C'.

25. A device for authenticating user's access rights to resources for authenticating a user's access rights by verifying whether or not proof data generated in order to prove a right of said user is valid, said device for authenticating user's access rights to resources comprising:

first memory means for storing first authentication data;

second memory means for storing user unique identifying information;

third memory means for storing proof support information which is an executed result which is obtained by executing a predetermined calculation on said user unique identifying information and unique security characteristic information;

proof data generation means for generating proof data by executing predetermined calculations on authentication data stored in said first memory means, said user unique identifying information stored in said second memory means and said proof support information stored in said third memory mean;

verification means for verifying whether or not proof data generated by said proof data generation means is generated based on said unique security characteristic information; and said unique security characteristic information being a decryption key in an asymmetric encryption key defined in a finite elliptic curve.

26. The device for authenticating user's access rights to resources as claimed in claim 25, wherein said proof data generation means comprises first calculation means, second calculation means, and third calculation means, said first calculation means effect predetermined calculations on authentication data stored in said first memory means and proof support information stored in said second memory means, said second calculation means effect predetermined calculations on said authentication data stored in said first memory means and user unique identifying information stored in said third memory means, and said third calculation means effects predetermined calculations on a calculated result of said first calculation means and a calculated result of said second calculation means, thereby resulting in said proof data being generated.

27. The device for authenticating user's access rights to resources according to claim 25, further comprising random number generation means and wherein said random number generation means stores a value which is randomized by random number generated by said random number generation means in said first memory means as said first authentication data.

28. The device for authenticating user's access rights to resources as claimed in claim 27, wherein said verification means eliminates said random number effect from proof data generated by said proof data generation means.

29. The device for authenticating user's access rights to resources according to claim 27, further comprising fifth memory means for storing a seed for authentication data and sixth memory means for storing random numbers generated by said random number generation means and wherein said random number generation means stores generated random numbers in said sixth memory means and stores a value which is randomized seed for authentication data stored in said fifth memory means in said first memory means as said first authentication data.

30. The device for authenticating user's access rights to resources as claimed in claim 29, wherein said data verification means de-randomizes proof data generated by said proof data generation means by executing predefined calculations to said random number stored in said sixth memory means and said proof data.

31. The device for authenticating user's access rights to resources according to claim 25, further comprising fourth memory means for storing second authentication data and wherein said second authentication data is data which is obtained by encrypting proper data by use of an encryption key corresponding to said decryption key and said verification means verifies whether or not said proof data generated by said proof data generation means is obtained by correctly decrypting said second authentication data by a decryption key corresponding to said encryption key which is unique security characteristic information.

32. The device for authenticating user's access rights to resources according to claim 25, further comprising fourth memory means for storing second authentication data and wherein said second authentication data is data which is obtained by encrypting proper data by use of an encryption key corresponding to said decryption key and said verification means verifies whether or not a result which is obtained by effecting specific calculations on said proof data generated by said proof data generation means and said second authentication data stored in said fourth memory means is data which is obtained by correctly decrypting said second authentication data by decryption key corresponding to said encryption key which is unique security characteristic information.

33. The device for authenticating user's access rights to resources as claimed in claim 25, wherein said first authentication data is data which is obtained by decrypting proper data by use of an encryption key corresponding to said decryption key and said verification means verifies whether or not said proof data generated by said proof data generation means is data which is obtained by correctly decrypting said first authentication data.

34. The device for authenticating user's access rights to resources as claimed in claim 33, wherein said verification means verifies whether or not a result which is obtained by eliminating a random number effect based on random numbers stored in said sixth memory means from proof data generated by said proof data generation device is data which is obtained by decrypting a seed for authentication data stored in said fifth memory means by a decryption key which is unique security characteristic information.

35. The device for authenticating user's access rights to resources as claimed in claim 33, wherein in particular, when a point on an elliptic curve E on a finite field is set to P, said unique security characteristic information is set to a positive integer X and an encryption key Y corresponding to a decryption key X is set to a point (Y=XP) on E which is obtained by multiplying said P by X, if u is set to a point which is obtained by multiplying said P on said E by z by use of a predetermined random number z (u=zP) and if C is a sum of a number which is obtained by multiplying said Y on said E by said z and a point K on said E (C=K+zY), then C is stored in said fifth memory means as a seed for authentication data, said random number generation means generates a random point r on said E and stores a set of said u and a point C' (=r+C) which is obtained by adding r to said C in said first memory means as authentication data, and said verification means verifies whether or not a value which is obtained by subtracting proof data R generated by said proof data generation means from said r stored in said sixth memory means becomes equal to said K (K=R−r).

36. The device for authenticating user's access rights to resources as claimed in claim 32, wherein in particular, when a point on an elliptic curve E on a finite field is set to P, said unique security characteristic information is set to a positive integer X and an encryption key Y corresponding to a decryption key X is set to a point (Y=XP) on E which is obtained by multiplying said P by X, if u' is set to a point which is obtained by multiplying said P on said E by z by use of a predetermined random number z (u'=zP) and if C is a value which is obtained by effecting predetermined calculations on a value which is obtained by multiplying said Y on said E by said z (zY) and said K, u' is stored in said first memory means as authentication data and C is stored in said fourth memory means, and said verification means verifies whether or not a value which is obtained by effecting predetermined calculations on said C stored in said fourth memory means and proof data R becomes equal to said K.

37. The device for authenticating user's access rights to resources as claimed in claim 32, wherein in particular, when a point on an elliptic curve E on a finite field and having an order q is set to P, said unique security characteristic information is set to a positive integer X and an encryption key Y corresponding to a decryption key X is set to a point (Y=XP) on E which is obtained by multiplying said P by X, u (u=zP) is set to a point which is obtained by multiplying said P on E by z by use of a predetermined random number z, C is set to a value which is obtained by effecting predetermined calculations on a value (zY) which is obtained by multiplying said Y on E by said z and data K, u is stored in said fifth memory means as a seed for authentication data, C is stored in said fourth memory means, said random number generation means generates a random number r and stores a point u' (=ru) which is obtained by multiplying said u on E by r in said first memory means as authentication data, said verification means calculates a value v (=($r^{-1}$modq)R) which is obtained by multiplying proof data R generated by said proof data generation means by a reciprocal number under a modulus q of the random number r stored in said sixth memory means, and said verification means further verifies whether or not a value which is obtained by effecting predetermined calculations on said C stored in said fourth memory means and said v becomes equal to said K.

38. The device for authenticating user's access rights to resources as claimed in claim 32, wherein in particular, when a point on an elliptic curve E on a finite field is set to P, said unique security characteristic information is set to a positive integer X and an encryption key Y corresponding to a decryption key X is set to a point (Y=XP) on E which is obtained by multiplying said P by X, u (u=zP) is set to a point which is obtained by multiplying said P on E by z by use of a predetermined random number z, C is set to a value which is obtained by effecting predetermined calculations on a value (zY) which is obtained by multiplying said Y on E by said z and data K, u is stored in said fifth memory means as a seed for authentication, C is stored in said fourth memory means, said random number generation means generates a random number r and stores a point u' (=rP+u) which is obtained by adding a point which is obtained by multiplying said P on E by r in to said u in said first memory means as authentication data, said verification means calculates a value v (=R−rY) which is obtained by subtracting a value which is obtained by multiplying said Y by said random number r stored in said sixth memory means from said proof data R generated by said proof data generation means, and said verification means further verifies whether or not a value which is obtained by effecting predetermined calculations on said C stored in said fourth memory means and said v becomes equal to said K.

39. The device for authenticating user's access rights to resources as claimed in claim 31, wherein in particular, when a point on an elliptic curve E on a finite field is set to P, said unique security characteristic information is set to a positive integer X and an encryption key Y corresponding to a decryption key X is set to a point (Y=XP) on an E which is obtained by multiplying said P by X, u (u=zP) is set to a point which is obtained by multiplying said P on said E by a predetermined random number z, C is set to a value which is obtained by effecting predetermined calculations on a value (zY) which is obtained by multiplying said Y on said E by z and data K, a set of said u and C is stored in said first memory means as authentication data, and said verification means verifies whether or not proof data R generated by said proof data generation means becomes equal to K.

40. The device for authenticating user's access rights to resources as claimed in claim 31, wherein in particular, when a point on an elliptic curve E on a finite field and having an order q is set to P, said unique security characteristic information is set to a positive integer X and an encryption key Y corresponding to a decryption key X is set to a point (Y=XP) on an E which is obtained by multiplying said P by X, if u (u=zP) is set to a point which is obtained by multiplying said P on by E with a random number z and C (C=K+zY) is a sum of a number which is obtained by multiplying said Y on said E by said z and a point K on said E, u is stored in said fifth memory means as a seed for authentication data, C is stored in said fourth memory means, then said random number generation means generates a random number r and stores a set of a point u' (=ru) which multiplies said u on said E by r and a point C' (=rC) which is obtained by multiplying said C on said E by r in said first memory means as authentication data, and said verification means verifies whether or not a value which is obtained by multiplying proof data R generated by said proof data generation means by a reciprocal number under a modulus q of a random number r stored in said sixth memory means become equal to said K (K=$r^{-1}$modq)R).

41. The device for authenticating user's access rights to resources as claimed in claim 31, wherein in particular, when a point on an elliptic curve E on a finite field is set to P, said unique security characteristic information is set to a positive integer X and an encryption key Y corresponding to a decryption key X is set to a point (Y=XP) on E which is obtained by multiplying said P by X, if u (U=zP) is set to a point which is obtained by multiplying said P on said E by a predetermined random number z and C (C=K+zY) is set to a sum of a point which is obtained by multiplying said Y on said E by z and a point K on said E, then u is stored in said fifth memory means as a seed for authentication data and C is stored in said fourth memory means, said random number generation means generates a random number r and stores a set of a sum u' (=u+rP) of a value which is obtained by multiplying said P on said E by r and said u and said C in said first memory means as authentication data, and said verification means verifies whether or not a value which is obtained by adding a value which is obtained by multiplying said Y by said random number r stored in said sixth memory means and proof data R generated by said proof data generation means becomes equal to said K (K=R+rY).

42. The device for authenticating user's access rights to resources as claimed in claim 25, wherein said proof support information t stored in said third memory means is composed of said unique security characteristic information and user unique identifying information.

43. The device for authenticating user's access rights to resources as claimed in claim 42, wherein said proof support information t stored in said third memory means is made by use of a value which is obtained by calculating user unique identifying information as an input of a collision-free function.

44. The device for authenticating user's access rights to resources as claimed in claim 36, wherein said proof data generation means calculates a value which is obtained by multiplying said u' on said E by X (Xu') from said proof support information and said user unique identifying information.

45. The device for authenticating user's access rights to resources as claimed in claim 35, wherein said proof data generation means calculates a value (C'-Xu') which is obtained by subtracting X multiple of said u' from said C' on said E by use of said access rights authentication information and said user unique identifying information.

46. The device for authenticating user's access rights to resources as claimed in claim 25, wherein said proof support information t stored in said third memory means is composed of at least said unique security characteristic information, said user unique identifying information, and information which normalizes an elliptic curve.

47. The device for authenticating user's access rights to resources as claimed in claim 25, wherein said proof support information t stored in said third memory means is comprised of at least said unique security characteristic information, said user unique identifying information, and said encryption key Y.

48. The device for authenticating user's access rights to resources as claimed in claim 46, wherein said proof support information t stored in said third memory means is made by use of a value which is obtained by calculating at least user unique identifying information and information which normalizes an elliptic curve as an input of a collision-free function.

49. The device for authenticating user's access rights to resources as claimed in claim 47, wherein said proof support information t stored in said third memory means is made by a value which calculating at least user unique identifying information and an encryption key Y as an input of a collision-free function.

50. The device for authenticating user's access rights to resources as claimed in claim 36, wherein said proof data generation means calculates X times (Xu') of u' on said E by use of at least said proof support information, user unique identifying information, and information which normalizes an elliptic curve.

51. The device for authenticating user's access rights to resources as claimed in claim 36, wherein said proof data generation means calculates X times (Xu') of u' on said E by use of at least said proof support information, user unique identifying information, and an encryption key Y.

52. The device for authenticating user's access rights to resources as claimed in claim 35, wherein said proof data generation means calculates a value (C'-Xu') which is obtained by X times of u' from a point C' on said E by use of at least said unique security characteristic information, user information, and information which normalizes an elliptic curve.

53. The device for authenticating user's access rights to resources as claimed in claim 35, wherein said proof data generation means calculates a value (C'-Xu') which is obtained by X times of u' from a point C' on said E by use of at least said unique security characteristic information, user information, and an encryption key Y.

54. The device for authenticating user's access rights to resources as claimed in claim 32, wherein in particular, when an elliptic curve E on a finite field $F_p$ (p is a value which is obtained by exponentiation of a prime number larger than 3) having p elements is set to $y^2=x^3+ax+b$, proof support information t stored in said third memory means is data t (=X−F(p, a, b, e)) which is obtained by subtracting user identification e stored in said second memory means an a collision-free function F(p, a, b, e) dependent on said p, a, b from said X, and said proof data generation means calculates X times (Xu') of u' on said E from said t, said e, said p, a, b and authentication data u' written in said first memory means.

55. The device for authenticating user's access rights to resources as claimed in claim 32, wherein in particular, when an elliptic curve E on a finite field $F_p$ of characteristic 2 and which has p elements is set to $y^2+cy=x^3+ax+b$, proof support information t stored in said third memory means is data t (=X−F(p, a, b, c, e)) which is obtained by subtracting user identification e stored in said second memory means and a collision-free function F(p, a, b, c, e) dependent on said p, a, b, c from said X, and said proof data generation means calculates X times (Xu') of u' on said E from said t, said e, said p, a, b, c and authentication data u' written in said first memory means.

56. The device for authenticating user's access rights to resources as claimed in claim 32, wherein in particular, when an elliptic curve E on a finite field $F_p$ of characteristic 2 and which has p elements is set to $y^2+xy=x^3+ax+b$, proof support information t stored in said third memory means is data t (=X−F(p, a, b, e)) which is obtained by subtracting user identification e stored in said second memory means and a collision-free function F(p, a, b, e) dependent on said p, a, b from said X, and said proof data generation means calculates X times (Xu') of u' on said E from said t, said e, said p, a, b and authentication data u' written in said first memory means.

57. The device for authenticating user's access rights to resources as claimed in claim 32, wherein in particular, when an elliptic curve E on a finite field $F_p$ of characteristic 3 and which has p elements is set to $y^2=x^3+ax^2+bx+c$, proof support information t stored in said third memory means is data t (=X−F(p, a, b, c, e)) which is obtained by subtracting user identification information e stored in said second memory means and a collision-free function F(p, a, b, c, e) dependent on said p, a, b, c from said X, and said proof data generation means calculates X times (Xu') of u' on said E from said t, said e, said p, a, b, c and authentication data u' written in said first memory means.

58. The device for authenticating user's access rights to resources as claimed in claim 31, wherein said proof data generation means generates proof data by use of a value Xu' which is obtained by multiplying said u' on said E by X and authentication data C' written in said first memory means.

59. The device for authenticating user's access rights to resources as claimed in claim 58, wherein said proof data generation means calculates a value (C'-Xu') which is obtained by subtracting a value Xu' which is obtained by multiplying said u' on said E by X from said authentication data C' written in said first memory means.

60. The device for authenticating user's access rights to resources as claimed in claim 54, wherein said proof data generation means comprises first calculation means, second calculation means, and third calculation means, said first calculation means calculates a value (tu') which is obtained by multiplying said u' on said E by t, said second calculation means calculates a value (F(p, a, b, e)u') which is obtained by multiplying said u on said E by said F(p, a, b, e), and said third calculation means generates proof data R (=tu'+F(p, a, b, e)u') by adding a calculated result of said first calculation means to a calculated result of said second calculation means.

61. The device for authenticating user's access rights to resources as claimed in claim 55, wherein said proof data generation means comprises first calculation means, second calculation means, and third calculation means, said first calculation means calculates a value (tu') which is obtained by multiplying said u' on said E by t, said second calculation means calculates a value (F(p, a, b, c, e)u') which is obtained by multiplying said u on said E by said F(p, a, b, c, e), and said third calculation means generates proof data R (=tu'+F(p, a, b, c, e)u') by adding a calculated result of said first calculation means to a calculated result of said second calculation means.

62. The device for authenticating user's access rights to resources as claimed in claim 59, wherein said proof data generation means comprises first calculation means, second calculation means, and third calculation means, said first calculation means calculates a value (C'−tu') which is obtained by subtracting a value which is obtained by multiplying said u' on said E by said t from said C', said second calculation means calculates a value (F(p, a, b, e)u') which is obtained by multiplying said u on said E by said F(p, a, b, e), and said third calculation means generates proof data R (=C'−tu'−F(p, a, b, e)u') by use of a calculated result of said first calculation means and a calculated result of said second calculation means.

63. The device for authenticating user's access rights to resources as claimed in claim 59, wherein said proof data generation means comprises first calculation means, second calculation means, and third calculation means, said first calculation means calculates a value (C'−tu') which is obtained by subtracting a value which is obtained by multiplying said u' on said E by said t from said C', said second calculation means calculates a value (F(p, a, b, c, e)u') which is obtained by multiplying said u on said E by said F(p, a, b, c, e), and said third calculation means generates proof data R (=C'−tu'−F(p, a, b, c, e)u') by use of a calculated result of said first calculation means and a calculated result of said second calculation means.

64. The device for authenticating user's access rights to resources as claimed in claim 60, wherein said verification means executes a predetermined computation by use of said proof data and second authentication data stored in said fourth memory means thereby to decode said second authentication data.

65. In a device for authenticating user's access rights to resources in which a proof data generation device including at least said first memory means, said second memory means, said third memory means and said proof data generation means and a proof data verification device including at least said verification means and further including seventh memory means for storing authentication data, and eighth memory means for storing proof data are communicated with each other to thereby authenticating user access rights, said device for authenticating user's access rights to resources as claimed in claim 1, wherein said proof data verification device stores authentication data stored in said seventh memory means in said first memory means of said proof data generation device, said proof data generation device stores proof data generated based on said authentication data written in said first memory means by said proof data generation means in said eighth memory means in said proof data verification device, and said proof data verification device authenticates user access rights by use of said proof data written in said eighth memory means.

66. The device for authenticating user's access rights to resources as claimed in claim 1, wherein at least said second memory means and said proof data generation means are held in a prevention means for preventing data inside and processing procedures from being observed from the outside.

67. The device for authenticating user's access rights to resources as claimed in claim 1, wherein at least said second memory means and said proof data generation means are arranged as small portable arithmetic units such as IC cards.

68. The device for authenticating user's access rights to resources as claimed in claim 11, wherein at least said second memory means and said second calculation means are held in a prevention means for preventing data inside and processing procedures from being observed from the outside.

69. The device for authenticating user's access rights to resources as claimed in claim 11, wherein at least said second memory means and said second calculation means are arranged as small portable arithmetic units such as IC cards.

70. The device for authenticating user's access rights to resources as claimed in claim 2, wherein said verification means further includes ninth memory means for storing plain text data corresponding to said second authentication data which is encrypted data and comparing means and said comparing means compares a value of said proof data generated by said proof data generation means or a calculated result of the computation using said proof data with the plain text data stored in said ninth memory means, and judges that said proof data is valid only when both of them agree with each other.

71. The device for authenticating user's access rights to resources as claimed in claim 2, wherein said verification means further includes tenth memory means for storing encrypted data which is obtained by encrypting some data by use of an encryption, said second authentication data is data which is obtained by encrypting an encryption key used to encrypt said data, and said verification means verifies by use of a value of proof data generated by said proof data generation means or a value obtained as a result of a calculation using said proof data as decryption key of an encryption used to encrypt said data so as to decode said encrypted data to determine that said proof data is valid.

72. The device for authenticating user's access rights to resources as claimed in claim 2, wherein said verification means further includes redundancy verification means for verifying redundancy of data and said verification means verifies that said proof data is valid when said redundancy verification means confirms that a value of said proof data generated by said proof data generation means or a value obtained as result of a calculation using said proof data has specific redundancy.

73. The device for authenticating user's access rights to resources as claimed in claim 2, wherein said verification means further includes eleventh memory means for storing a result in which a predetermined one-direction function is applied to plain text data corresponding to said second authentication data which is encrypted data, fourth calculation means for executing said one-direction function, and comparing means, said fourth calculation means effects one-direction function on a value of said proof data generated by said proof data generation means or a value obtained as a result of a calculation using said proof data, and said comparing means compares a calculated result of said fourth calculation means with data stored in said eleventh memory means, and judges that said proof data is valid only when both of them agree with each other.

74. The device for authenticating user's access rights to resources as claimed in 2, wherein said verification means further includes program execution means, said second authentication data is data which is obtained by encrypting a program, said verification means transfers a value of said proof data generated by said proof data generation means or a value obtained as a result of a specific computation using said proof data to said program execution means as a part of or whole of a program, whereby only when said proof data generation means correctly decodes said second authentication data which is an encrypted program, i.e. when the encrypted program is correctly decrypted, said program execution means carries out a correct operation.

75. The device for authenticating user's access rights to resources as claimed in claim 2, wherein said verification means further includes program execution means, program memory means, and program decryption means, a program stored in said program memory means is encrypted partly or wholly, said second authentication data is data which is obtained by separately encrypting a decryption key used to said encrypted program, said verification means transfers said proof data generated by said proof data generation means to said program decryption means, said program decryption means decrypts a part of or whole of a program stored in said program memory means by use of, as a decryption key, a value of proof data generated by said proof data generation means or a value obtained as a result of a computation using said proof data, and said program execution means executes a decrypted program, whereby only when said proof data generation means correctly decrypts said second authentication data, i.e. only when a decryption key for decrypting the encrypted program is decrypted correctly, said program execution means carries out a correct operation.

76. An access rights authentication method for authenticating the user's access rights by verifying the validity of proof data generated to prove user's right, said accesss rights authentication method comprising the steps of:

a first memory step for storing first authentication data;

a second memory step for storing user unique identifying information;

a third memory step for storing proof support information which is obtained by effecting predetermined calculations on said user unique identifying information and unique security characteristic information;

a proof data generating step for generating proof data by effecting predetermined calculations on said first authentication data stored at said first memory step, said user unique identifying information stored at said second memory step and said proof support information stored at said third memory step; and a proof data verifying step for verifying whether or not proof data generated at said proof data generating step is generated based on said unique security characteristic information, providing that, in particular, said unique security characteristic information X is a decryption key in an asymmetric cryptosystem arranged so as to satisfy a relationship of Y=a mod p in which p is a modulus and a is a positive integer, and Y is an encryption key corresponding to X, said proof data generating step generating a value which is obtained by exponentiation of said first authentication data stored at said first memory step with a value of said X under the modulus p, said proof data verifying step verifying, by use of proof data generated at said proof data generating step, whether or not data encrypted by said Y can be decrypted correctly.

77. An access rights authentication method for authenticating the user's access rights by verifying whether or not proof data generated to prove user's right is valid, said access rights authentication method comprising the steps of:

a first memory step for storing first authentication data;

a second memory step for storing user unique identifying information;

a third memory step for storing proof support information which is obtained by effecting predetermined calculations on said user unique identifying information and unique security characteristic information;

a fourth memory step for storing second authentication data;

a random number generating step;

a proof data generating step for generating proof data by effecting predetermined calculations on said first authentication data stored at said first memory step, said user unique identifying information stored at said second memory step, and said proof support information stored at said third memory step; and a proof data verifying step for verifying whether or not proof data generated at said proof data generating step is generated based on said unique security characteristic information, said second authentication data being data which is obtained by encrypting predetermined data by use of an encryption key corresponding to said decryption key, said random number generating step memorizes a set of a value which is obtained by randomizing first authentication data $C_1$ and second authentication data $C_2$ or a value which is obtained by randomizing second authentication data $C_2$ by said first memory step, said proof data verifying step verifying legitimacy of the result which is obtained by de-randomizing proof data generated at said proof data generating step by verifying that the results is identical with decryption of said second authentication data $C_2$ stored in said fourth memory step by said decryption key which is said unique security characteristic information, provided that, in particular, said unique security characteristic information X is a decryption key in an asymmetric cryptosystem arranged so as to satisfy a relationship of $Y=a^x mod p$ in which p is a modulus and a is a positive integer, and Y is an encryption key corresponding to X.

78. An access rights authentication method for authenticating said user access rights by verifying the validity of proof data generated to prove user's right, said access rights authentication method comprising the steps of:

a first memory step for storing first authentication data;

a second memory step for storing user unique identifying information;

a third memory step for storing proof support information which is obtained by effecting predetermined calculations on said user unique identifying information and unique security characteristic information;

a proof data generating step for generating proof data by effecting predetermined calculations on said first authentication data stored at said first memory step, said user unique identifying information stored at said second memory step and said proof support information stored at said third memory step; and a proof data verifying step for verifying whether or not proof data generated at said proof data generating step is generated based on said unique security characteristic information, said unique security characteristic information being a decryption key of asymmetric key encryption defined in an elliptic curve on a finite field.

* * * * *